(12) United States Patent
Lim et al.

(10) Patent No.: US 10,503,459 B2
(45) Date of Patent: Dec. 10, 2019

(54) METHOD FOR SHARING SCREEN AND ELECTRONIC DEVICE THEREOF

(71) Applicant: Samsung Electronics Co., Ltd., Suwon-si, Gyeonggi-do (KR)

(72) Inventors: Jun-Hak Lim, Suwon-si (KR); Hyuk Kang, Yongin-si (KR); Jae-Bong Yoo, Seongnam-si (KR); Kyung-Soo Lim, Yongin-si (KR); Duk-Ki Hong, Seoul (KR); Jeong-Hun Kim, Hwaseong-si (KR); Min-Gyew Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 160 days.

(21) Appl. No.: 14/878,456

(22) Filed: Oct. 8, 2015

(65) Prior Publication Data
US 2016/0103650 A1    Apr. 14, 2016

(30) Foreign Application Priority Data

Oct. 10, 2014  (KR) .................. 10-2014-0136795
Jan. 30, 2015  (KR) .................. 10-2015-0015358

(51) Int. Cl.
*G06F 3/14*    (2006.01)
*G06F 3/147*   (2006.01)
(Continued)

(52) U.S. Cl.
CPC .......... *G06F 3/1462* (2013.01); *G06F 3/147* (2013.01); *G06F 3/1423* (2013.01);
(Continued)

(58) Field of Classification Search
CPC .......... H04M 1/7253; H04M 21/4122; H04M 21/43615; G06F 3/1462; G06F 3/1423
See application file for complete search history.

(56) References Cited

U.S. PATENT DOCUMENTS 7,512,401 B2    3/2009  Muhonen et al.
8,522,279 B2 *  8/2013  Lee .................. H04N 21/25875
                                                          725/44
(Continued)

FOREIGN PATENT DOCUMENTS

CN    101073050 A    11/2007
CN    103379221 A    10/2013
(Continued)

OTHER PUBLICATIONS

Chinese Office Action dated Jun. 4, 2019, issued in Chinese Application No. 201580054301.5.

*Primary Examiner* — Ricardo Osorio
(74) *Attorney, Agent, or Firm* — Jefferson IP Law, LLP

(57) ABSTRACT

A device and method for sharing a screen in an electronic device including at least one display are provided. The electronic device includes at least one display that displays information, a communication interface that transmits/receives a signal to/from an external electronic device, and a processor that determines a display method of the external electronic device based on the device capability of the external electronic device, generates screen configuration information corresponding to information displayed on the at least one display based on the display method of the external electronic device, and makes a control to transmit the screen configuration information to the external electronic device through the communication interface.

28 Claims, 56 Drawing Sheets

(51) Int. Cl.
  *H04M 1/725* (2006.01)
  *H04N 21/41* (2011.01)
  *H04N 21/436* (2011.01)
  *H04N 21/4363* (2011.01)
  *H04N 21/443* (2011.01)

(52) U.S. Cl.
  CPC ...... *H04M 1/7253* (2013.01); *H04N 21/4122* (2013.01); *H04N 21/43615* (2013.01); *H04N 21/43637* (2013.01); *H04N 21/4432* (2013.01); *H04M 2250/16* (2013.01)

(56) References Cited

U.S. PATENT DOCUMENTS

| | | | |
|---|---|---|---|
| 8,830,424 B2* | 9/2014 | Hirakata | G02F 1/133526 349/106 |
| 9,106,956 B2* | 8/2015 | Chun | H04N 21/462 |
| 9,398,430 B2* | 7/2016 | Park | H04W 4/16 |
| 9,508,278 B2* | 11/2016 | Jain | G09G 3/20 |
| 9,621,810 B2* | 4/2017 | Choi | H04N 5/23293 |
| 2006/0083194 A1 | 4/2006 | Dhrimaj et al. | |
| 2009/0309886 A1 | 12/2009 | Sneed | |
| 2012/0088548 A1* | 4/2012 | Yun | G08C 17/02 455/557 |
| 2012/0178380 A1 | 7/2012 | Fleck et al. | |
| 2012/0304092 A1 | 11/2012 | Jarrett et al. | |
| 2013/0167040 A1 | 6/2013 | Lee et al. | |
| 2013/0167246 A1 | 6/2013 | Lee et al. | |
| 2013/0239048 A1 | 9/2013 | Mullender et al. | |
| 2013/0278484 A1 | 10/2013 | Hwang et al. | |
| 2014/0053090 A1 | 2/2014 | Lu et al. | |

FOREIGN PATENT DOCUMENTS

| | | |
|---|---|---|
| CN | 103793159 A | 5/2014 |
| EP | 2 428 947 A2 | 3/2012 |
| EP | 2 658 228 A1 | 10/2013 |
| KR | 10-2012-0026189 A | 3/2012 |
| KR | 10-2014-0044690 A | 4/2014 |
| WO | 2006/043977 A1 | 4/2006 |
| WO | 2013/180319 A1 | 12/2013 |

* cited by examiner

METHOD FOR SHARING SCREEN AND ELECTRONIC DEVICE THEREOF

CROSS-REFERENCE TO RELATED APPLICATION(S)

This application claims the benefit under 35 U.S.C. § 119(a) of a Korean patent application filed on Oct. 10, 2014 in the Korean Intellectual Property Office and assigned Serial number 10-2014-0136795, and of a Korean patent application filed on Jan. 30, 2015 in the Korean Intellectual Property Office and assigned Serial number 10-2015-0015358, the entire disclosure of each of which is hereby incorporated by reference.

TECHNICAL FIELD

The present disclosure relates to a device and method for sharing screen information in an electronic device.

BACKGROUND

With the development of information and communication technologies and semiconductor technologies, various types of electronic devices have developed into multimedia devices that provide various multimedia services. For example, portable electronic devices may provide diverse multimedia services such as broadcast services, wireless Internet services, camera services, and music playback services.

Electronic devices may provide screen sharing services for sharing a screen displayed on the display thereof with an external electronic device. For example, the electronic devices may provide mirroring services or casting services for transmitting the screen displayed on the display thereof to the external electronic device to display the screen in the external electronic device.

The above information is presented as background information only to assist with an understanding of the present disclosure. No determination has been made, and no assertion is made, as to whether any of the above might be applicable as prior art with regard to the present disclosure.

SUMMARY

Electronic devices may include a plurality of displays in order to provide various multimedia services. Typical screen sharing services are defined in order that electronic devices including one display share a screen, and therefore a method in which electronic devices including a plurality of displays share a screen may be useful.

Aspects of the present disclosure are to address at least the above-mentioned problems and/or disadvantages and to provide at least the advantages described below. Accordingly, an aspect of the present disclosure is to provide a device and method for sharing screen information displayed on displays in an electronic device including at least one display.

Another aspect of the present disclosure is to provide a device and method for negotiating with an external electronic device including at least one display about a reproduction method for screen information sharing by an electronic device including at least one display.

In accordance with an aspect of the present disclosure, an electronic device is provided. The electronic device includes at least one display that displays information, a communication interface that transmits/receives a signal to/from an external electronic device, and a processor that determines a display method of the external electronic device based on a device capability of the external electronic device, generates screen configuration information that corresponds to the display method of the external electronic device and information displayed on the at least one display, and makes a control to transmit the screen configuration information to the external electronic device through the communication interface.

In accordance with another aspect of the present disclosure, an electronic device is provided. The electronic device includes at least one display that displays information, a communication interface that transmits/receives a signal to/from an external electronic device, and a processor that determines a display method of the electronic device based on device capabilities of the electronic device and the external electronic device, receives screen configuration information of the external electronic device through the communication interface, reconfigures or converts the screen configuration information based on the display method, and makes a control to display the reconfigured or converted screen configuration information on the at least one display.

In accordance with another aspect of the present disclosure, an operating method of an electronic device including at least one display is provided. The operating method includes identifying a device capability of an external electronic device, determining a display method of the external electronic device based on the device capability of the external electronic device, generating screen configuration information that corresponds to the display method of the external electronic device and information displayed on at least one display, and transmitting the screen configuration information to the external electronic device.

In accordance with another aspect of the present disclosure, an operating method of an electronic device including at least one display is provided. The operating method includes determining a display method of the electronic device based on device capabilities of the electronic device and an external electronic device, receiving screen configuration information of the external electronic device, reconfiguring or converting the screen configuration information based on the display method, and displaying the reconfigured or converted screen configuration information on the at least one display.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
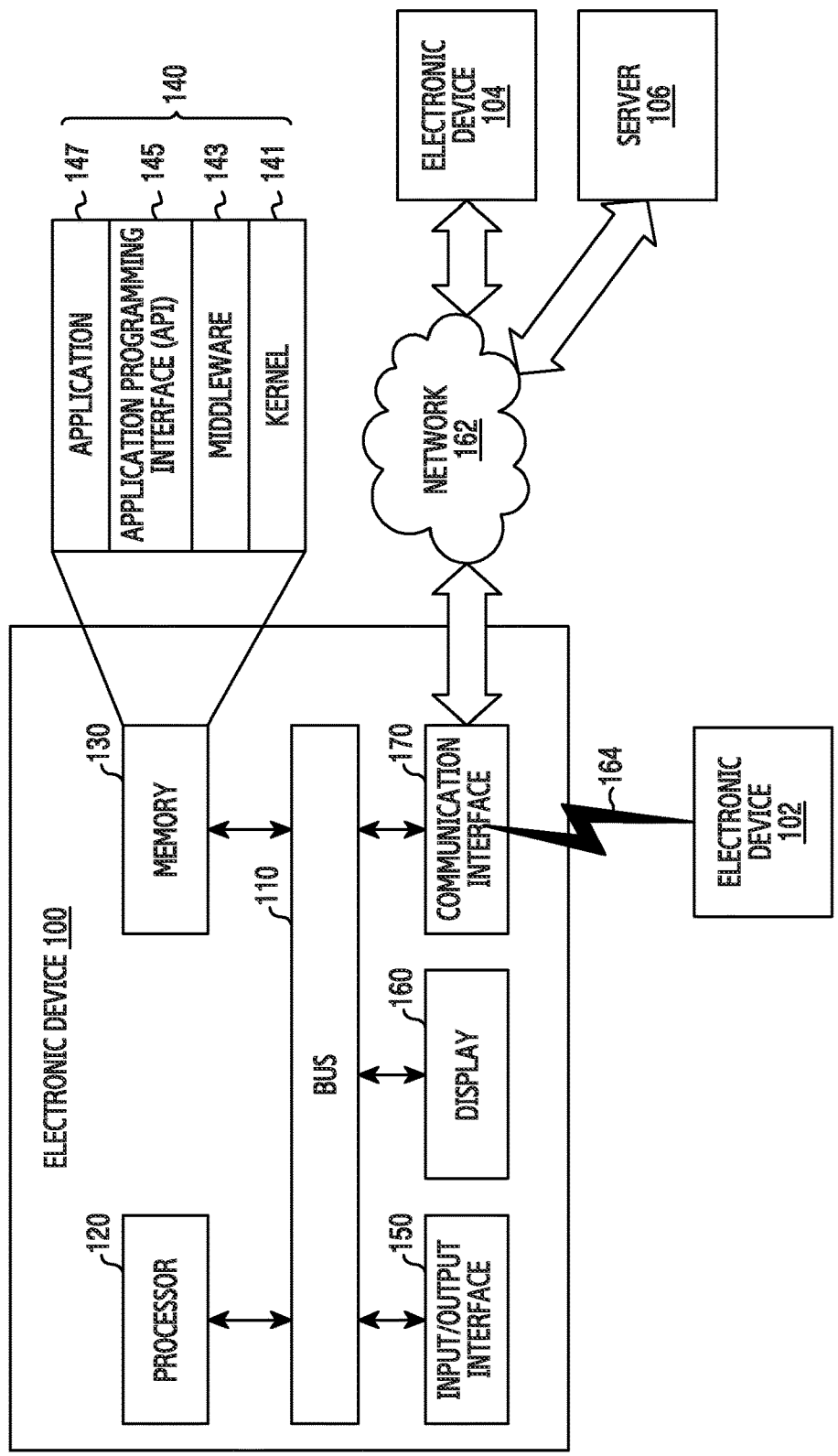
FIG. 1 is a block diagram of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification, the words "have," "may have," "include," "may include," and the like indicate existence of the corresponding feature (e.g., a numerical value, a function, an operation, or an element such as a component, etc.) and does not exclude the existence of the additional feature.

Throughout the specification, the expressions "A or B," "at least one of A or/and B," "one or more of A or/and B," and the like may include all combinations of the listed items. For example, "A or B," "at least one of A and B," or "at least one of A or B" may refer to all cases of (1) including at least one A, (2) including at least one B, or (3) including both at least one A and at least one B.

The expressions "a first," "a second," "the first," "the second," and the like, used in various embodiments, may modify various elements irrespective of order and/or importance thereof and do not limit the corresponding elements. The above-described expressions may be used to distinguish an element from another element. For example, a first user device and a second user device may indicate different user devices irrespective of order or importance. For example, a first element may be termed a second element, and similarly, a second element may also be termed a first element without departing from the scope of the present disclosure.

It will be understood that when an element (e.g., a first element) is referred to as being "(operatively or communicatively) coupled with/to" or "connected to" another element (e.g., a second element), it can be directly connected to the other element, or can be connected to the other element through another element (e.g., a third element). In contrast, it could be understood that when an element (e.g., a first element) is referred to as being "directly connected to" or "directly coupled to" another element (e.g., a second element), there is no intervening element (e.g., a third element) between the element and the other element.

The expression "configured (or set) to", used in this specification, may be interchangeably used with, for example, "suitable for," "having the capacity to," "designed to," "adapted to," "made to," or "capable of" according to circumstances. The term "configured (or set) to" may not necessarily mean "specifically designed to" in hardware. Instead, in some cases, the expression "device configured to" may mean that the device "can ~" together with other devices or components. For example, the text "processor configured (or set) to perform A, B, and C" may mean a dedicated processor (e.g., an embedded processor) for performing the corresponding operations, or a generic-purpose processor (e.g., a central processing unit (CPU) or an application processor (AP)) that can perform the corresponding operations by executing one or more software programs stored in a memory device.

Terms used in this specification are merely used to describe a specific embodiment and may not be intended to limit the scope of another element. Singular forms may include plural forms unless the context clearly indicates otherwise. All terms used herein, including technical and scientific terms, may have the same meaning as commonly understood by one of ordinary skill in the art to which the present disclosure belongs. Terms, such as those defined in commonly used dictionaries, should be interpreted as having a meaning that is the same or similar to their meaning in the context of the relevant art and will not be interpreted in an idealized or overly formal sense unless expressly so defined herein. In some cases, terms defined in this specification may not be interpreted as excluding embodiments of the present disclosure.

Electronic devices, according to various embodiments of the present disclosure, may include, for example, at least one of a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), an Moving Picture Experts Group phase 1 or phase 2 (MPEG-1 or MPEG-2) audio layer 3 (MP3) player, a mobile medical appliance, a camera, and a wearable device (e.g., smart glasses, a head-mounted device (HMD), electronic clothing, an electronic bracelet, an electronic necklace, an electronic appcessory, electronic tattoos, a smart mirror, or a smart watch).

In some embodiments, an electronic device may be a smart home appliance. The smart home appliance may include, for example, at least one of a television (TV), a digital video disc (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, and an electronic photo frame.

In another embodiment, an electronic device may include at least one of various types of medical devices (e.g., various types of portable medical measurement devices (a blood-glucose measuring meter, a heart-rate measuring meter, a blood-pressure measuring meter, a body-temperature measuring meter, and the like), a magnetic resonance angiography (MRA), a magnetic resonance imaging (MRI), a computed tomography (CT), a scanning machine, an ultrasonic machine, and the like), a navigation device, a global positioning system (GPS) receiver, an event data recorder (EDR), a flight data recorder (FDR), a vehicle infotainment device, electronic equipment for a vessel (e.g., a vessel navigation device, a gyro compass, and the like), avionics, a security device, a head unit for a vehicle, an industrial or home robot, an automatic teller's machine (ATM) of a financial institution, a point of sales (POS) of a store, and Internet of Things (e.g., a light bulb, various types of sensors, an electric or gas meter, a sprinkler device, a fire alarm, a thermostat, a streetlamp, a toaster, exercise equipment, a hot-water tank, a heater, a boiler, etc.).

According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, an electronic device may be a combination of one or more of the aforementioned various devices. An electronic device, according to an embodiment, may be a flexible electronic device. Further, an electronic device, according to an embodiment of the present disclosure, is not limited to the aforementioned devices and may include a new electronic device according to technological advance.

Hereinafter, electronic devices, according to various embodiments of the present disclosure, will be described with reference to the accompanying drawings. The term "user" used in this specification may refer to a person or a device (e.g., an artificial intelligence electronic device) that uses an electronic device.

Hereinafter, a technology for screen sharing in an electronic device including at least one display will be described.

In various embodiments of the present disclosure, the screen sharing may include a technology of sharing screen information displayed on the display of an electronic device with an external electronic device. For example, the screen information may include content information displayed on the display of the electronic device.

In various embodiments of the present disclosure, an electronic device including a plurality of displays may include at least one of a first type of electronic device in which a plurality of displays are distinguished into a main display and an auxiliary display, a second type of electronic device in which priorities of a plurality of displays are not set, a third type of electronic device in which a plurality of displays are distinguished into one main display and two auxiliary displays, a fourth type of electronic device in which a plurality of displays having the same size are overlaid with each other, and a fifth type of electronic device in which a plurality of displays having different sizes are overlaid with each other.

FIG. 1 is a block diagram of an electronic device according to an embodiment of the present disclosure.

Referring to FIG. 1, the electronic device 100 may include a bus 110, a processor 120, a memory 130, an input/output interface 150, a display 160, and a communication interface 170. In an embodiment, the electronic device 100 may omit at least one of the above elements, or may additionally include other elements.

The bus 110 may be a circuit that interconnects the above elements (e.g., the processor 120, the memory 130, the input/output interface 150, the display 160, and the communication interface 170) and transfers communication (e.g., a control message) between the elements.

The processor 120 may include one or more of a CPU, an AP, and a communication processor (CP). For example, the processor 120 may carry out operations or data processing related to control and/or communication of at least one other component of the electronic device 100.

According to an embodiment, the processor 120 may determine a reproduction method for screen information sharing with an external electronic device based on the display configuration information of the electronic device 100 and device capability of the external electronic device (e.g., an external electronic device 102).

For example, the display configuration information may include at least one of the number of displays, resolution information of a display, a display type, and a display state. For example, the display state may include at least one of activation or deactivation (ON/OFF) of a display, application program information displayed on a display, and an operating mode (e.g., a low power mode, a black and white mode, a partial display mode, etc.) of a display.

For example, the device capability may include at least one of display configuration information and audio output information. Additionally, the device capability may further include at least one of information or priorities of application programs running in the electronic device 100 or the external electronic device. For example, the audio output information may include the number of audio output devices, or the number and output level information of audio output devices. For example, the priority of an application program may be determined by an execution type of the corresponding application program (e.g., real-time service, urgent processing setup information, etc.).

For example, the reproduction method may include a display method in which screen information provided from the electronic device 100 is displayed by using one or more displays included in an external electronic device. For example, the display method may include the number and types of displays that display screen information of the electronic device 100 among one or more displays included in an external electronic device.

Additionally, the reproduction method may further include at least one of a sound reproduction method for audio signals reproduced through at least one display used in file sharing in an external electronic device and a user input processing method (e.g., a user input back channel (UIBC)) for screen information of each display.

According to an embodiment, the processor 120 may negotiate with an external electronic device about a display method of the external electronic device (e.g., the external electronic device 102) or the electronic device 100 based on device capability that the processor 120 exchanges with the external electronic device. For example, the processor 120 may exchange device capability with an external electronic device for screen information sharing through a device capability exchange procedure.

According to an embodiment, the processor 120 may determine a reproduction method of the external electronic device based on the device capability exchanged with the external electronic device.

According to an embodiment, the processor 120 may determine a reproduction method of the electronic device 100 based on the device capability exchanged with the external electronic device and the device capability of the electronic device 100.

According to an embodiment, the processor 120 may determine the reproduction method of the electronic device 100 based on the device capability of the electronic device 100.

According to an embodiment, the processor 120 may create screen configuration information by reconfiguring screen information corresponding to a screen displayed on the display 160 based on the reproduction method of the external electronic device (e.g., the external electronic device 102). The processor 120 may control the communication interface 170 to transmit the screen configuration information to the external electronic device.

According to an embodiment, the processor 120 may reconfigure or convert the screen configuration information received from the external electronic device (e.g., the external electronic device 102) based on the reproduction method of the electronic device 100. The processor 120 may control the display 160 to display the reconfigured or converted screen configuration information. For example, the screen configuration information received from the external electronic device may include screen information of the external electronic device and the type of a display of the external electronic device on which the corresponding screen information is displayed.

According to an embodiment, the processor 120 may make a control to display the screen configuration information received from the external electronic device (e.g., the external electronic device 102) on the display 160. For example, the screen configuration information received from the external electronic device may include screen information that is reconfigured in the external electronic device to correspond to the reproduction method of the electronic device 100.

According to an embodiment, the processor 120 may control screen sharing with an external electronic device using one of Miracast, Mirror link, digital living network alliance (DLNA), Chromecast, and Wi-Fi display.

The memory 130 may include a volatile memory and/or a non-volatile memory.

The memory 130 may store instructions or data (e.g., device capability) relating to at least one other element of the electronic device 100. According to an embodiment, the memory 130 may store software and/or a program 140. The program 140 may include, for example, a kernel 141, middleware 143, an application-program programming interface (API) 145, application programs (or applications) 147, or the like. At least some of the kernel 141, the middleware 143, and the API 145 may be referred to as an operating system (OS).

The kernel 141 may control or manage system resources (e.g., the bus 110, the processor 120, the memory 130, or the like) used for executing operations or functions implemented in other programs (e.g., the middleware 143, the API 145, or the application programs 147). The kernel 141 may provide an interface through which the middleware 143, the API 145, or the application programs 147 may access individual elements of the electronic device 100 to control or manage the system resources.

The middleware 143 may function as a relay to enable the API 145 or the application programs 147 to communicate with the kernel 141 for data exchange. The middleware 143 may perform a control over a task request received from the application programs 147. For example, the middleware 143 may perform the control (e.g., scheduling or load balancing) for the task request using a method of assigning a priority to use the system resources of the electronic device 100 to at least one of the application programs 147.

The API 145 may include an interface or a function (e.g., an instruction) through which the application programs 147 control functions provided from the kernel 141 or the middleware 143. For example, the API 145 may include at least one interface such as a file control, a window control, an image processing control, or a text control.

The input/output interface 150 may function as an interface that may transfer instructions or data input from a user or another external device to the other element(s) of the electronic device 100. Furthermore, the input/output interface 150 may output instructions or data received from the other element(s) of the electronic device 100 to the user or the other external device.

The display 160 may include, for example, a liquid crystal display (LCD), a light emitting diode (LED) display, an organic LED (OLED) display, a micro electro mechanical system (MEMS) display, or an electronic paper display. The display 160 may display, for example, various types of contents (e.g., text, images, videos, icons, or symbols) to the user. The display 160 may include a touch screen, and may receive, for example, a touch, gesture, proximity, or hovering input by using an electronic pen or a part of the user's body.

In an embodiment, the display 160 may include at least one display. For example, the display 160 may include a plurality of displays (e.g., a main display and at least one auxiliary display) having set priorities. Alternatively, for example, the display 160 may include a plurality of displays having no priority.

The communication interface 170 may connect communication between the electronic device 100 and an external device (e.g., the first or second external electronic device 102 or 104, or a server 106). For example, the communication interface 170 may be connected to a network 162 through wireless communication 164 or wired communication to communicate with an external device.

The wireless communication may use at least one of long term evolution (LTE), LTE-advanced (LTE-A), code division multiple access (CDMA), wideband CDMA (WCDMA), universal mobile telecommunications system (UMTS), wireless broadband (WiBro), and global system for mobile communications (GSM), for example, as a cellular communication protocol.

The wireless communication may use, for example, at least one of a wireless local area network (LAN) (e.g., Wi-Fi or Wi-Fi direct), Bluetooth (BT), near field communication (NFC), BT low energy (BLE), and the like, as a short-range communication protocol.

The wired communication may include at least one of, for example, a universal serial bus (USB), a high definition multimedia interface (HDMI), recommended standard 232 (RS-232), and a plain old telephone service (POTS).

The network 162 may include at least one of a communication network such as a computer network (e.g., a LAN or a wide area network (WAN)), the Internet, and a telephone network.

The first and second external electronic devices 102 and 104 may be the same or a different type of device from the electronic device 100. According to an embodiment, the server 106 may include a group of one or more servers. According to various embodiments, all or some of the operations executed in the electronic device 100 may be carried out in another or a plurality of electronic devices (e.g., the external electronic device 102 or 104, or the server 106). According to an embodiment, when the electronic device 100 has to perform a certain function or service automatically or in response to a request, the electronic device 100 may make a request for performing at least some functions relating thereto to another device (e.g., the electronic device 102 or 104, or the server 106) instead of performing the function or service by itself or additionally. An external electronic device (e.g., the external electronic device 102 or 104, or the server 106) may carry out the function requested by the electronic device 100 or an additional function and transfer the result to the electronic device 100. The electronic device 100 may process the received result as it is or additionally to provide the requested function or service to the external electronic device. To achieve this, for example, cloud computing, distributed computing, or client-server computing technology may be used.

Figure 2:
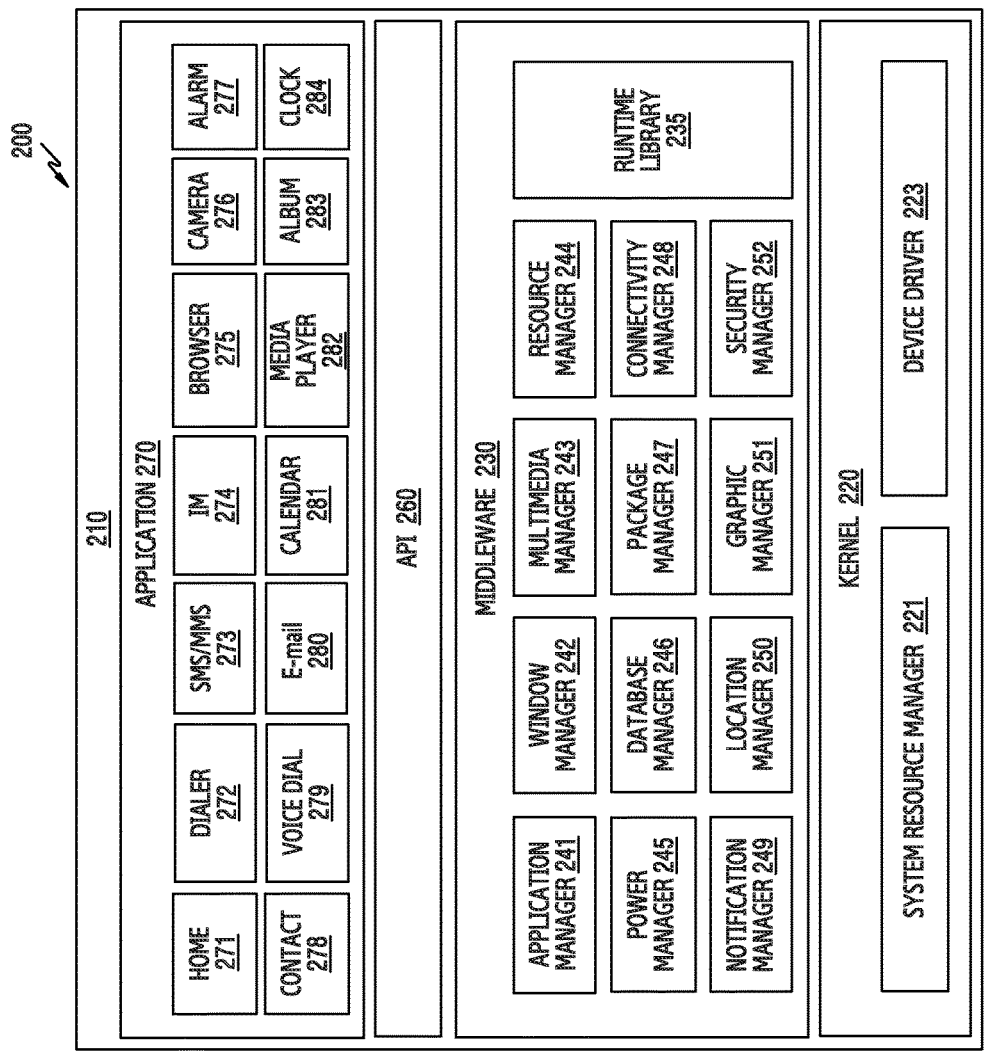
FIG. 2 is a block diagram of a program module according to an embodiment of the present disclosure.

FIG. 2 is a block diagram 200 of a program module according to various embodiments of the present disclosure.

Referring to FIG. 2, the program module 210 (e.g., the program 140) may include an OS for controlling resources relating to an electronic device (e.g., the electronic device 100) and/or various applications (e.g., the application programs 147) driven in the operating system. The operating system may be, for example, Android, iOS, Windows, Symbian, Tizen, Bada, or the like.

The program module 210 may include a kernel 220, middleware 230, an API 260, and/or applications 270. At least some of the program module 210 may be preloaded in the electronic device or downloaded from a server.

The kernel 220 (e.g., the kernel 141 of FIG. 1) may include, for example, a system resource manager 221 or a device driver 223. The system resource manager 221 may control, assign, or collect system resources. According to an embodiment, the system resource manager 221 may include a process manager, a memory manager, or a file system manager. The device driver 223 may include, for example, a display driver, a camera driver, a BT driver, a shared-memory driver, a USB driver, a keypad driver, a Wi-Fi driver, an audio driver, or an inter-process communication (IPC) driver.

The middleware 230 may, for example, provide a function commonly used by the applications 270, or may provide various functions to the applications 270 through the API 260 so that the applications 270 can efficiently use limited system resources within the electronic device. According to an embodiment, the middleware 230 (e.g., the middleware 143) may include, for example, at least one of a runtime library 235, an application manager 241, a window manager 242, a multimedia manager 243, a resource manager 244, a power manager 245, a database manager 246, a package manager 247, a connectivity manager 248, a notification manager 249, a location manager 250, a graphic manager 251, and a security manager 252.

The runtime library 235 may include, for example, a library module that a compiler uses in order to add new functions through a programming language while the applications 270 are executed. The runtime library 235 may perform input/output management, memory management, or a function for an arithmetic function.

The application manager 241 may, for example, manage a life cycle of at least one of the applications 270. The window manager 242 may manage graphical user interface (GUI) resources used on a screen. The multimedia manager 243 may identify formats used for the reproduction of various media files and encode or decode a media file using a codec suitable for the corresponding format. The resource manager 244 may manage resources of at least one of the applications 270, such as a source code, a memory, and a storage space.

The power manager 245 may, for example, operate together with a basic input/output system (BIOS) to manage a battery or power, and may provide power information used for the operation of the electronic device. The database manager 246 may generate, search, or change a database to be used in at least one of the applications 270. The package manager 247 may manage the installation or the updating of an application distributed in the form of a package file.

The connectivity manager 248 may manage wireless connection of, for example, Wi-Fi or BT. The notification manager 249 may display or notify of an event, such as an arrival message, an appointment, proximity notification, and the like, in such a manner of not disturbing a user. The location manager 250 may manage location information of the electronic device. The graphic manager 251 may manage a graphic effect to be provided to a user and a user interface relating to the graphic effect. The security manager 252 may provide all security functions used for system security or user authentication. According to an embodiment, in cases where an electronic device (e.g., electronic device 100) includes a telephone call function, the middleware 230 may further include a telephony manager for managing a voice or video call function of the electronic device.

The middleware 230 may include a middleware module that forms combinations of various functions of the above described elements. The middleware 230 may provide specialized modules according to types of operating systems in order to provide differentiated functions. Furthermore, the middleware 230 may dynamically remove some of the existing elements, or may add new elements.

The API 260 (e.g., the API 145) may be, for example, a set of API programming functions and may have different configurations according to operating systems. For example, in the case of Android or iOS, one API set may be provided for each platform, and in the case of Tizen, two or more API sets may be provided for each platform.

The applications 270 (e.g., the application programs 147), for example, may include one or more applications that may provide functions such as home 271, dialer 272, short message service (SMS)/multimedia messaging service (MMS) 273, instant message (IM) 274, browser 275, camera 276, alarm 277, contacts 278, voice dial 279, e-mail 280, calendar 281, media player 282, album 283, clock 284, health care (e.g., measuring exercise quantity or blood sugar), or environment information (e.g., atmospheric pressure, humidity, or temperature information).

According to an embodiment, the applications 270 may include an application (hereinafter, referred to as an "information exchange application" for convenience of the description) for supporting information exchange between the electronic device (e.g., the electronic device 100) and an external electronic device. The application associated with exchanging information may include, for example, a notification relay application for notifying an external electronic device of certain information or a device management application for managing an external electronic device.

For example, the notification relay application may have a function of transferring notification information generated by other applications of the electronic device 100 (e.g., the SMS/MMS application, the e-mail application, the health care application, or the environmental information application) to the external electronic device. Further, the notification relay application may receive notification information from, for example, the external electronic device and provide the received notification information to the user. The device management application, for example, may manage (e.g., install, delete, or update) at least one function of an external electronic device communicating with the electronic device (e.g., a function of turning on/off the external electronic device itself (or some components thereof) or a function of controlling the luminance (or a resolution) of the display), applications operating in the external electronic device, or services provided by the external electronic device (e.g., a telephone call service and a message service).

According to an embodiment, the applications 270 may include applications (e.g., a health care application) designated according to the attributes of an external electronic device (e.g., as an attribute of the electronic device, the type of the electronic device is a mobile medicine appliance). According to an embodiment, the applications 270 may include applications received from an external electronic device (e.g., a server 106, or an electronic device). According to an embodiment, the applications 270 may include a preloaded application or a third party application which can be downloaded from the server. Names of the components of the program module 210 according to the above described embodiments may vary depending on the type of operating system.

According to various embodiments, at least a part of the program module 210 may be implemented by software, firmware, hardware, or a combination of two or more thereof. At least some of the program module 210 may be implemented (e.g., executed), for example, by a processor (e.g., an application program). At least a part of the program module 210 may include, for example, a module, a program, a routine, sets of instructions, or a process for performing one or more functions.

According to various embodiments of the present disclosure, an electronic device (e.g., the electronic device 100 of FIG. 1) may include: at least one display that displays information; a communication interface that transmits/receives a signal to/from an external electronic device; and a processor that determines a display method of the external electronic device based on the device capability of the external electronic device, generates screen configuration information that corresponds to the display method of the external electronic device and information displayed on the at least one display, and controls to transmit the screen configuration information to the external electronic device through the communication interface.

According to an embodiment of the present disclosure, the device capability may include at least one of the number of displays of the external electronic device and resolutions, types, and characteristics of the respective displays.

According to an embodiment of the present disclosure, the device capability may further include at least one of the information and priority of an application program running in the electronic device or the external electronic device.

According to an embodiment of the present disclosure, the processor may determine the display method of the external electronic device through negotiation with the external electronic device.

According to an embodiment of the present disclosure, the display method of the external electronic device may include display area information of the external electronic device for displaying the information displayed on the at least one display in the external electronic device.

According to an embodiment of the present disclosure, the processor may additionally determine at least one of a reproduction method for reproducing an audio signal corresponding to the at least one display in the external electronic device and an input information processing method for processing input information in the external electronic device, based on the device capability of the external electronic device.

According to an embodiment, the screen configuration information may include content information displayed on the at least one display, area information of the display on which the content information is displayed, and display area information of the external electronic device that is to display the content information.

According to various embodiments of the present disclosure, an electronic device (e.g., the external electronic device 102 of FIG. 1) may include: at least one display that displays information; a communication interface that transmits/receives a signal to/from an external electronic device; and a processor that determines a display method of the electronic device based on the device capabilities of the electronic device and the external electronic device, receives screen configuration information of the external electronic device through the communication interface, reconfigures or converts the screen configuration information based on the display method, and makes a control to display the reconfigured or converted screen configuration information on the at least one display.

According to an embodiment of the present disclosure, the processor may determine the display method of the electronic device based on the number of displays of the electronic device and the number of displays of the external electronic device.

According to an embodiment of the present disclosure, the processor may determine the display method of the electronic device, additionally using at least one of the information and priority of an application program running in the electronic device or the external electronic device.

According to an embodiment of the present disclosure, the processor may determine the display method of the electronic device through negotiation with the external electronic device.

According to an embodiment of the present disclosure, the display method of the electronic device may include display area information for displaying information displayed on at least one display of the external electronic device in the electronic device.

According to an embodiment of the present disclosure, the screen configuration information may include content information displayed on at least one display of the external device and display area information of the external electronic device on which the content information is displayed.

Figure 3:
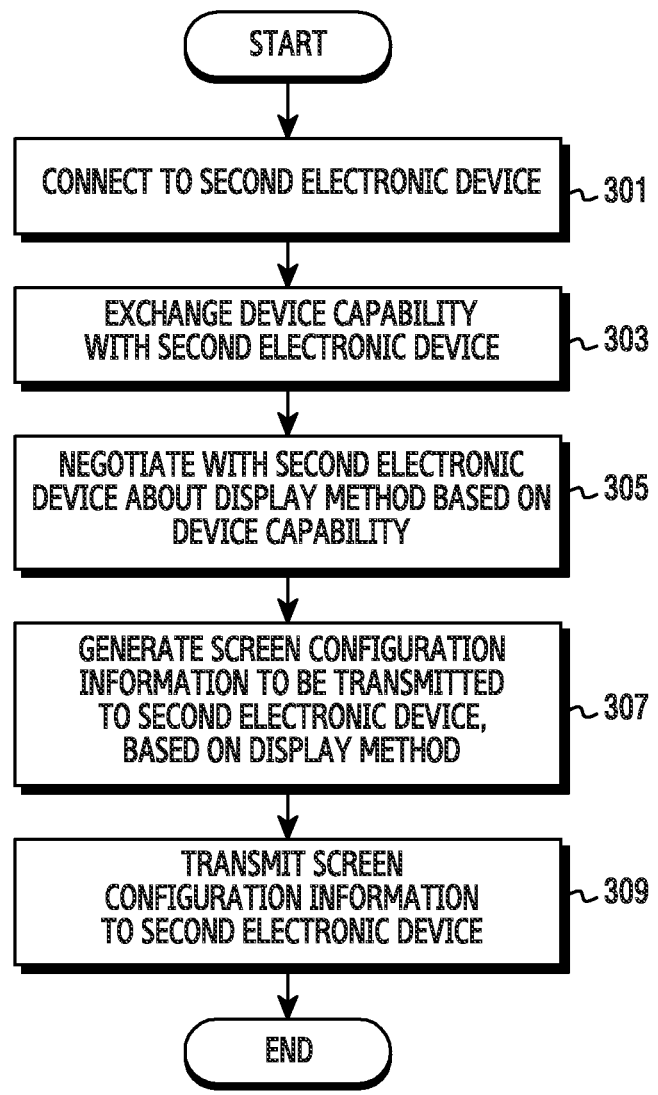
FIG. 3 is a flowchart illustrating a process in which a first electronic device reconfigures and transmits screen configuration information based on a display method about which the first electronic device has negotiated with a second electronic device, according to an embodiment of the present disclosure.

FIG. 3 is a flowchart illustrating a process in which a first electronic device reconfigures and transmits a screen based on a display method about which the first electronic device has negotiated with a second electronic device, according to an embodiment of the present disclosure.

Referring to FIG. 3, in operation 301, the first electronic device (e.g., the electronic device 100 of FIG. 1) may connect communication with the second electronic device (e.g., the external electronic device 102). For example, the first electronic device may connect the communication with the second electronic device using a short-range communication protocol.

In operation 303, the first electronic device may exchange device capability with the second electronic device through a device capability exchange procedure. For example, the device capability may include at least one of display configuration information or audio output information of the electronic devices. Additionally, the device capability may further include at least one of application program information and priorities of application programs being used in the electronic devices.

In operation 305, the first electronic device may negotiate with the second electronic device about the display method of the second electronic device for screen information sharing based on the device capability exchanged with the second electronic device. For example, the first electronic device may determine a candidate display method of the second electronic device based on the display configuration information (e.g., the number of displays) of the first and second electronic devices. The first electronic device may transmit, to the second electronic device, information on the candidate display method of the second electronic device. The first electronic device may determine the display method of the second electronic device based on the response for the candidate display method transmitted to the second electronic device. For example, the first electronic device may receive the candidate display method from the second electronic device. The first electronic device may determine whether to accept the candidate display method of the second electronic device based on a screen sharing policy or input information. The first electronic device may transmit response information (e.g., information on acceptance, refusal, or change of the candidate display method) for the candidate display method to the second electronic device.

In operation 307, the first electronic device may generate screen configuration information to be transmitted to the second electronic device based on the display method of the second electronic device. For example, the first electronic device may create screen configuration information by reconfiguring or converting screen information of the display 160 based on the display method of the second electronic device. For example, the first electronic device may determine a display area (display method) of the second electronic device for displaying at least one screen displayed on the display 160 of the first electronic device through a screen sharing service. The first electronic device may create screen configuration information by reconfiguring or converting the screen information of the first electronic device to correspond to the resolution of the display area of the second electronic device. For example, the display area may include a divided area for displaying the screen information of the first electronic device on one display included in the second electronic device. For example, the display area may include the type of a display for displaying the screen information of the first electronic device among a plurality of displays included in the second electronic device.

In operation 309, the first electronic device may transmit screen configuration information (e.g., the screen configuration information reconfigured or converted in operation 307) to the second electronic device. For example, the first electronic device may transmit, to the second electronic device, the screen configuration information created in operation 307 by using one of Miracast, Mirror link, DLNA, Chromecast, and Wi-Fi display. For example, the screen configuration information may include a display area for displaying screen information of the first electronic device in the second electronic device and screen information to be displayed in each display area.

Figure 4:
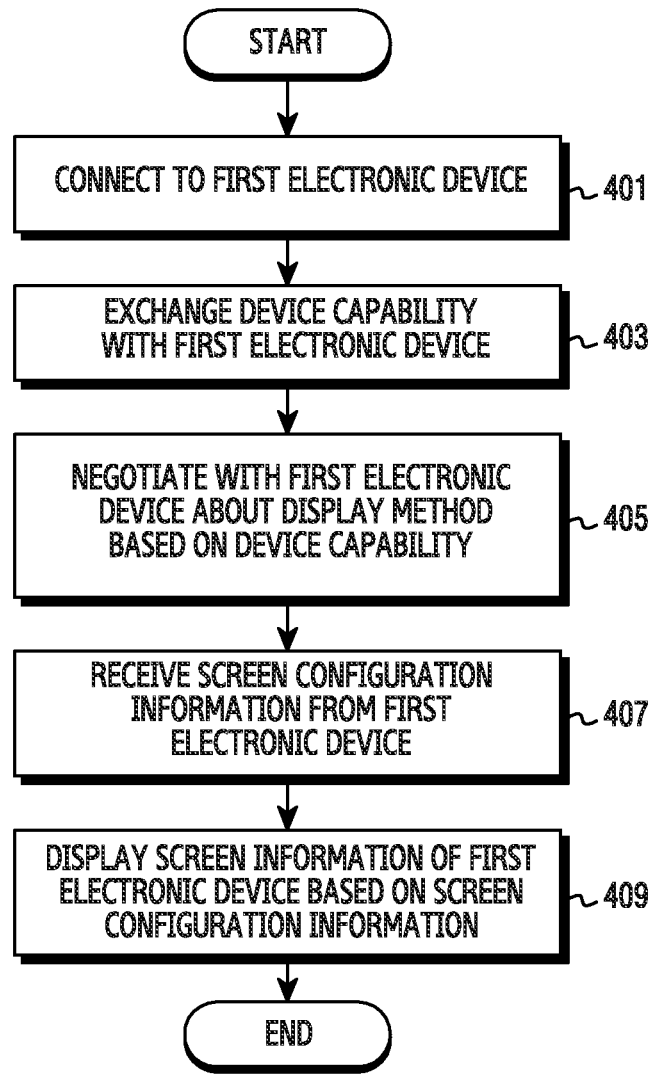
FIG. 4 is a flowchart illustrating a process in which the second electronic device displays screen configuration information received from the first electronic device, according to an embodiment of the present disclosure.

FIG. 4 is a flowchart illustrating a process in which the second electronic device displays screen configuration information received from the first electronic device, according to an embodiment of the present disclosure. Hereinafter, an operation of the second electronic device for displaying screen configuration information in response to the operation of the first electronic device of FIG. 3 will be described.

Referring to FIG. 4, in operation 401, the second electronic device (e.g., the external electronic device 102 of FIG. 1) may connect communication with the first electronic device (e.g., the electronic device 100).

In operation 403, the second electronic device may exchange device capability with the first electronic device through a device capability exchange procedure.

In operation 405, the second electronic device may negotiate with the first electronic device about the display method of the second electronic device for screen sharing based on the device capability exchanged with the second electronic device.

In operation 407, the second electronic device may receive screen configuration information from the first electronic device. For example, the screen configuration information may include screen information of the first electronic device that is to be displayed on the second electronic device and display area information of the second electronic device to display screen information. For example, the display area may represent at least one of a plurality of displays included in the external electronic device, or at least a partial area of one display.

In operation 409, the second electronic device may display screen information of the first electronic device in at least one display area based on the screen configuration information received from the first electronic device. For example, the second electronic device may display different screen information displayed on the display 160 of the first electronic device in each display area of the second electronic device based on the screen configuration information.

According to an embodiment, the first and second electronic devices may also negotiate about the display method of the second electronic device by receiving device capability information broadcast by the respective electronic devices before the communication between the electronic devices is connected.

Figure 5:
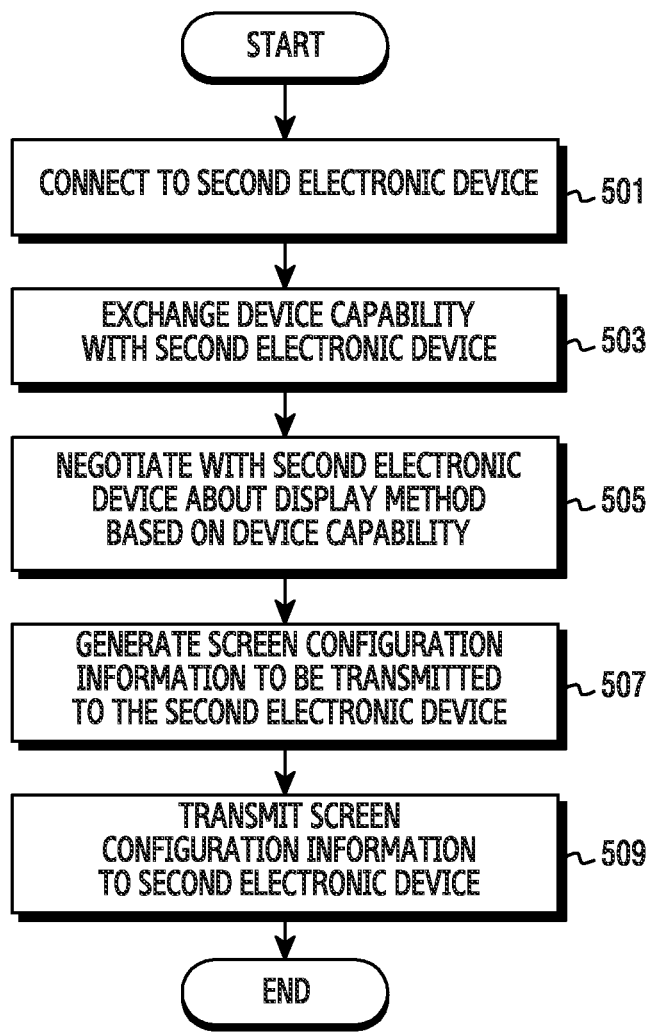
FIG. 5 is a flowchart illustrating a process in which the first electronic device transmits screen configuration information to the second electronic device, according to an embodiment of the present disclosure.

FIG. 5 is a flowchart illustrating a process in which the first electronic device transmits screen configuration information to the second electronic device, according to an embodiment of the present disclosure.

Referring to FIG. 5, in operation 501, the first electronic device (e.g., the electronic device 100 of FIG. 1) may connect communication with the second electronic device (e.g., the external electronic device 102).

In operation 503, the first electronic device may exchange device capability with the second electronic device through a device capability exchange procedure.

In operation 505, the first electronic device may negotiate with the second electronic device about the display method of the second electronic device for screen information sharing based on the device capability exchanged with the second electronic device.

In operation 507, the first electronic device may generate screen configuration information to be transmitted to the second electronic device. For example, the first electronic device may generate screen configuration information corresponding to a screen displayed on the display 160 thereof.

In operation 509, the first electronic device may transmit the screen configuration information to the second electronic device. For example, the screen configuration information may include screen information of the first electronic device and display area information of the first electronic device where screen information is displayed.

Figure 6:
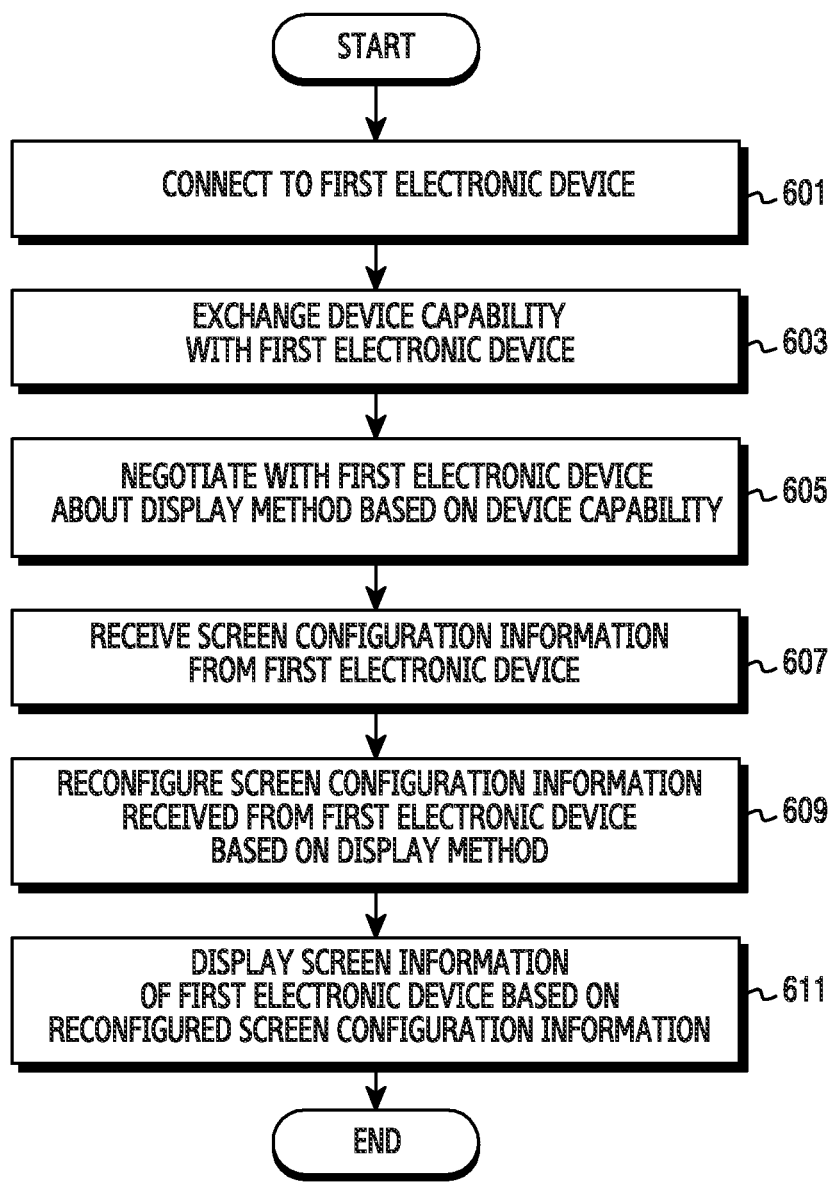
FIG. 6 is a flowchart illustrating a process in which the second electronic device reconfigures screen configuration information received from the first electronic device based on a display method about which the second electronic device has negotiated with the first electronic device, according to an embodiment of the present disclosure.

FIG. 6 is a flowchart illustrating a process in which the second electronic device reconfigures screen configuration information received from the first electronic device based on a display method about which the second electronic device has negotiated with the first electronic device, according to an embodiment of the present disclosure. Hereinafter, an operation of the second electronic device for displaying screen configuration information in response to the operation of the first electronic device of FIG. 5 will be described.

Referring to FIG. 6, in operation 601, the second electronic device (e.g., the external electronic device 102 of FIG. 1) may connect communication with the first electronic device (e.g., the electronic device 100).

In operation 603, the second electronic device may exchange device capability with the first electronic device through a device capability exchange procedure.

In operation 605, the second electronic device may negotiate with the first electronic device about the display method of the second electronic device for screen information sharing based on the device capability exchanged with the first electronic device.

In operation 607, the second electronic device may receive screen configuration information from the first electronic device.

In operation 609, the second electronic device may reconfigure or convert the screen configuration information received from the first electronic device based on the display method of the second electronic device. For example, the second electronic device may determine a display area (display method) of the second electronic device for displaying screen information displayed on each display included in the first electronic device. The second electronic device may reconfigure or convert screen information of the first electronic device to be displayed in each display area to correspond to the resolution of the display area of the second electronic device for displaying screen information of the first electronic device.

In operation 611, the second electronic device may display screen information of the first electronic device in at least one display area based on the reconfigured or converted screen configuration information. For example, the second electronic device may display different screen information displayed on the display 160 of the first electronic device in each display area of the second electronic device.

According to an embodiment, the first and second electronic devices may also negotiate about the display method of the second electronic device by receiving device capability information broadcast by the respective electronic devices before the communication between the electronic devices is connected.

In FIGS. 3 to 6, the first and second electronic devices may share screen information displayed on the display of the first electronic device based on the display method of the second electronic device determined through the negotiation.

Additionally, the first and second electronic devices may further determine, through negotiation, at least one of a sound reproduction method for sharing an audio signal of the first electronic device and a user input processing method (e.g., UIBC) for sharing input information. For example, the audio signal of the first electronic device may include an audio signal that is output to correspond to each display of the first electronic device. The input information may include input information detected by each electronic device (the first or second electronic device).

According to an embodiment, the first and second electronic devices may negotiate with each other about a sound reproduction method of the second electronic device for audio signals of the first electronic device. For example, the first and second electronic devices may determine whether the second electronic device selects and reproduces at least one of the audio signals of the first electronic device, or synthesizes and reproduces the audio signals. For example, in the case of selecting and reproducing an audio signal, the first and second electronic devices may determine a display (or display area) through which the second electronic device reproduces the audio signals of the first electronic device. Additionally, in cases where the second electronic device includes a plurality of audio output devices, the first and second electronic devices may determine an audio output device of the second electronic device through which the second electronic device outputs an audio signal of the first electronic device.

According to an embodiment, the first and second electronic devices may determine a user input processing method for processing input information (e.g., user input information) detected through an input/output interface of the first or second electronic device for the counterpart electronic device. For example, the first and second electronic devices may determine at least one display area for processing input information (e.g., user input information) detected through at least one display (e.g., a touch screen) included in the first electronic device for the second electronic device.

Figure 7:
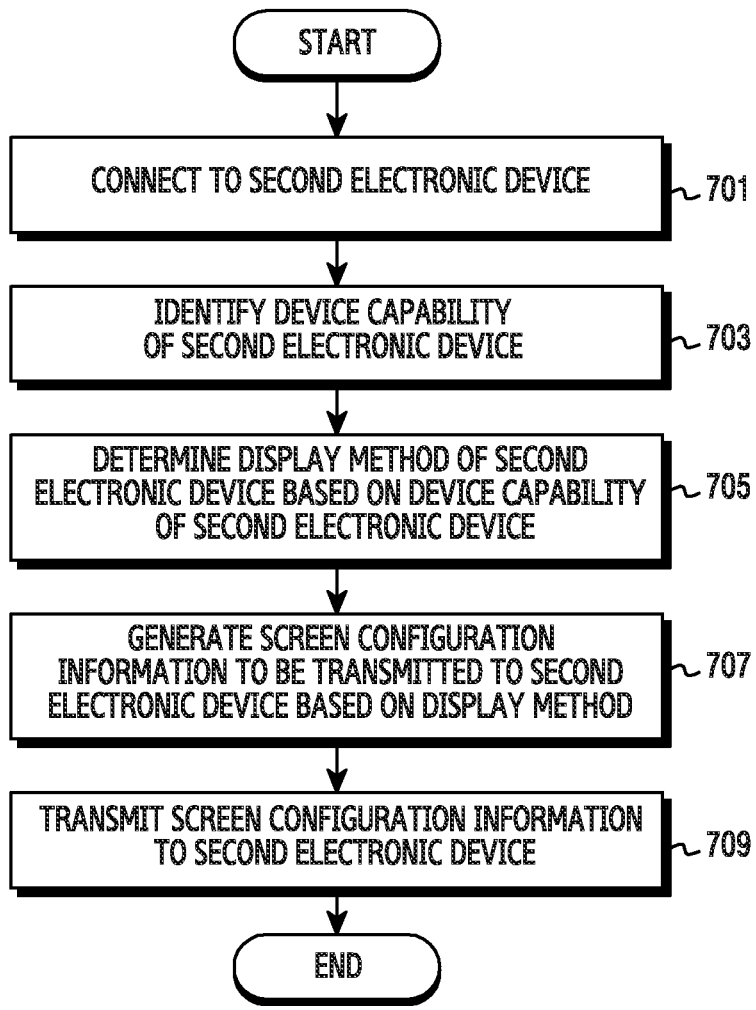
FIG. 7 is a flowchart illustrating a process in which the first electronic device determines the display method of the second electronic device based on the device capability of the second electronic device, according to an embodiment of the present disclosure.

FIG. 7 is a flowchart illustrating a process in which the first electronic device determines the display method of the second electronic device based on the device capability of the second electronic device, according to an embodiment of the present disclosure.

Referring to FIG. 7, in operation 701, the first electronic device (e.g., the electronic device 100 of FIG. 1) may connect communication with the second electronic device (e.g., the external electronic device 102).

In operation 703, the first electronic device may identify the device capability of the second electronic device. For example, the first electronic device may receive device capability of the second electronic device through a device capability exchange procedure. For example, the first electronic device may receive device capability information broadcast by the second electronic device.

In operation 705, the first electronic device may determine the display method of the second electronic device for screen information sharing based on the device capability exchanged with the second electronic device. For example, the first electronic device may determine a display method of the second electronic device based on the display configuration information (e.g., the number of displays) of the first and second electronic devices.

In operation 707, the first electronic device may generate screen configuration information to be transmitted to the second electronic device based on the display method of the second electronic device. For example, the first electronic device may create screen configuration information by reconfiguring or converting screen information displayed on the display 160 based on the display method of the second electronic device.

In operation 709, the first electronic device may transmit screen configuration information (e.g., the screen information reconfigured or converted in operation 707) to the second electronic device.

According to an embodiment, the first electronic device may also negotiate about the display method of the second electronic device by receiving device capability information broadcast by the second electronic devices before the communication with the second electronic device is connected.

Figure 8:
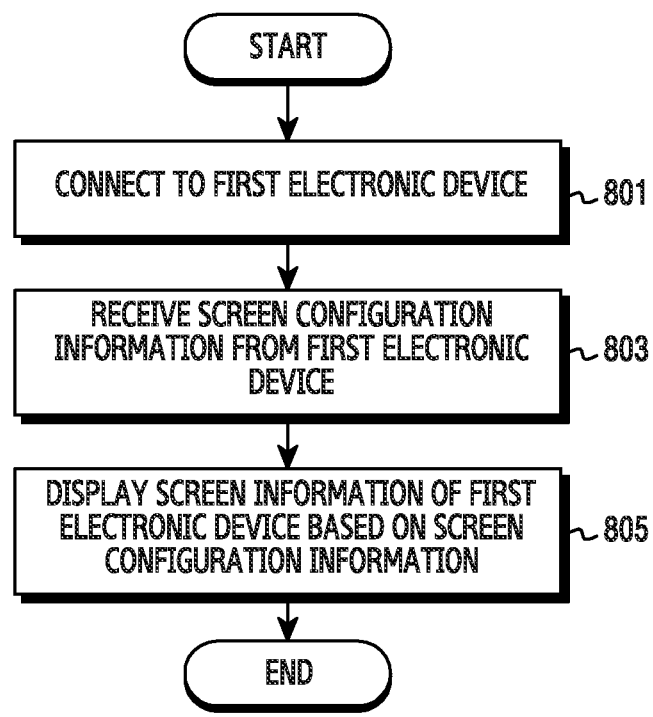
FIG. 8 is a flowchart illustrating a process in which the second electronic device displays screen configuration information received from the first electronic device, according to an embodiment of the present disclosure.

FIG. 8 is a flowchart illustrating a process in which the second electronic device displays screen configuration information received from the first electronic device, according to an embodiment of the present disclosure. Hereinafter, an operation of the second electronic device for displaying screen configuration information in response to the operation of the first electronic device of FIG. 7 will be described.

Referring to FIG. 8, in operation 801, the second electronic device (e.g., the external electronic device 102 of FIG. 1) may connect communication with the first electronic device (e.g., the electronic device 100).

In operation 803, the second electronic device may receive screen configuration information from the first electronic device. For example, the screen configuration information may include a display area of the second electronic device for displaying screen information of the first electronic device and screen information of the first electronic device to be displayed in each display area.

In operation 805, the second electronic device may display screen information of the first electronic device in at least one display area based on the screen configuration information received from the first electronic device.

In FIGS. 7 to 8, the first electronic device may determine the display method of the second electronic device for sharing screen information of the first electronic device based on the device capability of the second electronic device. Additionally, based on the device capability of the second electronic device, the first electronic device may further determine, through negotiation, at least one of a sound reproduction method for sharing an audio signal of the first electronic device and a user input processing method for sharing input information.

Figure 9:
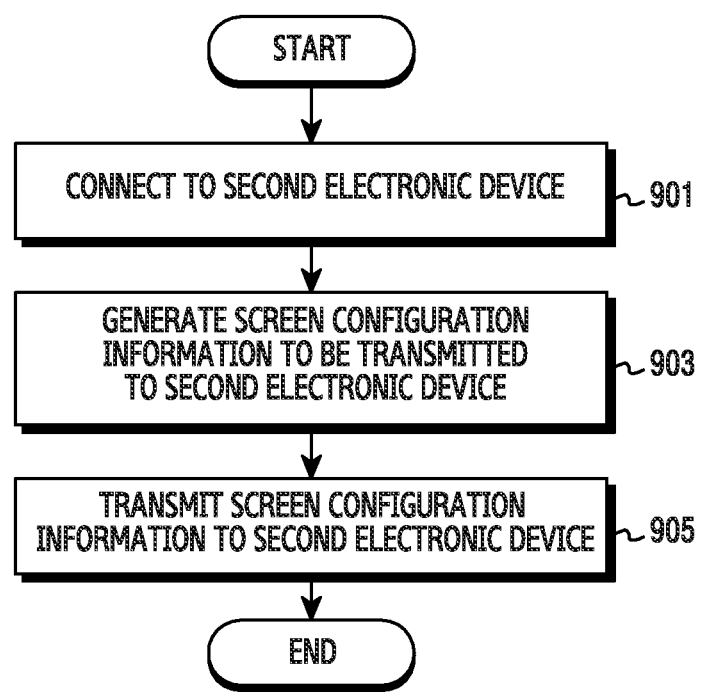
FIG. 9 is a flowchart illustrating a process in which the first electronic device transmits screen configuration information to the second electronic device, according to an embodiment of the present disclosure.

FIG. 9 is a flowchart illustrating a process in which the first electronic device transmits screen configuration information to the second electronic device, according to an embodiment of the present disclosure.

Referring to FIG. 9, in operation 901, the first electronic device (e.g., the electronic device 100 of FIG. 1) may connect communication with the second electronic device (e.g., the external electronic device 102).

In operation 903, the first electronic device may generate screen configuration information to be transmitted to the second electronic device. For example, the first electronic device may generate screen configuration information corresponding to a screen displayed on the display 160 thereof.

In operation 905, the first electronic device may transmit the screen configuration information to the second electronic device. For example, the screen configuration information may include screen information displayed in each display area included in the first electronic device.

Figure 10:
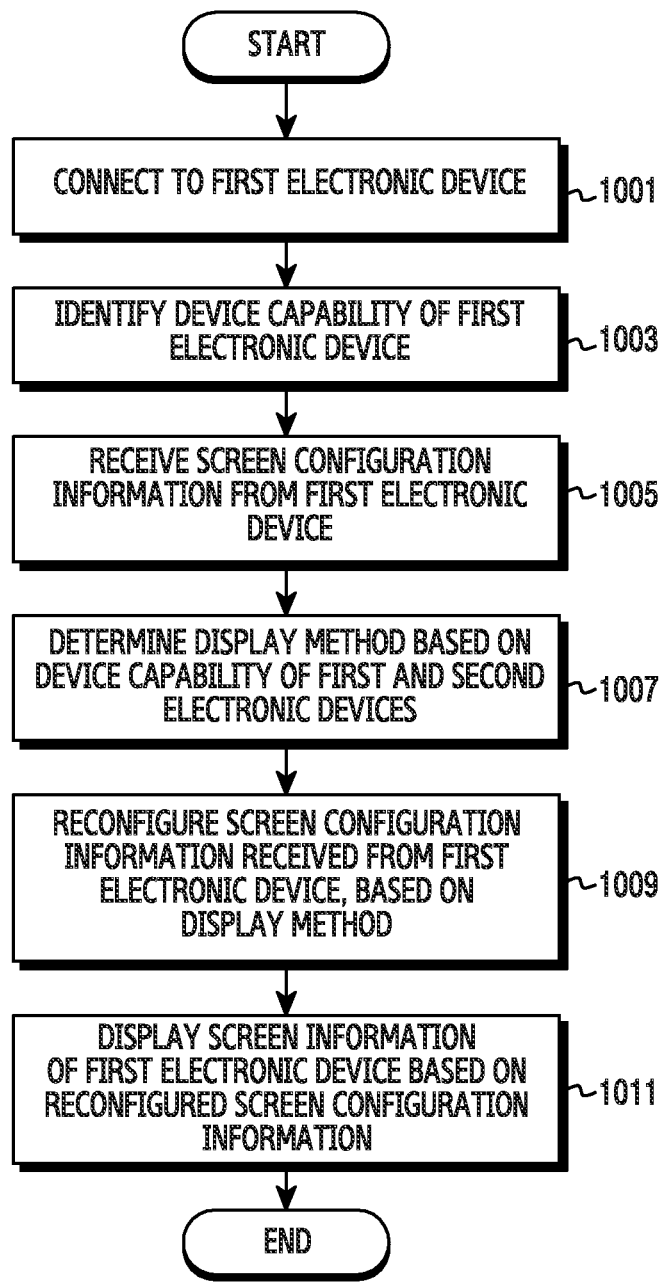
FIG. 10 is a flowchart illustrating a process in which the second electronic device determines a display method for screen sharing, according to an embodiment of the present disclosure.

FIG. 10 is a flowchart illustrating a process in which the second electronic device determines a display method for screen sharing, according to an embodiment of the present disclosure. Hereinafter, an operation of the second electronic device for displaying screen configuration information in response to the operation of the first electronic device of FIG. 9 will be described.

Referring to FIG. 10, in operation 1001, the second electronic device (e.g., the external electronic device 102 of FIG. 1) may connect communication with the first electronic device (e.g., the electronic device 100).

In operation 1003, the second electronic device may identify the device capability of the first electronic device. For example, the second electronic device may identify the device capability of the first electronic device through a device capability exchange procedure with the first electronic device. For example, the second electronic device may receive device capability information broadcast by the first electronic device.

In operation 1005, the second electronic device may receive screen configuration information from the first electronic device.

In operation 1007, the second electronic device may determine the display method thereof for screen information sharing based on the device capabilities of the first and second electronic devices. For example, the second electronic device may determine a display area for displaying screen information of the first electronic device in the second electronic device based on the priority of an application program being reproduced on each display of the second electronic device and the number of displays of the first and second electronic devices. Additionally, the second electronic device may determine a resolution for displaying screen information of the first electronic device in each display area of the second electronic device.

In operation 1009, the second electronic device may reconfigure or convert the screen configuration information received from the first electronic device based on the display method of the second electronic device. For example, the second electronic device may reconfigure or convert screen information of the first electronic device to correspond to the resolution of the display area of the second electronic device for displaying screen information of the first electronic device.

In operation 1011, the second electronic device may display different screen information of the first electronic device in at least one display area based on the reconfigured or converted screen configuration information.

Figure 11:
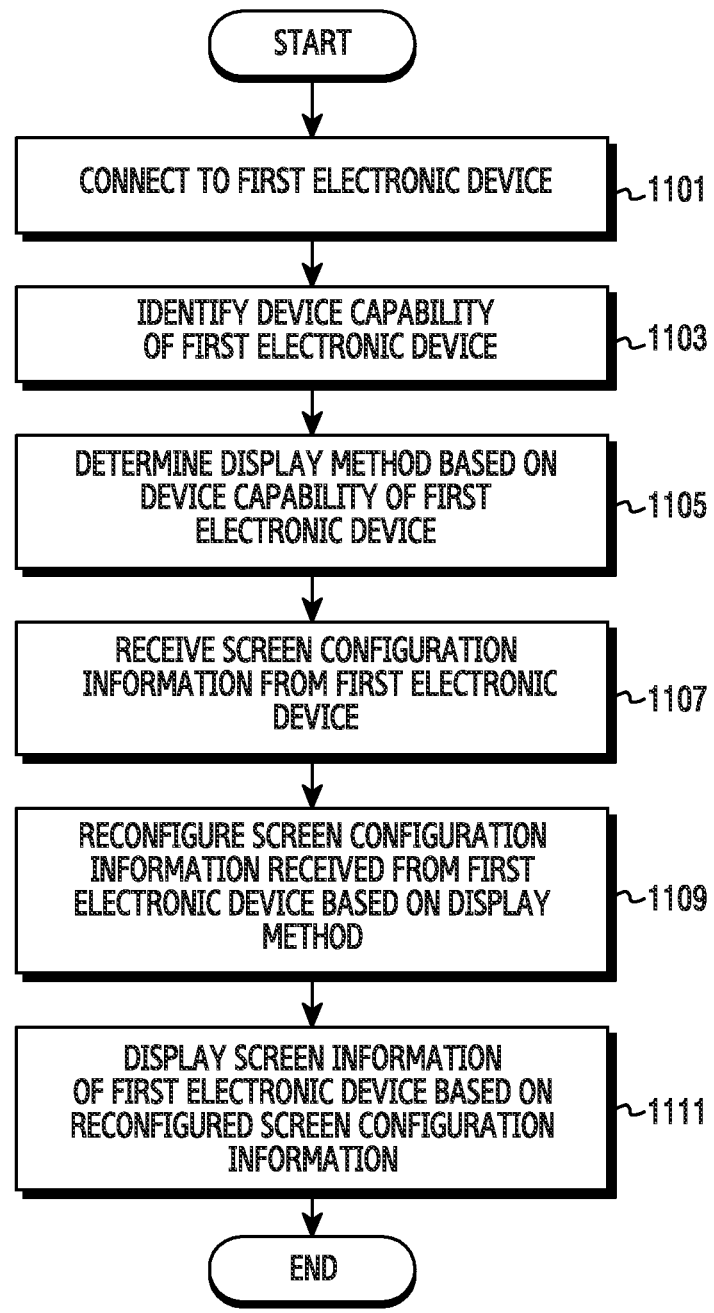
FIG. 11 is a flowchart illustrating a process in which the second electronic device determines a display method for screen sharing, according to an embodiment of the present disclosure.

FIG. 11 is a flowchart illustrating a process in which the second electronic device determines a display method for screen sharing, according to an embodiment of the present disclosure. Hereinafter, an operation of the second electronic device for displaying screen configuration information in response to the operation of the first electronic device of FIG. 9 will be described.

Referring to FIG. 11, in operation 1101, the second electronic device (e.g., the external electronic device 102 of FIG. 1) may connect communication with the first electronic device (e.g., the electronic device 100).

In operation 1103, the second electronic device may identify the device capability of the first electronic device.

In operation 1105, the second electronic device may determine the display method thereof for screen information sharing based on the device capabilities of the first and second electronic devices. For example, the second electronic device may determine a display area for displaying screen information of the first electronic device in the second electronic device based on the number of displays of the first and second electronic devices. Additionally, the second electronic device may determine a resolution for displaying screen information of the first electronic device in each display area of the second electronic device.

In operation 1107, the second electronic device may receive screen configuration information from the first electronic device.

In operation 1109, the second electronic device may reconfigure or convert the screen configuration information received from the first electronic device based on the display method of the second electronic device.

In operation 1111, the second electronic device may display different screen information of the first electronic device in at least one display area based on the reconfigured screen configuration information.

According to an embodiment, the second electronic device may also negotiate about the display method of the second electronic device by receiving device capability information broadcast by the first electronic devices before the communication with the first electronic device is connected.

In FIGS. 9 to 11, the second electronic device may determine the display method of the second electronic device for sharing screen information of the first electronic device based on the device capabilities of the first and second electronic devices. Additionally, based on the device capabilities of the first and second electronic devices, the second electronic device may further determine at least one of a sound reproduction method for sharing an audio signal of the first electronic device and a user input processing method (e.g., UIBC) for sharing input information.

According to various embodiments of the present disclosure, an operating method of an electronic device (e.g., the electronic device 100 of FIG. 1) including at least one display may include: identifying the device capability of an external electronic device; determining a display method of the external electronic device based on the device capability of the external electronic device; creating screen configuration information that corresponds to the display method of the external electronic device and information displayed on the at least one display; and transmitting the screen configuration information to the external electronic device.

According to an embodiment of the present disclosure, the device capability may include at least one of the number of displays of the external electronic device and resolutions, types, and characteristics of the respective displays.

According to an embodiment of the present disclosure, the device capability may further include at least one of the information and priority of an application program running in the electronic device or the external electronic device.

According to an embodiment of the present disclosure, the determining of the display method may include determining the display method of the external electronic device through negotiation with the external electronic device.

According to an embodiment of the present disclosure, the display method may include display area information of the external electronic device for displaying the information displayed on the at least one display in the external electronic device.

According to an embodiment of the present disclosure, the operating method may further include: additionally determining at least one of a reproduction method for reproducing an audio signal corresponding to the at least one display in the external electronic device and an input information processing method for processing input information in the external electronic device, based on the device capability of the external electronic device; and transmitting at least one of the reproduction method and the input information processing method to the external electronic device.

According to an embodiment, the screen configuration information may include content information displayed on the at least one display, area information of the display on which the content information is displayed, and display area information of the external electronic device that is to display the content information.

According to various embodiments of the present disclosure, an operating method of an electronic device including at least one display (e.g., the external electronic device 102 of FIG. 1) may include: determining a display method of the electronic device based on the device capabilities of the electronic device and an external electronic device; receiving screen configuration information of the external electronic device; reconfiguring or converting the screen configuration information based on the display method; and displaying the reconfigured or converted screen configuration information on the at least one display.

According to an embodiment of the present disclosure, the determining of the display method may include determining the display method of the electronic device based on the number of displays of the electronic device and the number of displays of the external electronic device.

According to an embodiment of the present disclosure, the determining of the display method may further include determining the display method of the electronic device, additionally using at least one of the information and priority of an application program running in the electronic device or the external electronic device.

According to an embodiment of the present disclosure, the determining of the display method may include determining the display method of the electronic device through negotiation with the external electronic device.

According to an embodiment of the present disclosure, the display method may include display area information for displaying information displayed on at least one display of the external electronic device in the electronic device.

According to an embodiment of the present disclosure, the operating method may further include: additionally determining at least one of a reproduction method for reproducing an audio signal corresponding to the at least one display in the external electronic device and an input information processing method for processing input information in the external electronic device, based on the device capability of the external electronic device; and processing an audio signal or input information provided from the external electronic device based on at least one of the reproduction method and the input information processing method.

According to an embodiment of the present disclosure, the screen configuration information may include content information displayed on at least one display of the external device and display area information of the external electronic device on which the content information is displayed.

Hereinafter, embodiments for sharing screen information of the first electronic device based on a display method determined by at least one of the first and second electronic devices will be described.

FIGS. 12A to 12F illustrate screen configurations in which a first electronic device including one display shares a screen with a second electronic device including a plurality of displays of a first type, according to an embodiment of the present disclosure.

Figure 12A:
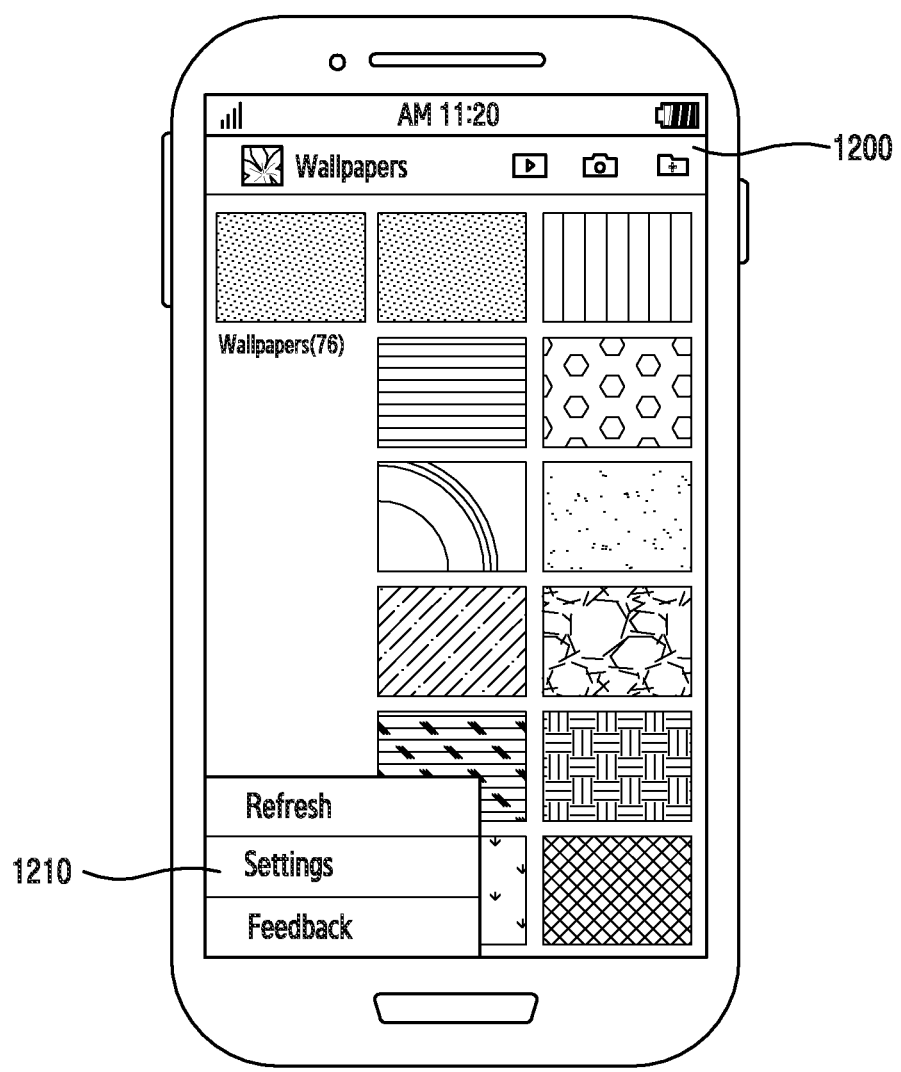
FIGS. 12A, 12B, 12C, 12D, 12E, and 12F illustrate screen configurations in which a first electronic device including one display shares a screen with a second electronic device including a plurality of displays of a first type, according to an embodiment of the present disclosure.

Referring to FIG. 12A, the first electronic device (e.g., the electronic device 100 of FIG. 1) may configure screen configuration information corresponding to screen information displayed on one display thereof to transmit the same to the second electronic device.

The second electronic device may display the screen information of the first electronic device on a plurality of displays (e.g., a main display and an auxiliary display) (first type) for which priorities are set, by using the screen configuration information provided from the first electronic device.

Figure 12B:
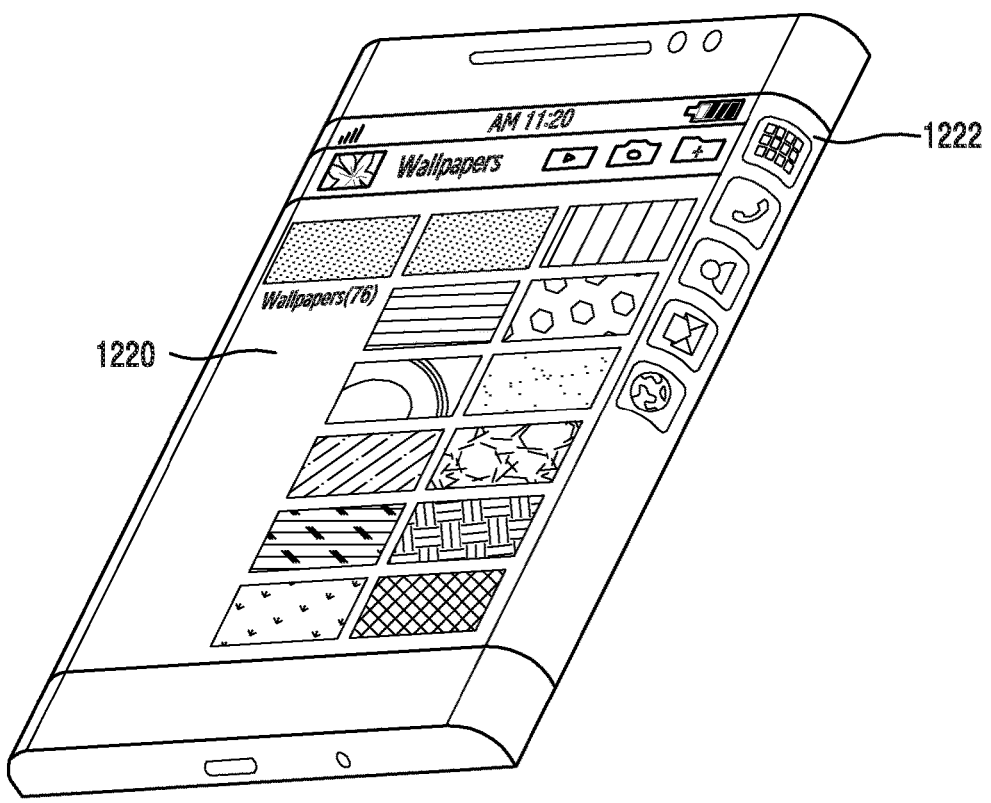

According to an embodiment, referring to FIG. 12B, the second electronic device may display, on the main display, the screen information 1200 (e.g., execution information of a gallery application program) displayed on the display of the first electronic device based on the display method of the second electronic device for screen information sharing (1220). The second electronic device may maintain screen information already displayed on the auxiliary display (1222). For example, the display method of the second electronic device may be determined by at least one of the first and second electronic devices.

Figure 12C:
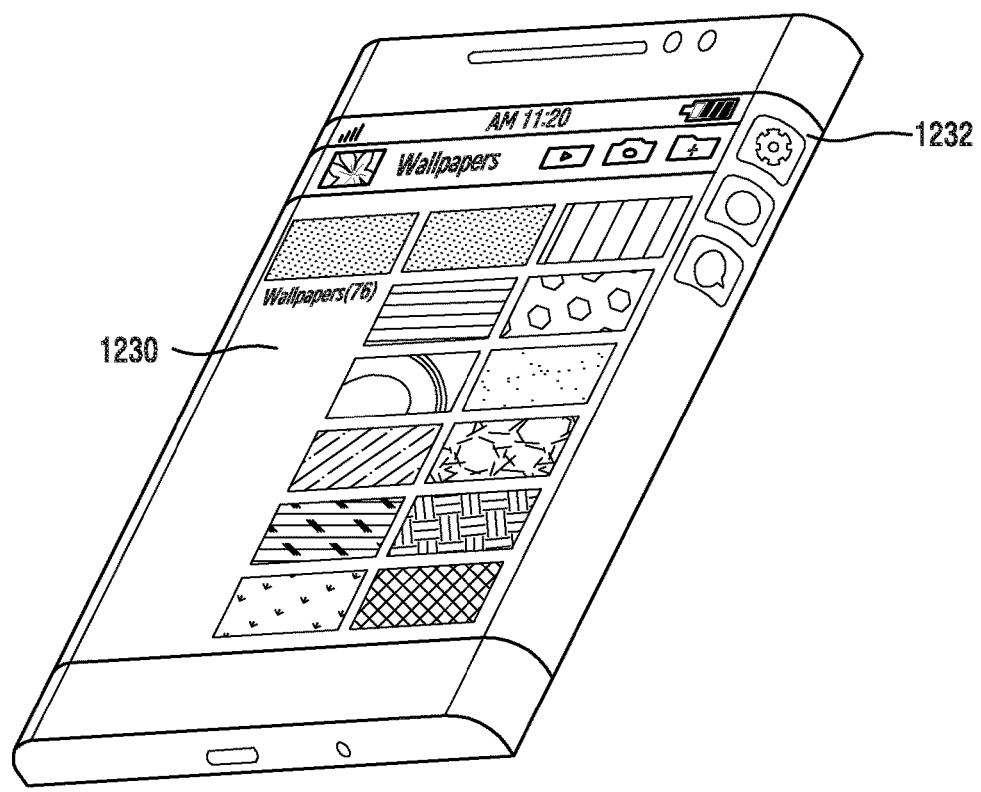

According to an embodiment, referring to FIG. 12C, the second electronic device may display, on the main display, the screen information 1200 (e.g., execution information of the gallery application program) displayed on the display of the first electronic device based on the display method of the second electronic device for screen information sharing (1230). The second electronic device may display additional information 1210 (e.g., menu information) relating to the screen information 1200 displayed on the display of the first electronic device on the auxiliary display (1232).

Figure 12D:
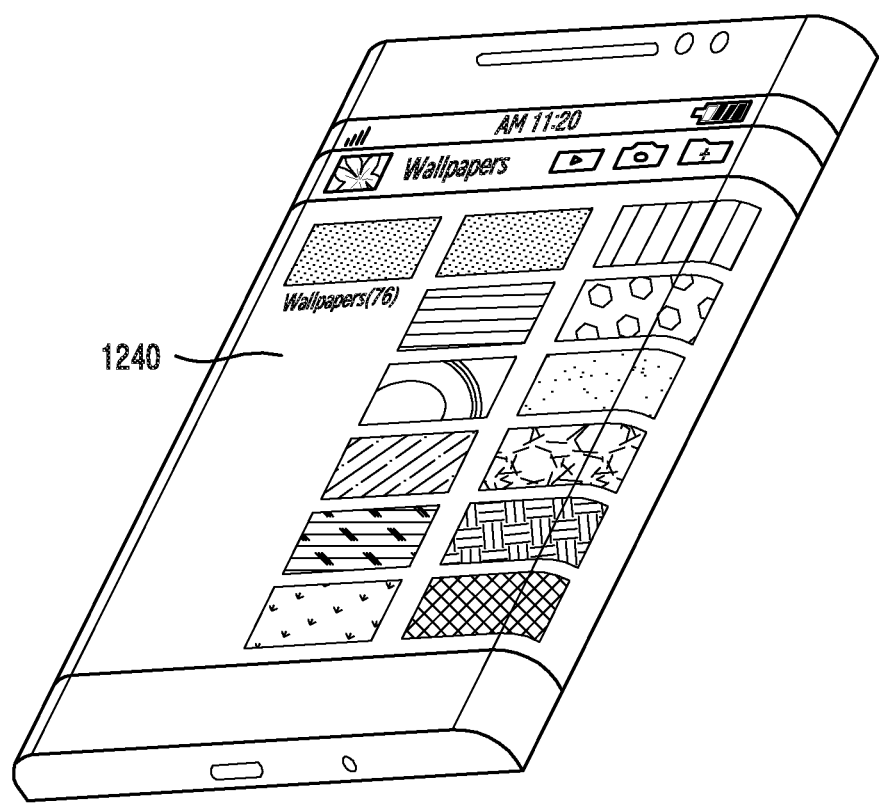

According to an embodiment, referring to FIG. 12D, the second electronic device may display, on the main display and the auxiliary display, the screen information 1200 (e.g., execution information of the gallery application program) displayed on the display of the first electronic device based on the display method of the second electronic device for screen information sharing (1240).

Figure 12E:
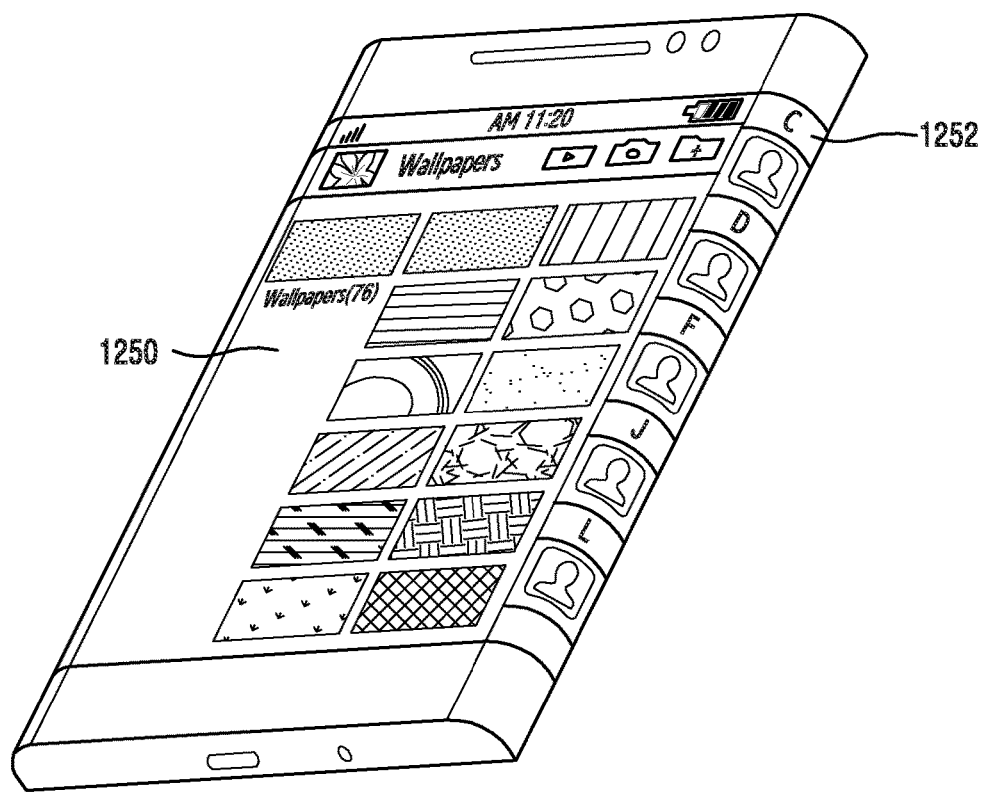

According to an embodiment, referring to FIG. 12E, the second electronic device may display, on the main display, the screen information 1200 (e.g., execution information of the gallery application program) displayed on the display of the first electronic device based on the display method of the second electronic device for screen information sharing (1250). The second electronic device may display screen information (e.g., execution information of a phone book application program) relating to an application program being reproduced in the background of the first electronic device on the auxiliary display (1252).

Figure 12F:
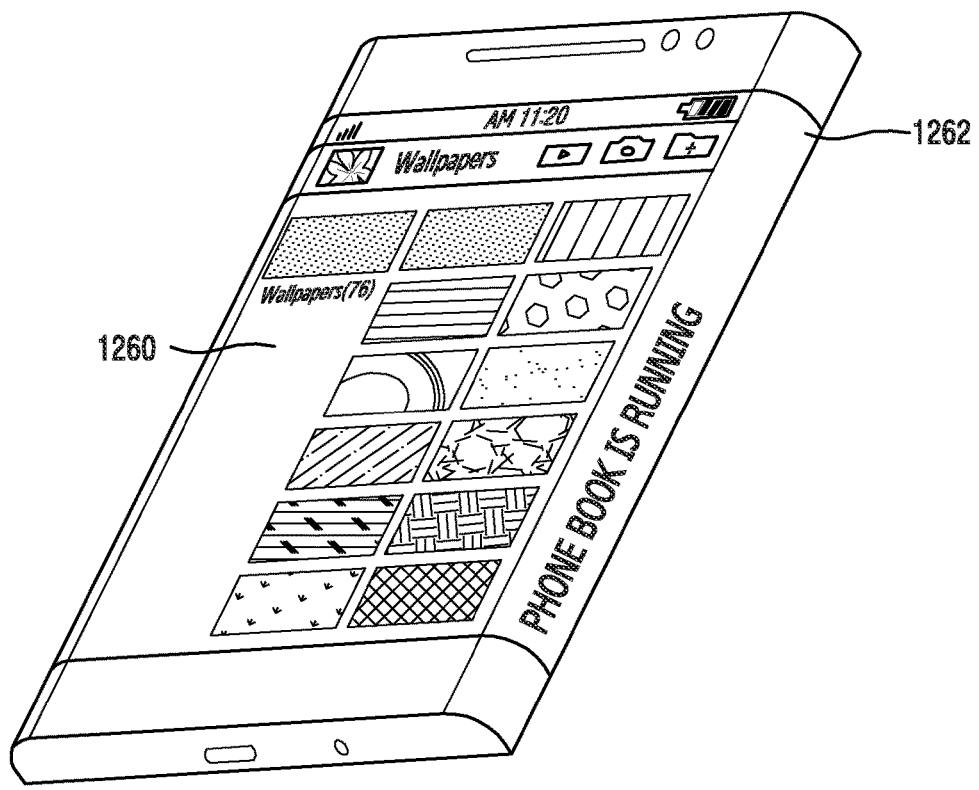

According to an embodiment, referring to FIG. 12F, the second electronic device may display, on the main display, the screen information 1200 (e.g., execution information of the gallery application program) displayed on the display of the first electronic device based on the display method of the second electronic device for screen information sharing (1260). The second electronic device may display execution information (e.g., "phone book is running") of an application program being reproduced in the background of the first electronic device on the auxiliary display (1262).

FIGS. 13A to 13D illustrate screen configurations in which a first electronic device including one display shares a screen with a second electronic device including a plurality of displays of a second type, according to an embodiment of the present disclosure.

Using screen configuration information provided from the first electronic device including one display as illustrated in FIG. 12A, the second electronic device may display the screen information of the first electronic device on each of a plurality of displays (e.g., a first display and a second display) (second type) for which priorities are not set.

Figure 13A:
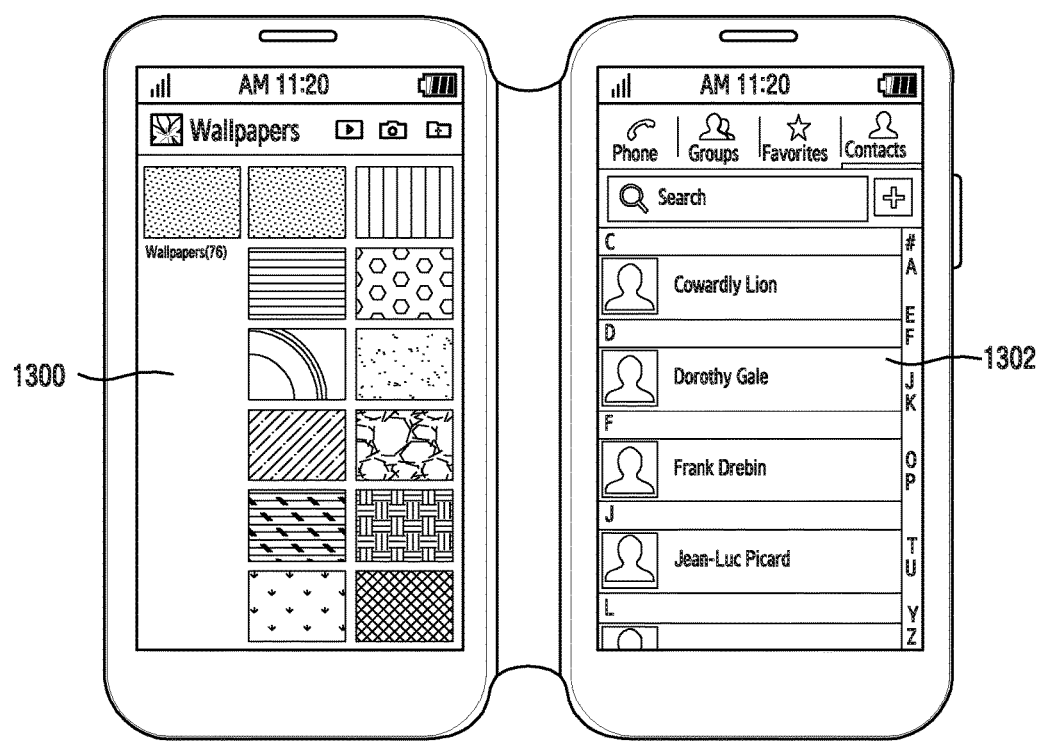
FIGS. 13A, 13B, 13C, and 13D illustrate screen configurations in which a first electronic device including one display shares a screen with a second electronic device including a plurality of displays of a second type, according to an embodiment of the present disclosure.

According to an embodiment, referring to FIG. 13A, the second electronic device may display, on a first display, the screen information 1200 (e.g., execution information of the gallery application program) displayed on the display of the first electronic device based on the display method of the second electronic device for screen information sharing (1300). The second electronic device may display screen information (e.g., execution information of a phone book application program) relating to an application program being reproduced in the background of the first electronic device on the second display (1302).

Figure 13B:
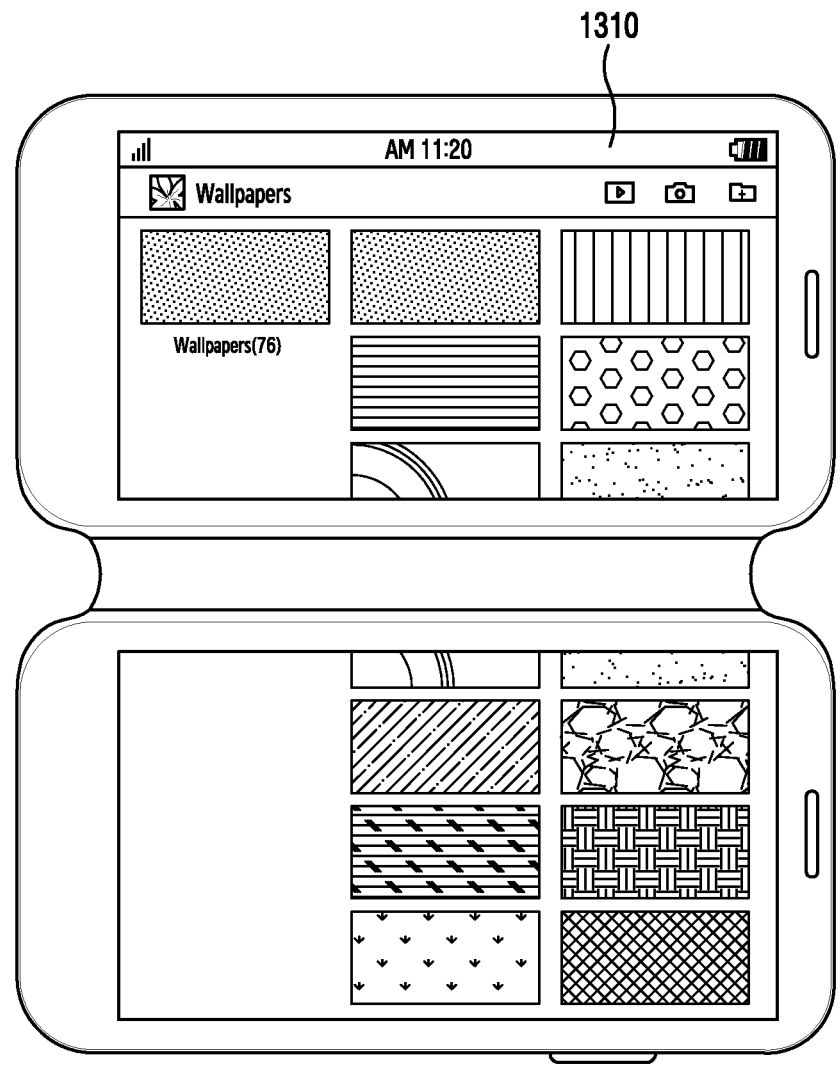

According to an embodiment, referring to FIG. 13B, the second electronic device may display, on the first and second displays, the screen information 1200 (e.g., execution information of the gallery application program) displayed on the display of the first electronic device based on the display method of the second electronic device for screen information sharing (1310).

Figure 13C:
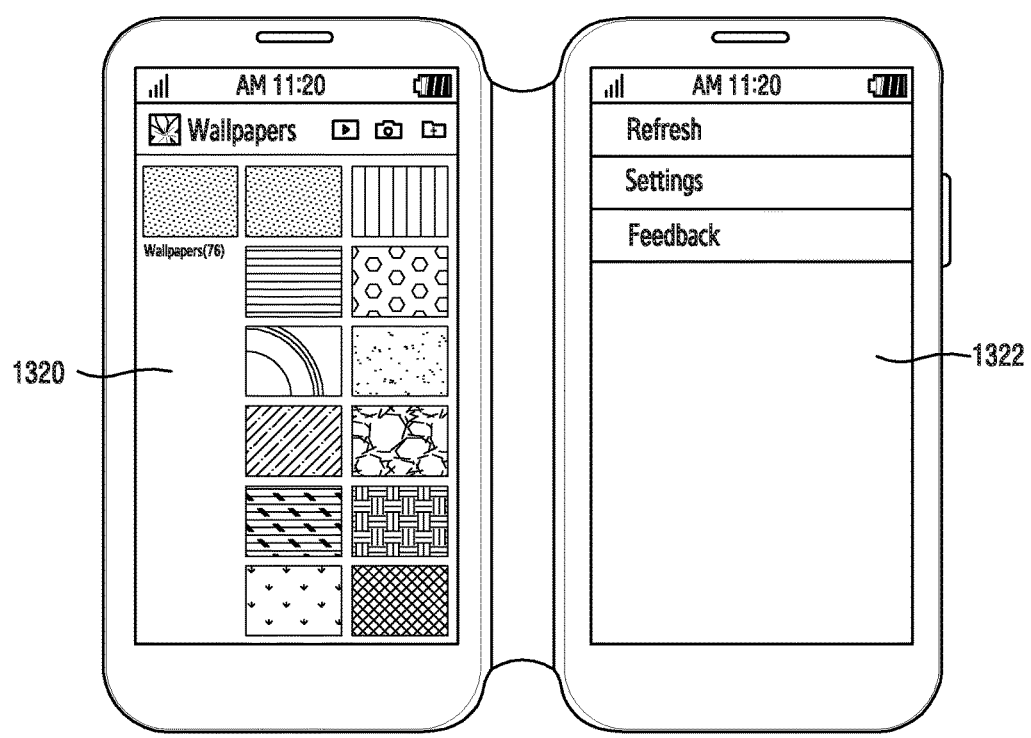

According to an embodiment, referring to FIG. 13C, the second electronic device may display, on the first display, the screen information 1200 (e.g., execution information of the gallery application program) displayed on the display of the first electronic device based on the display method of the second electronic device for screen information sharing (1320). The second electronic device may display, on the second display, additional information 1210 (e.g., menu information) relating to the screen information 1200 displayed on the display of the first electronic device (1322).

Figure 13D:
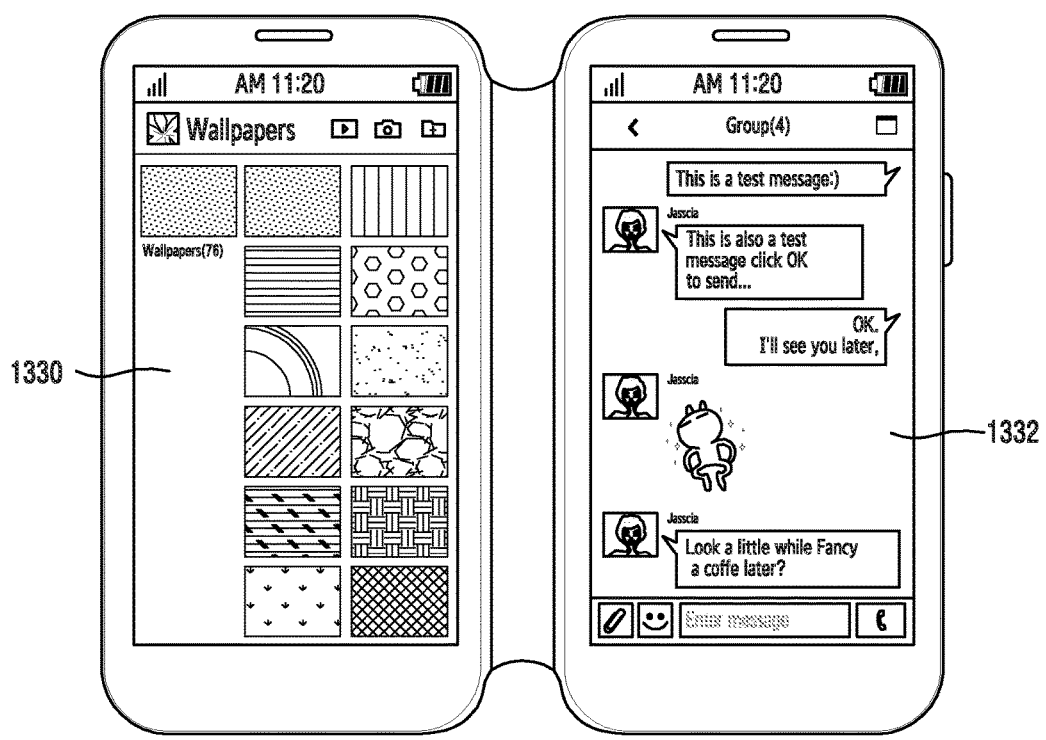

According to an embodiment, referring to FIG. 13D, the second electronic device may display, on the main display, the screen information 1200 (e.g., execution information of the gallery application program) displayed on the display of the first electronic device based on the display method of the second electronic device for screen information sharing (1330). The second electronic device may maintain screen information (e.g., execution information of a messenger application program) already displayed on the second display (1332).

FIGS. 14A to 14E illustrate screen configurations in which a first electronic device including one display shares a screen with a second electronic device including a plurality of displays of a third type, according to an embodiment of the present disclosure.

Using screen configuration information provided from the first electronic device including one display as illustrated in FIG. 12A, the second electronic device may display the screen information of the first electronic device on each of a plurality of displays of a third type for which priorities are set.

Figure 14A:
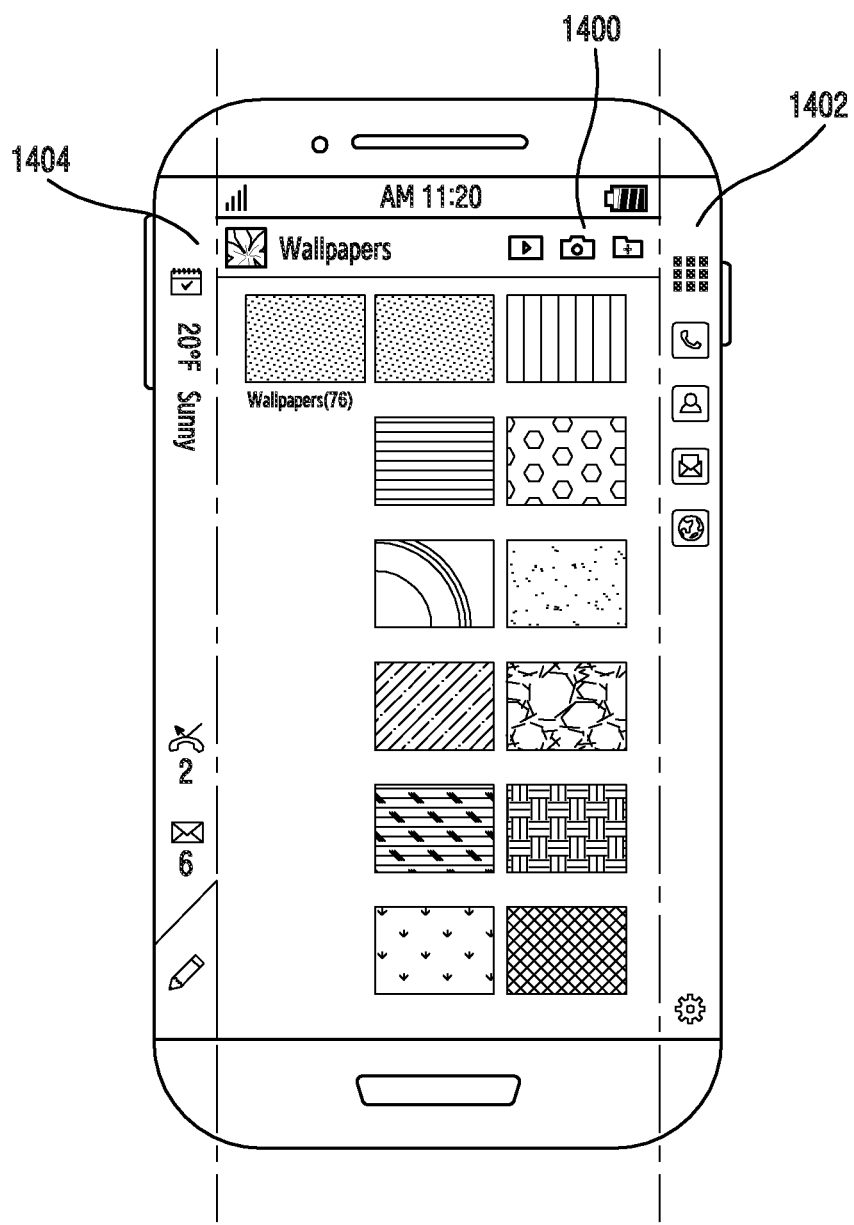
FIGS. 14A, 14B, 14C, 14D, and 14E illustrate screen configurations in which a first electronic device including one display shares a screen with a second electronic device including a plurality of displays of a third type, according to an embodiment of the present disclosure.

According to an embodiment, referring to FIG. 14A, the second electronic device may display, on the main display, the screen information 1200 (e.g., execution information of the gallery application program) displayed on the display of the first electronic device based on the display method of the second electronic device for screen information sharing (1400). The second electronic device may maintain screen information already displayed on first and second auxiliary displays (1402 and 1404). For example, the order of the plurality of auxiliary displays may be changed.

Figure 14B:
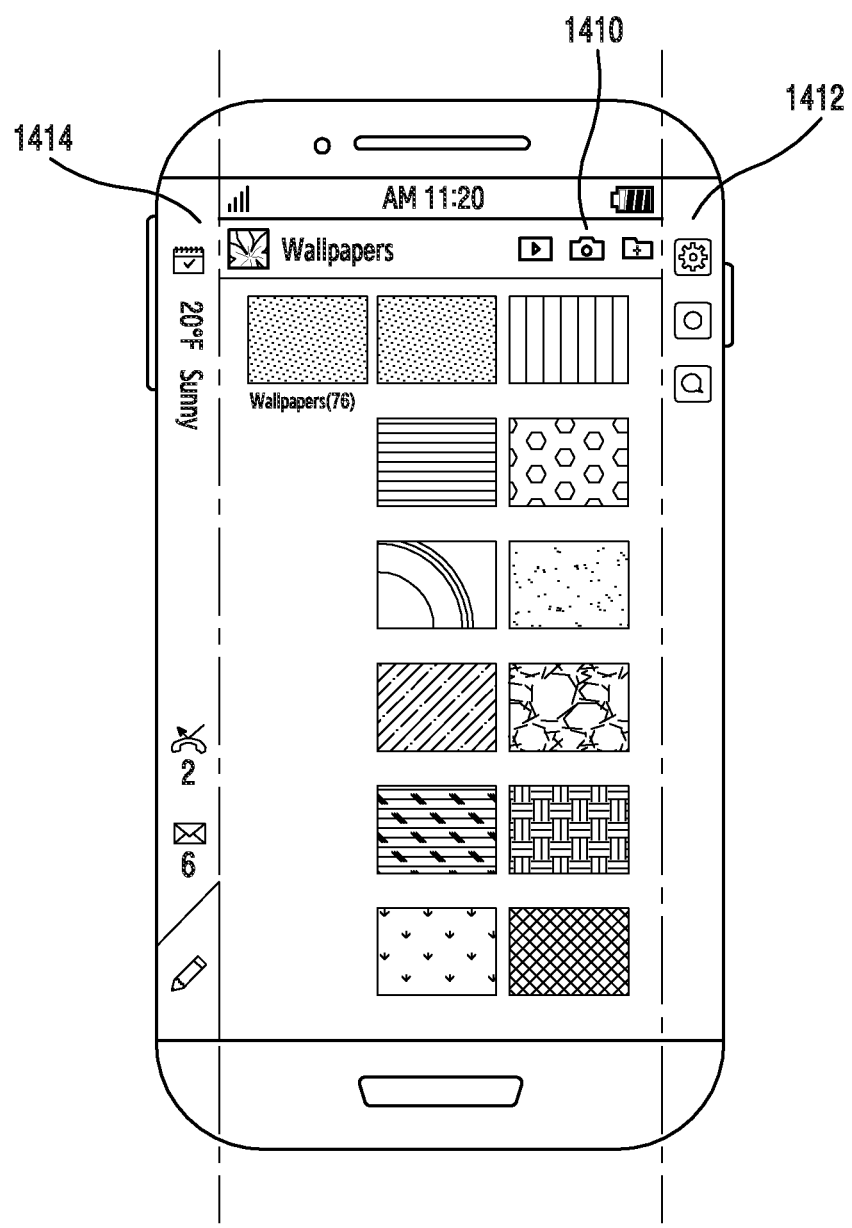

According to an embodiment, referring to FIG. 14B, the second electronic device may display, on the main display, the screen information 1200 (e.g., execution information of a gallery application program) displayed on the display of the first electronic device based on the display method of the second electronic device for screen information sharing (1410). The second electronic device may display, on the first auxiliary display, additional information 1210 (e.g., menu information) relating to the screen information 1200 displayed on the display of the first electronic device (1412). The second electronic device may maintain screen information already displayed on the second auxiliary display (1414).

Figure 14C:
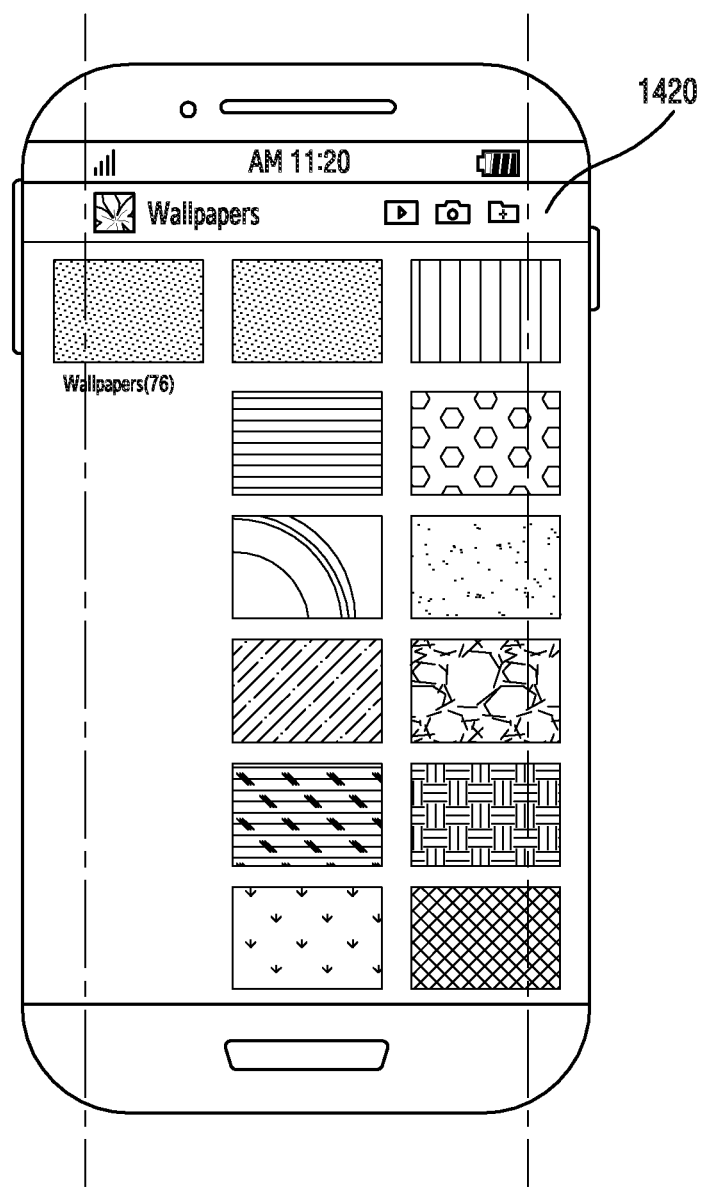

According to an embodiment, referring to FIG. 14C, the second electronic device may display, on a main display and first and second auxiliary displays, the screen information 1200 (e.g., execution information of the gallery application program) displayed on the display of the first electronic device based on the display method of the second electronic device for screen information sharing (1420).

Figure 14D:
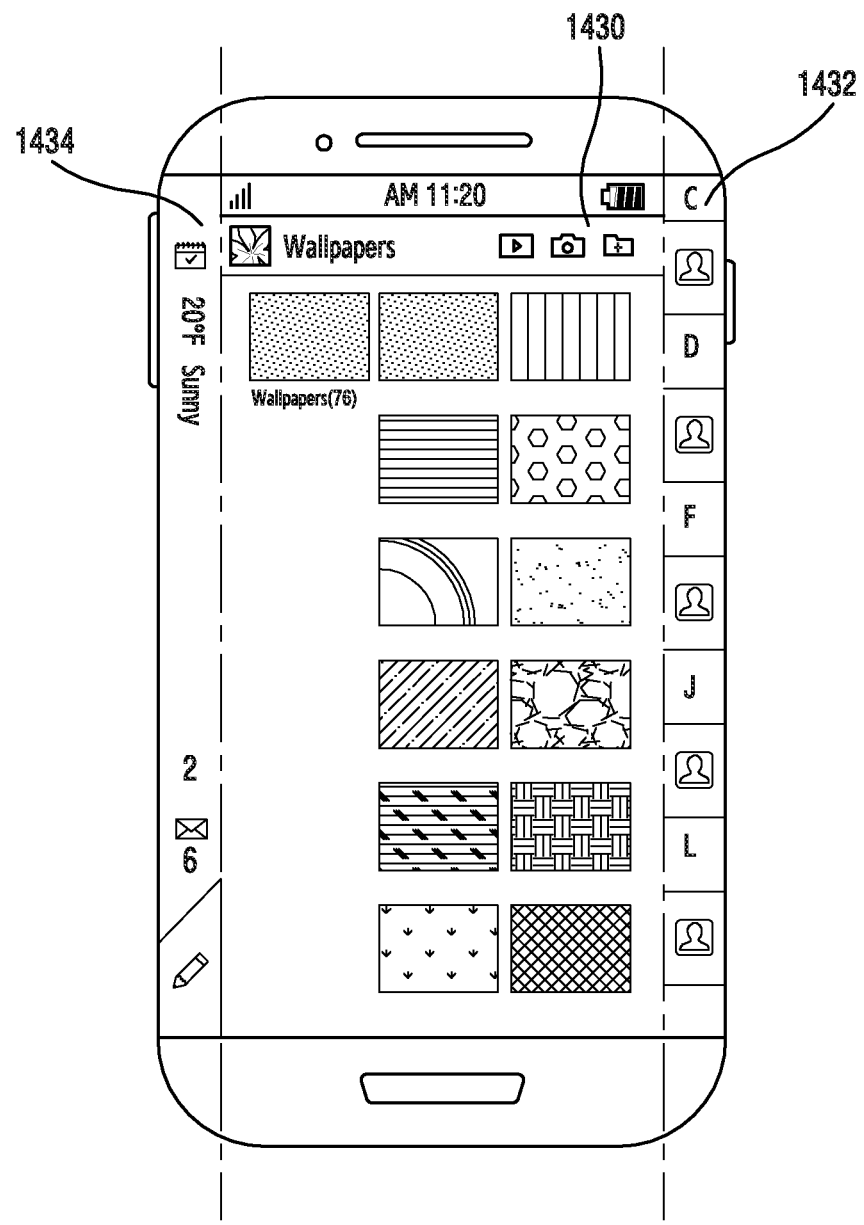

According to an embodiment, referring to FIG. 14D, the second electronic device may display, on the main display, the screen information 1200 (e.g., execution information of the gallery application program) displayed on the display of the first electronic device based on the display method of the second electronic device for screen information sharing (1430). The second electronic device may display, on the first auxiliary display, screen information (e.g., execution information of a phone book application program) relating to an application program being reproduced in the background of the first electronic device (1432). The second electronic device may maintain screen information already displayed on the second auxiliary display (1434). For example, in cases where an application program being reproduced in the background of the first electronic device further exists, the second electronic device may also display, on the second auxiliary display, screen information relating to the application program being reproduced in the background of the first electronic device.

Figure 14E:
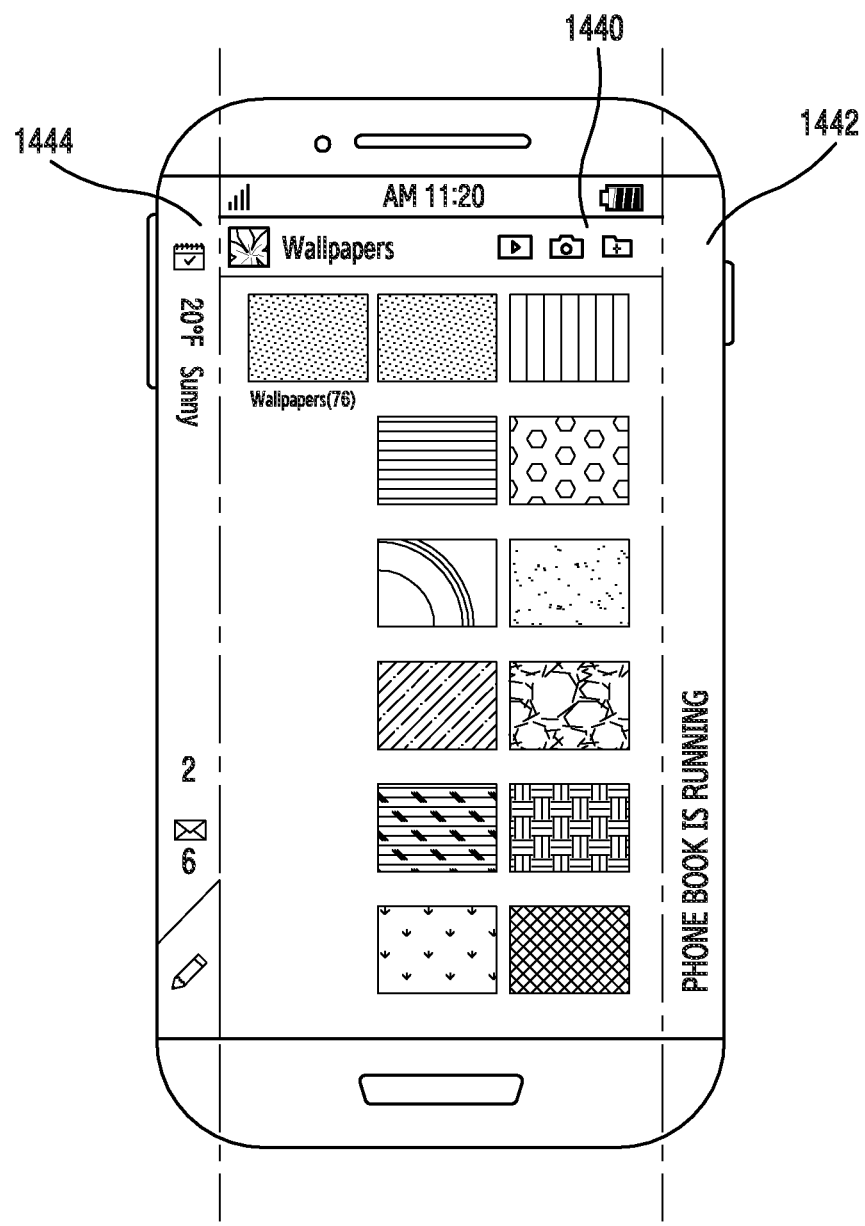

According to an embodiment, referring to FIG. 14E, the second electronic device may display, on the main display, the screen information 1200 (e.g., execution information of the gallery application program) displayed on the display of the first electronic device based on the display method of the second electronic device for screen information sharing (1440). The second electronic device may display, on the first auxiliary display, execution information (e.g., "phone book is running") of an application program being reproduced in the background of the first electronic device (1442). The second electronic device may maintain screen information already displayed on the second auxiliary display (1444). For example, in cases where an application program being reproduced in the background of the first electronic device further exists, the second electronic device may also display, on the second auxiliary display, execution information of the application program being reproduced in the background of the first electronic device.

FIGS. 15A to 15E illustrate screen configurations in which a first electronic device including a plurality of displays of a first type shares a screen with a second electronic device including one display, according to an embodiment of the present disclosure.

Figure 15A:
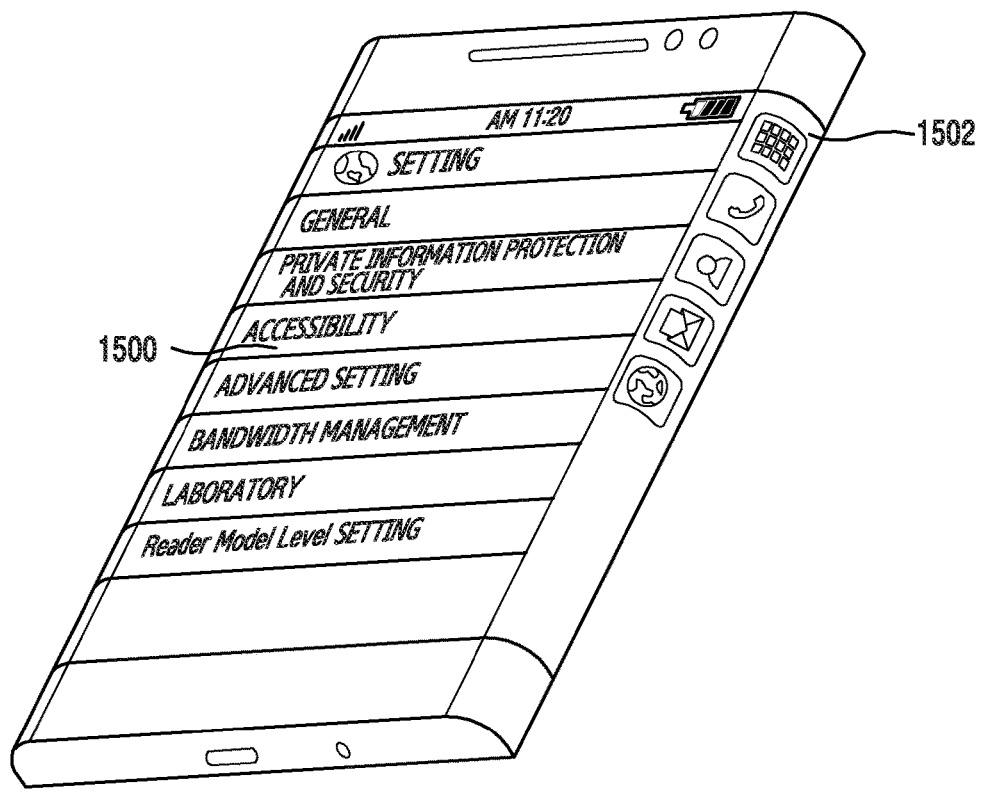
FIGS. 15A, 15B, 15C, 15D, and 15E illustrate screen configurations in which a first electronic device including a plurality of displays of a first type shares a screen with a second electronic device including one display, according to an embodiment of the present disclosure.

Referring to FIG. 15A, the first electronic device (e.g., the electronic device 100 of FIG. 1) may configure screen configuration information corresponding to screen information 1500, 1502 displayed on a plurality of displays of a first type (e.g., a main display and an auxiliary display) for which priorities are set and may transmit the same to the second electronic device.

The second electronic device may display the screen information of the first electronic device on one display thereof using the screen configuration information provided from the first electronic device.

Figure 15B:
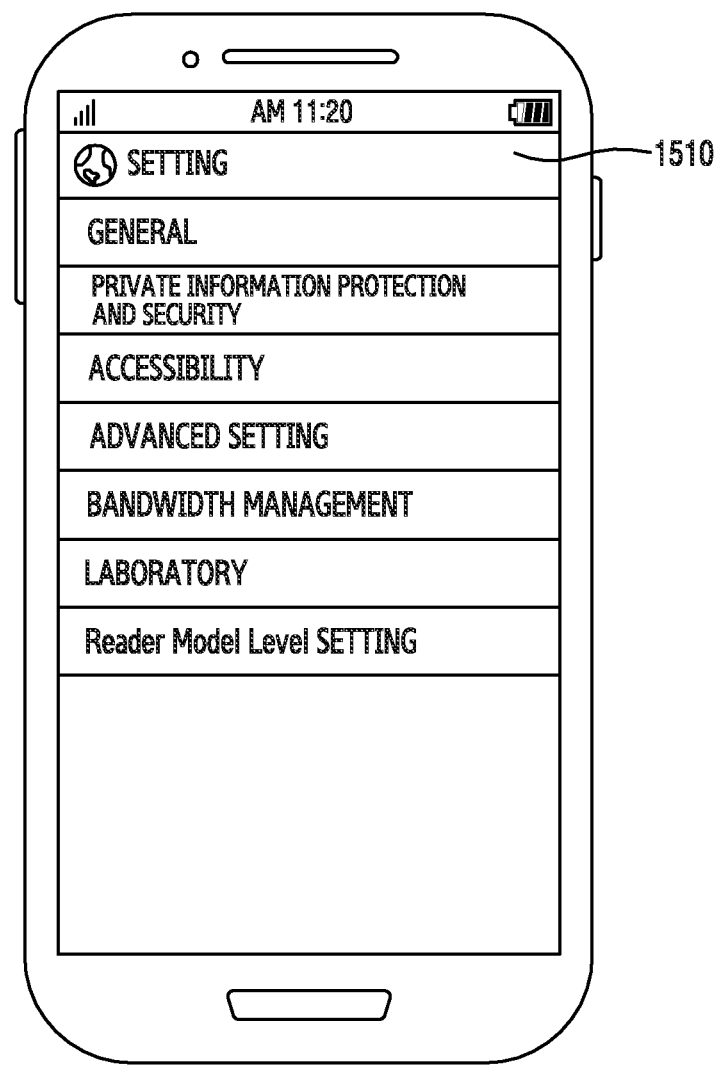

According to an embodiment, referring to FIG. 15B, the second electronic device may display, on the display thereof, the screen information 1500 (e.g., setting menu) displayed on the main display of the first electronic device based on the display method of the second electronic device for screen information sharing (1510).

Figure 15C:
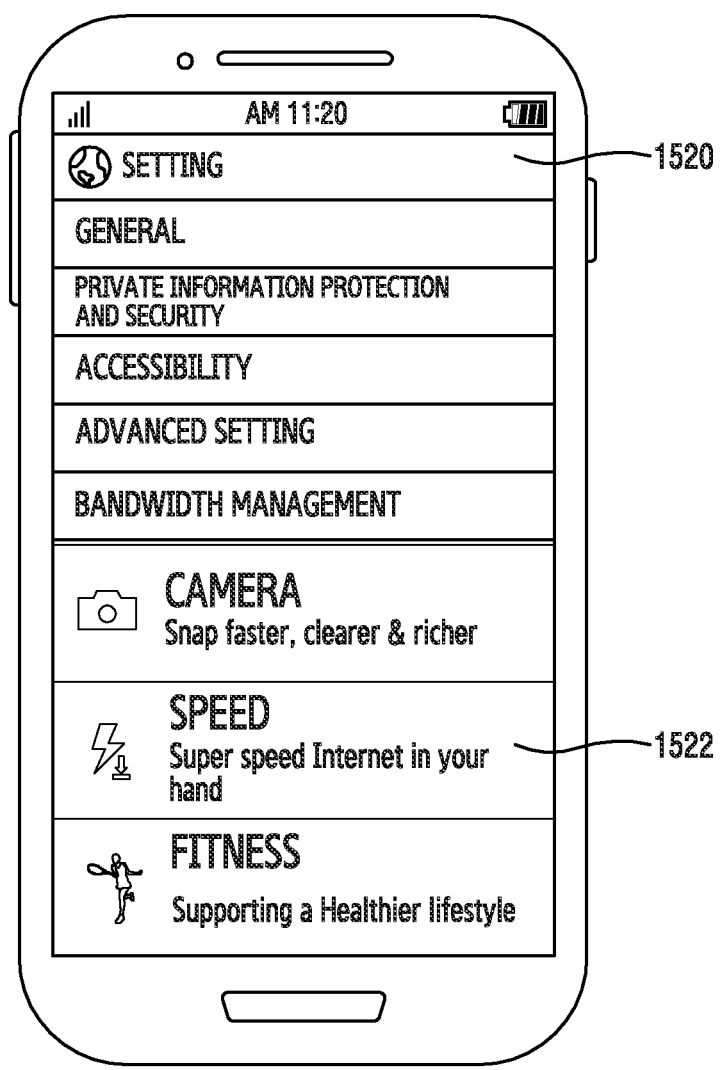

According to an embodiment, referring to FIG. 15C, the second electronic device may divide the display thereof into a plurality of areas based on the display method of the second electronic device for screen information sharing. The second electronic device may display the screen configuration information 1500 (e.g., the setting menu) displayed on the main display of the first electronic device in a first area of the display (1520). The second electronic device may display screen configuration information 1502 (e.g., an application program execution icon) displayed on an auxiliary display of the first electronic device in a second area of the display (1522). For example, the sizes of the first and second areas of the display may be set to be the same as or different from each other.

Figure 15D:
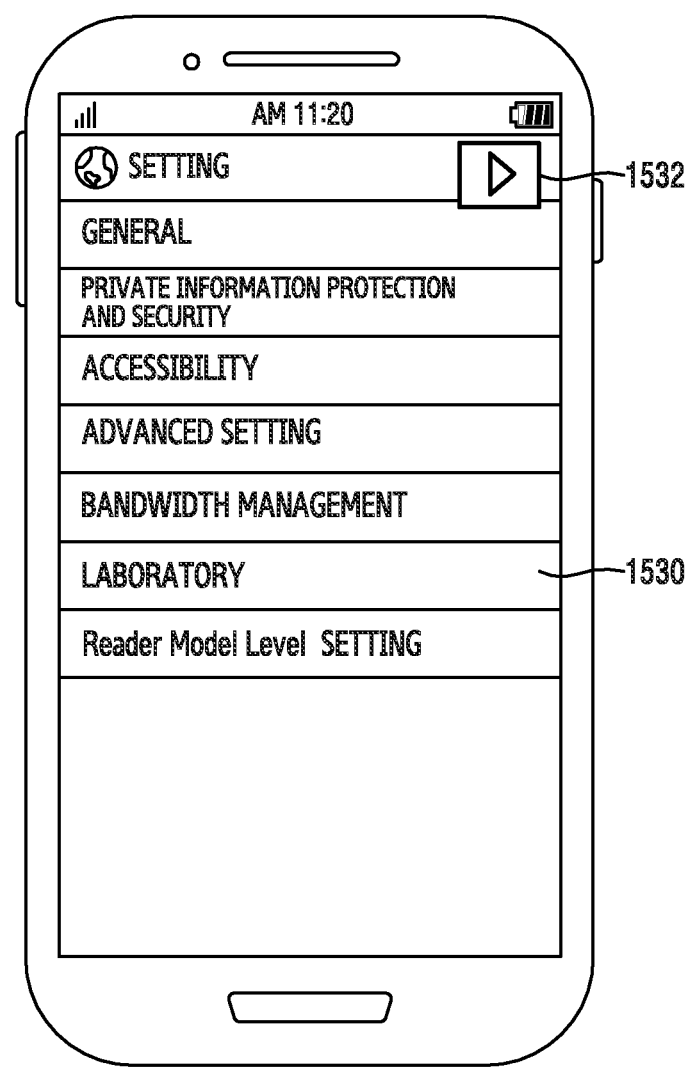

According to an embodiment, referring to FIG. 15D, the second electronic device may display, on the display thereof, the screen configuration information 1500 (e.g., setting menu) displayed on the main display of the first electronic device based on the display method of the second electronic device for screen information sharing (1530). The second electronic device may display a first icon 1532, representing that screen information displayed on the auxiliary display of the first electronic device exists, in at least a partial area of the display.

Figure 15E:
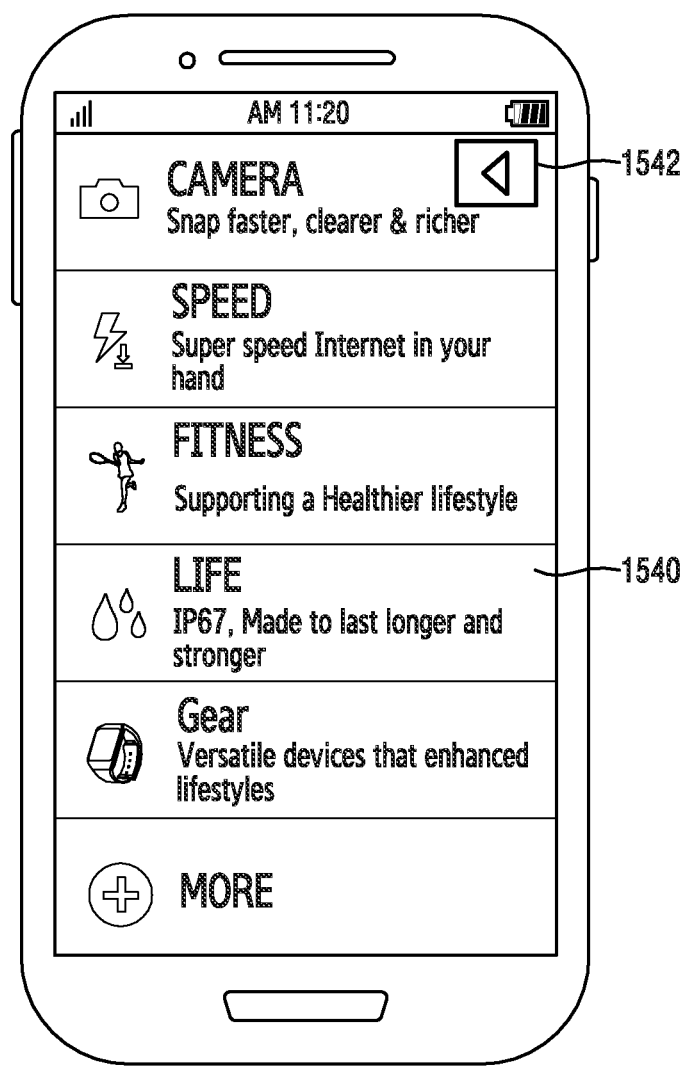

According to an embodiment, when the selection of the first icon 1532 is detected in FIG. 15D, as illustrated in FIG. 15E, the second electronic device may display, on the display thereof, the screen information 1502 (e.g., the application program execution icon) displayed on the auxiliary display of the first electronic device (1540). The second electronic device may display a second icon 1542, representing that screen information displayed on the main display of the first electronic device exists, in at least a partial area of the display.

According to an embodiment, when the selection of the second icon 1532 is detected in FIG. 15E, the second electronic device may display, as illustrated in FIG. 15D, the screen information 1500 (e.g., the setting menu) displayed on the main display of the first electronic device on the display thereof and may display the first icon 1532 in at least a partial area of the display.

Figure 16A:
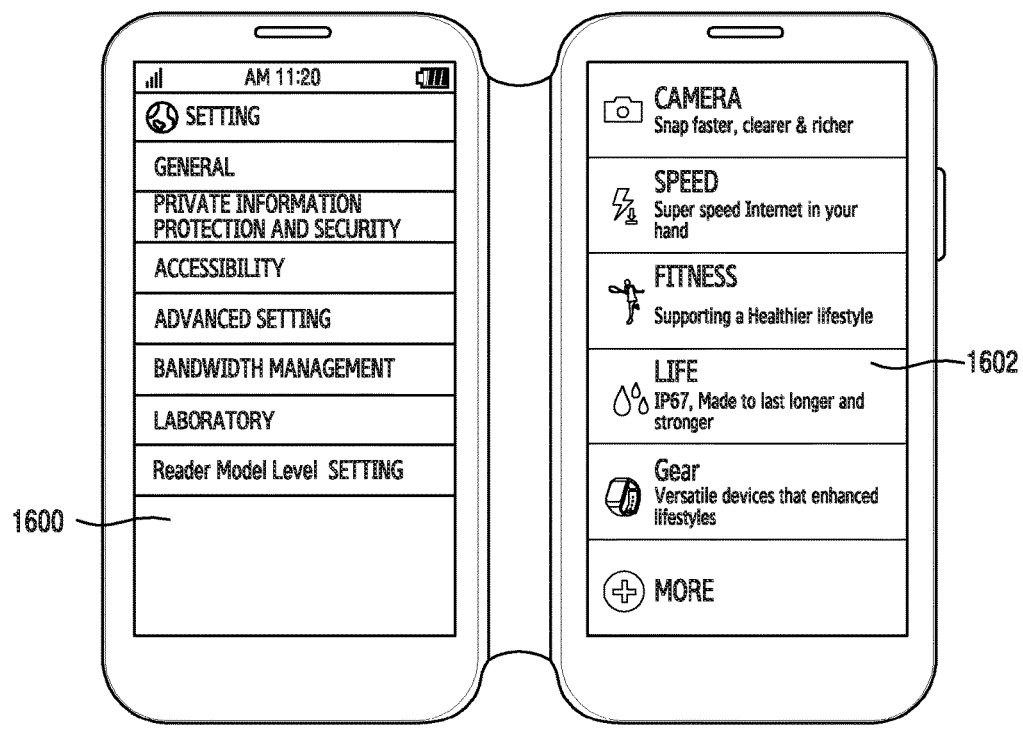
FIGS. 16A and 16B illustrate screen configurations in which electronic devices including a plurality of different types of displays share a screen, according to an embodiment of the present disclosure.
Figure 16B:
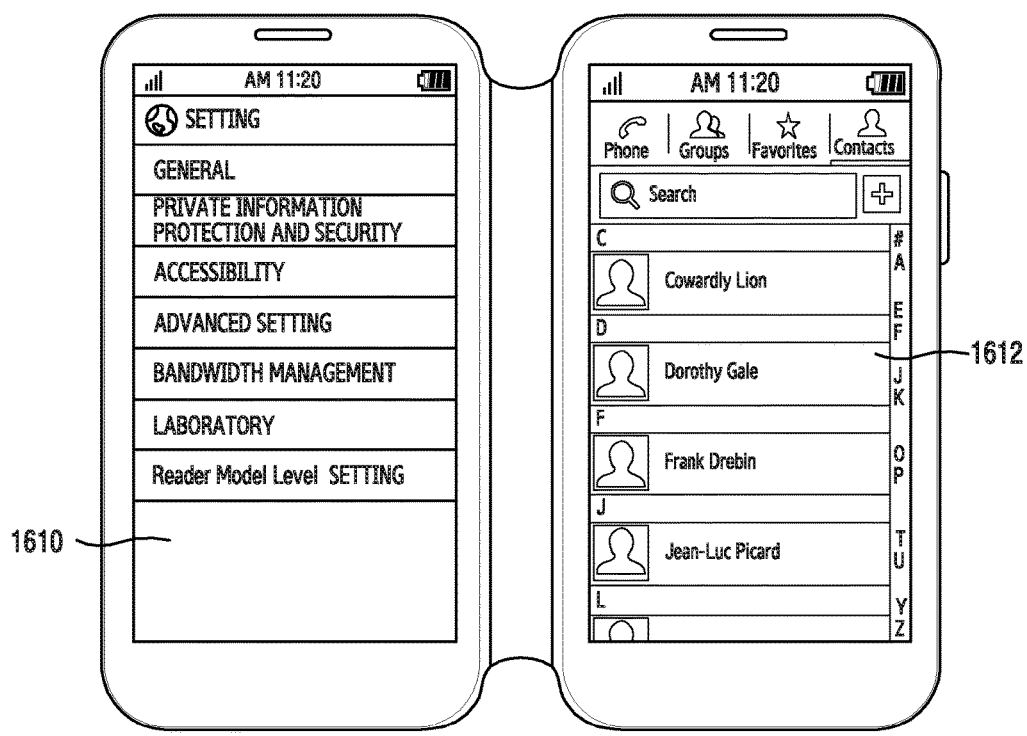

FIGS. 16A and 16B illustrate screen configurations in which electronic devices including a plurality of different types of displays share a screen, according to an embodiment of the present disclosure.

Using screen configuration information provided from a first electronic device including a plurality of displays of a first type for which priorities are set as illustrated in FIG. 15A, a second electronic device may display the screen information of the first electronic device on a plurality of displays of a second type (e.g., a first display and a second display) for which priorities are not set.

According to an embodiment, referring to FIG. 16A, the second electronic device may display, on a first display, the screen information 1500 (e.g., setting menu) displayed on the main display of the first electronic device based on the display method of the second electronic device for screen information sharing (1600). The second electronic device may display, on a second display, screen configuration information 1502 (e.g., an application program execution icon) displayed on an auxiliary display of the first electronic device (1602).

According to an embodiment, referring to FIG. 16B, the second electronic device may display, on the first display, one of the screen information displayed on a main display and an auxiliary display of the first electronic device (e.g., setting menu 1500 displayed on the main display) based on the display method of the second electronic device for screen information sharing (1610). The second electronic device may maintain screen information (e.g., execution information of a phonebook application program) already displayed on the second display (1612). For example, the second electronic device may display, on the first display, screen information with a higher priority (e.g., the screen information of the main display) among the screen information displayed on the main display and the auxiliary display of the first electronic device. For example, the second electronic device may display, on the first display, screen information (e.g., the screen information of the main display) selected by a user among the screen information displayed on the main display and the auxiliary display of the first electronic device. For example, the first electronic device may set screen information displayed on a display selected by input information or a display having a cursor located thereon as the screen information selected by the user.

Figure 17A:
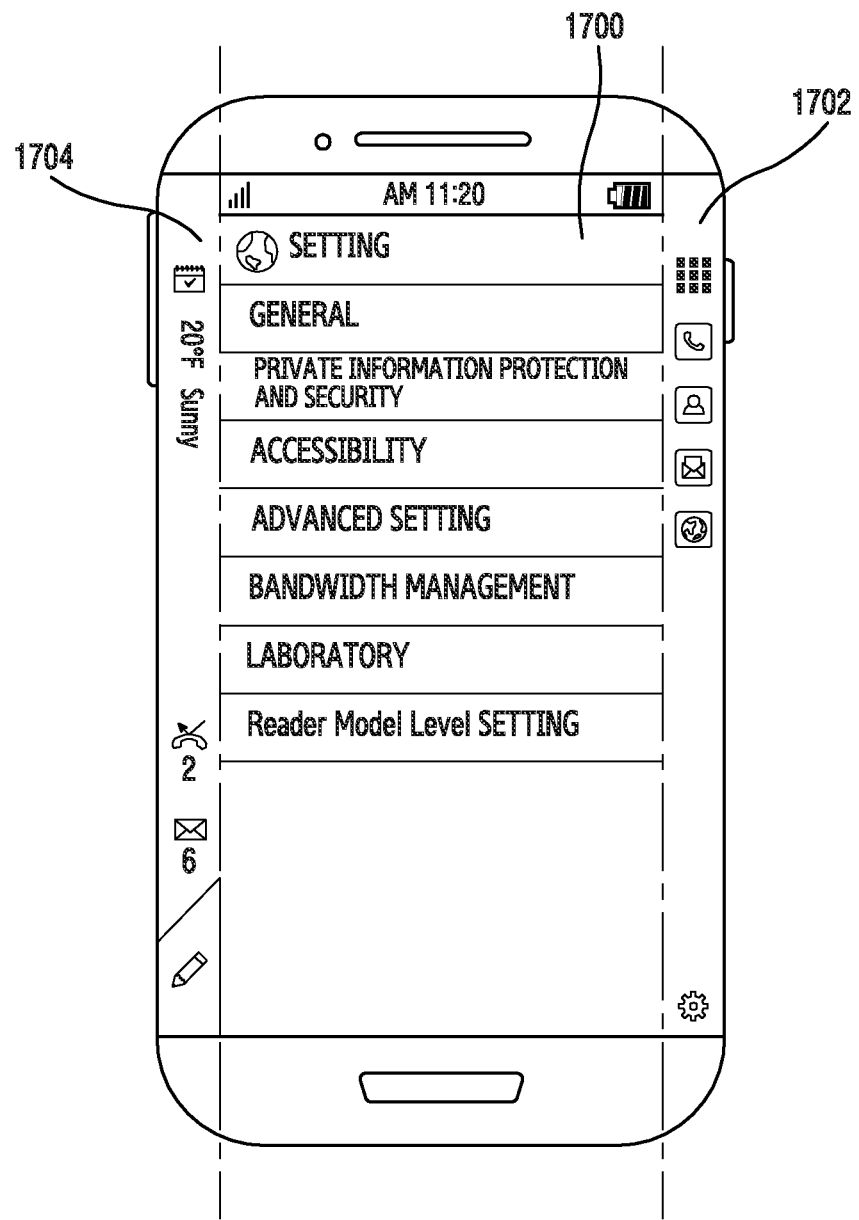
FIGS. 17A and 17B illustrate screen configurations in which electronic devices including a plurality of different types of displays share a screen, according to an embodiment of the present disclosure.
Figure 17B:
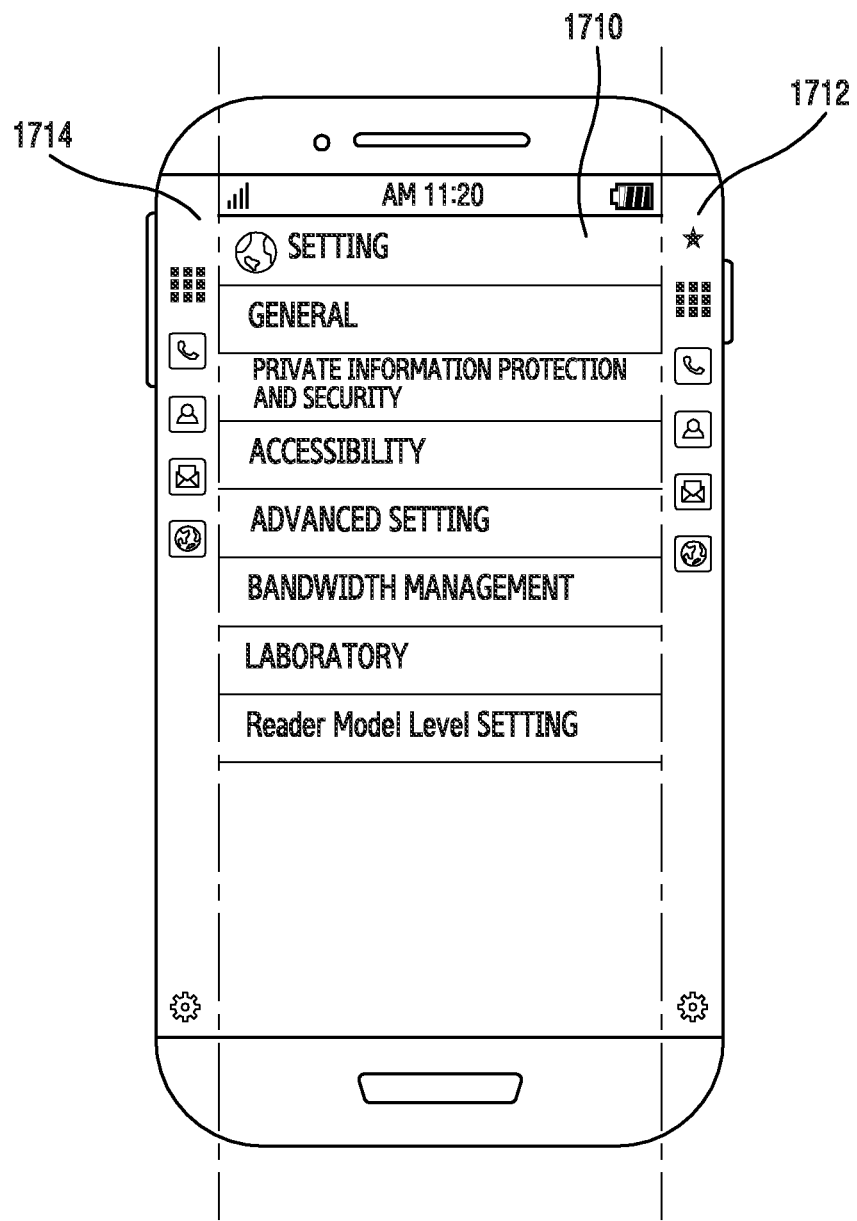

FIGS. 17A and 17B illustrate screen configurations in which electronic devices including a plurality of different types of displays share a screen, according to an embodiment of the present disclosure.

Using screen configuration information provided from a first electronic device including a plurality of displays of a first type for which priorities are set as illustrated in FIG. 15A, a second electronic device may display the screen information of the first electronic device on a plurality of displays of a third type (e.g., a main display and two auxiliary displays) for which priorities are set.

According to an embodiment, referring to FIG. 17A, the second electronic device may display, on a main display, the screen information 1500 (e.g., setting menu) displayed on the main display of the first electronic device based on the display method of the second electronic device for screen information sharing (1700). The second electronic device may display, on a first auxiliary display, screen configuration information 1502 (e.g., an application program execution icon) displayed on an auxiliary display of the first electronic device (1702). The second electronic device may maintain screen information already displayed on the second auxiliary display (1704). For example, in cases where an application program being reproduced in the background of the first electronic device exists, the second electronic device may also display, on the second auxiliary display, execution information or screen information of the application program being reproduced in the background of the first electronic device.

According to an embodiment, referring to FIG. 17B, the second electronic device may display, on the main display thereof, the screen information 1500 (e.g., setting menu) displayed on the main display of the first electronic device based on the display method of the second electronic device for screen information sharing (1710). The second electronic device may display, on a second auxiliary display, screen configuration information 1502 (e.g., an application program execution icon) displayed on an auxiliary display of the first electronic device (1714). The second electronic device may maintain screen information already displayed on the first auxiliary display (1712). For example, in cases where an application program being reproduced in the background of the first electronic device exists, the second electronic device may also display, on the first auxiliary display, execution information or screen information of the application program being reproduced in the background of the first electronic device.

FIGS. 18A to 18E illustrate screen configurations in which a first electronic device including a plurality of displays of a second type shares a screen with a second electronic device including one display, according to an embodiment of the present disclosure.

Figure 18A:
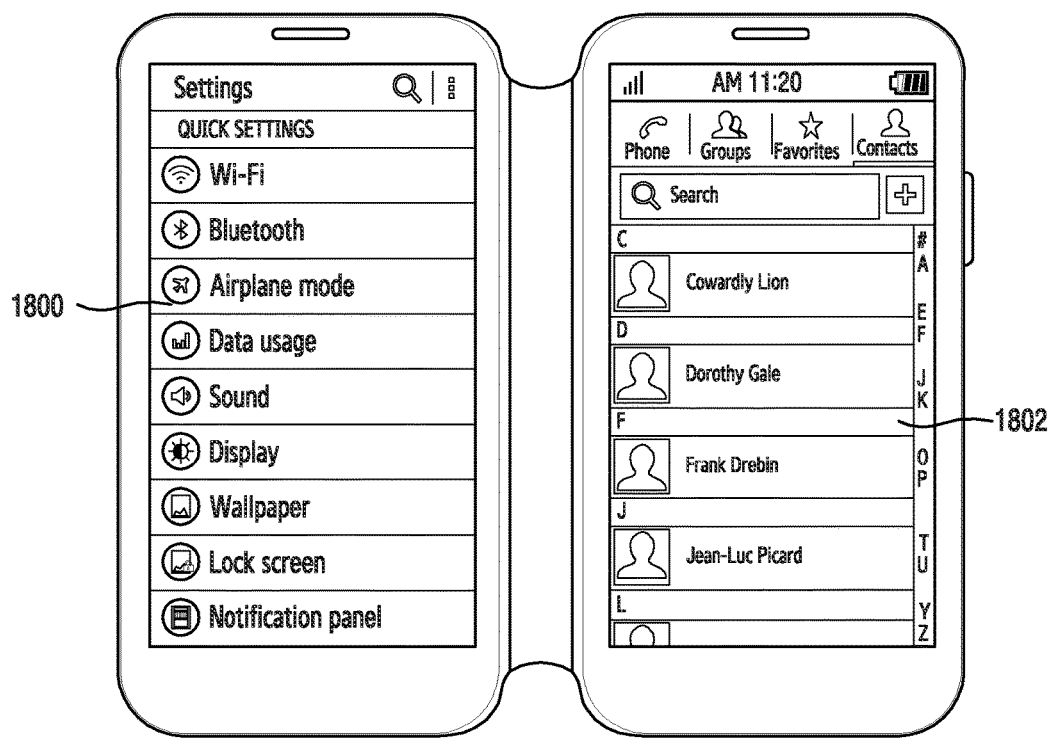
FIGS. 18A, 18B, 18C, 18D, and 18E illustrate screen configurations in which a first electronic device including a plurality of displays of a second type shares a screen with a second electronic device including one display, according to an embodiment of the present disclosure.

Referring to FIG. 18A, the first electronic device (e.g., the electronic device 100 of FIG. 1) may configure screen configuration information corresponding to screen information displayed on a plurality of displays of a second type (e.g., first and second displays) for which priorities are not set and may transmit the same to the second electronic device.

The second electronic device may display the screen information of the first electronic device on one display thereof using the screen configuration information provided from the first electronic device.

Figure 18B:
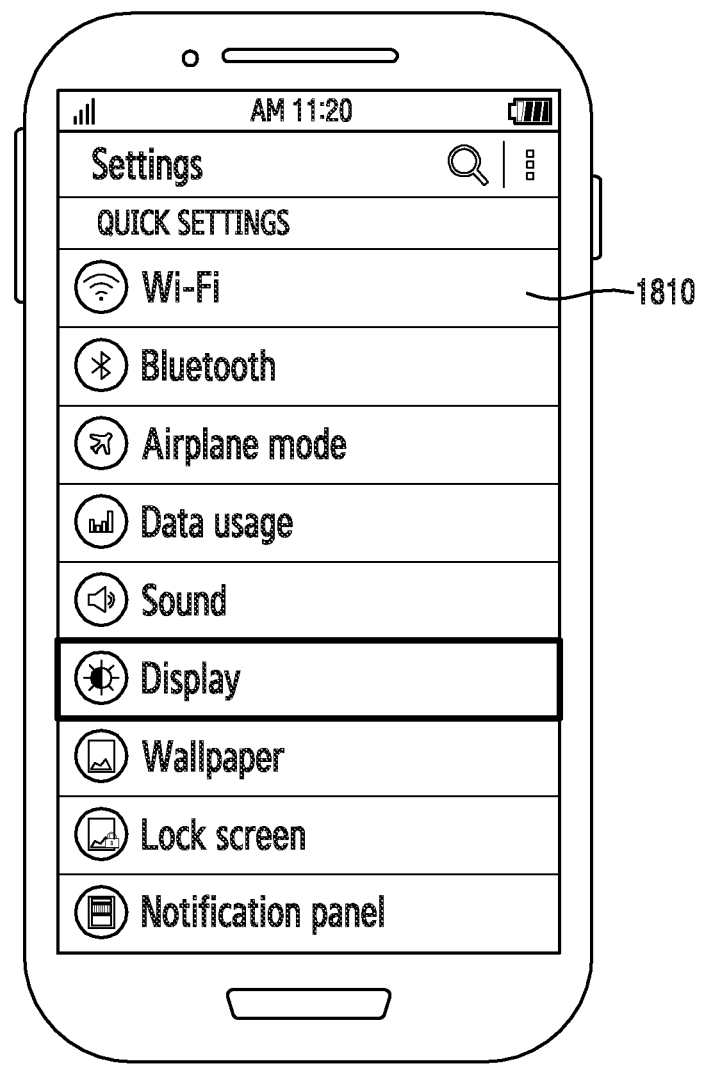

According to an embodiment, referring to FIG. 18B, the second electronic device may display, on the display thereof, the screen information 1800 (e.g., setting menu) displayed on the first display of the first electronic device based on the display method of the second electronic device for screen information sharing (1810).

Figure 18C:
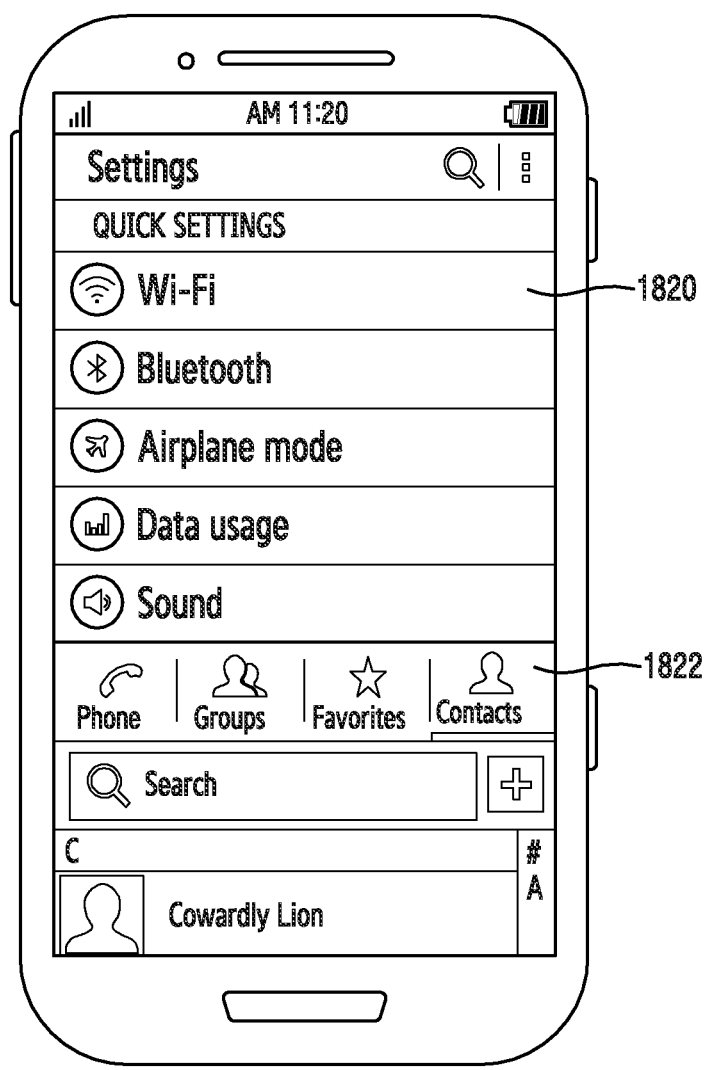

According to an embodiment, referring to FIG. 18C, the second electronic device may divide the display thereof into a plurality of areas based on the display method of the second electronic device for screen information sharing. The second electronic device may display the screen configuration information 1800 (e.g., the setting menu) displayed on the first display of the first electronic device in a first area of the display (1820). The second electronic device may display screen configuration information 1802 (e.g., execution information of a phonebook application program) displayed on the second display of the first electronic device in a second area of the display (1822). For example, the sizes of the first and second areas of the display may be set to be the same as or different from each other.

Figure 18D:
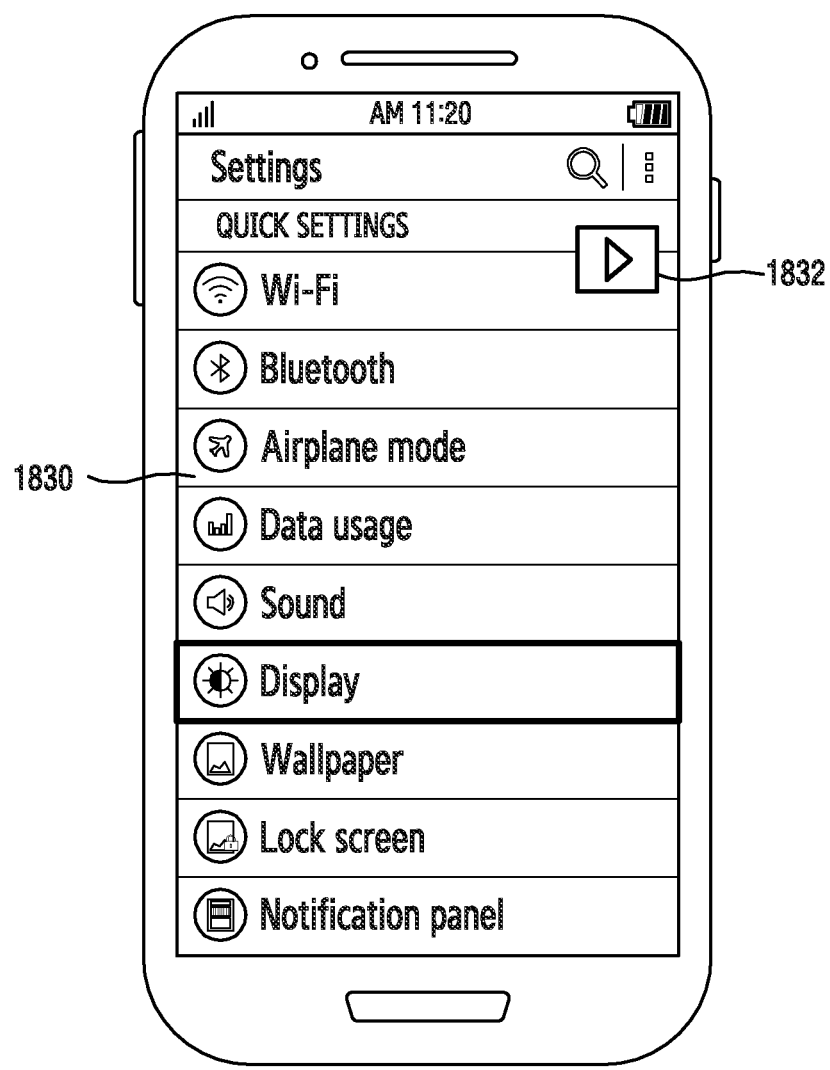

According to an embodiment, referring to FIG. 18D, the second electronic device may display, on the display thereof, the screen information 1800 (e.g., setting menu) displayed on the first display of the first electronic device based on the display method of the second electronic device for screen information sharing (1830). The second electronic device may display a first icon 1832, representing that screen information displayed on the second display of the first electronic device exists, in at least a partial area of the display.

Figure 18E:
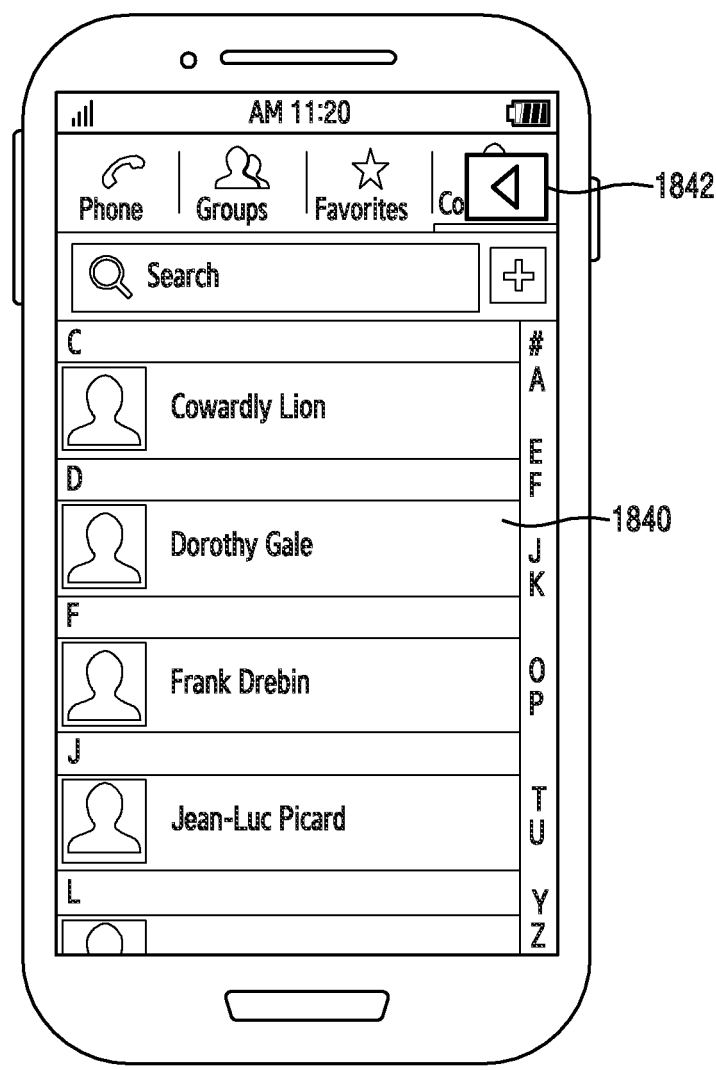

According to an embodiment, when the selection of the first icon 1832 is detected in FIG. 18D, the second electronic device may display, on the display thereof, the screen information 1802 (e.g., the execution information of the phonebook application program) displayed on the second display of the first electronic device (1840) as illustrated in FIG. 18E (1840). The second electronic device may display a second icon 1842, representing that screen information displayed on the first display of the first electronic device exists, in at least a partial area of the display.

According to an embodiment, when the selection of the second icon 1842 is detected in FIG. 18E, the second electronic device may display, on the display thereof, the screen information 1800 (e.g., the setting menu) displayed on the first display of the first electronic device and may display the first icon 1832 in at least a partial area of the display as illustrated in FIG. 18D.

According to an embodiment, the second electronic device may select one of an audio signal corresponding to the first display of the first electronic device and an audio signal corresponding to the second display to reproduce the selected audio signal.

According to an embodiment, the second electronic device may mix the audio signal corresponding to the first display of the first electronic device and the audio signal corresponding to the second display to reproduce the mixed audio signal.

Figure 19A:
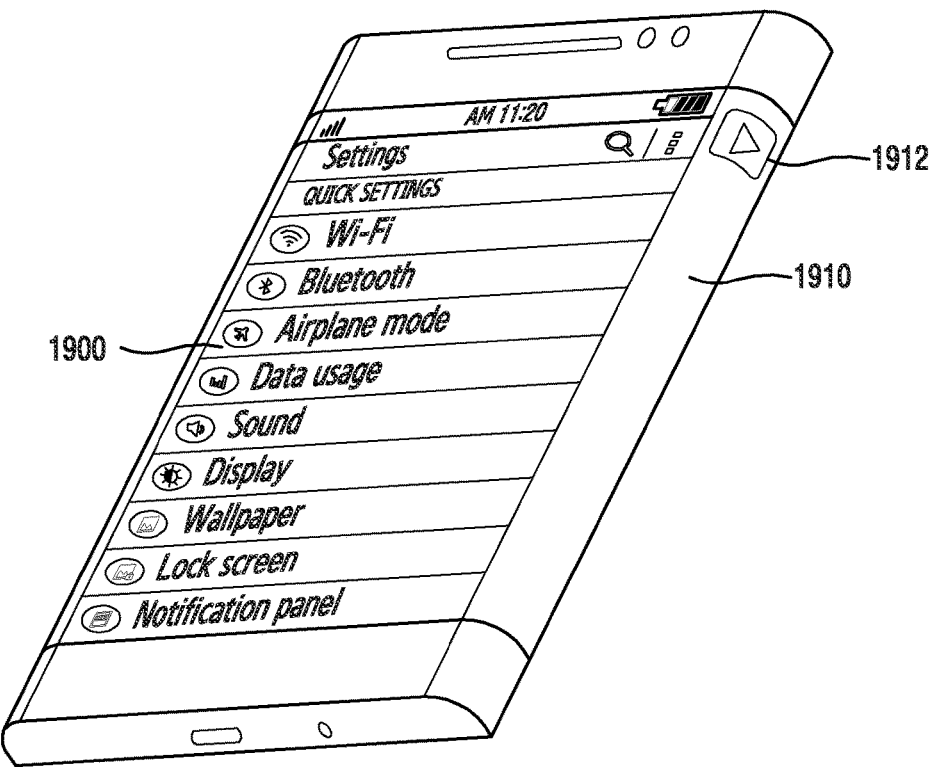
FIGS. 19A and 19B illustrate screen configurations in which electronic devices including a plurality of different types of displays share a screen, according to an embodiment of the present disclosure.
Figure 19B:
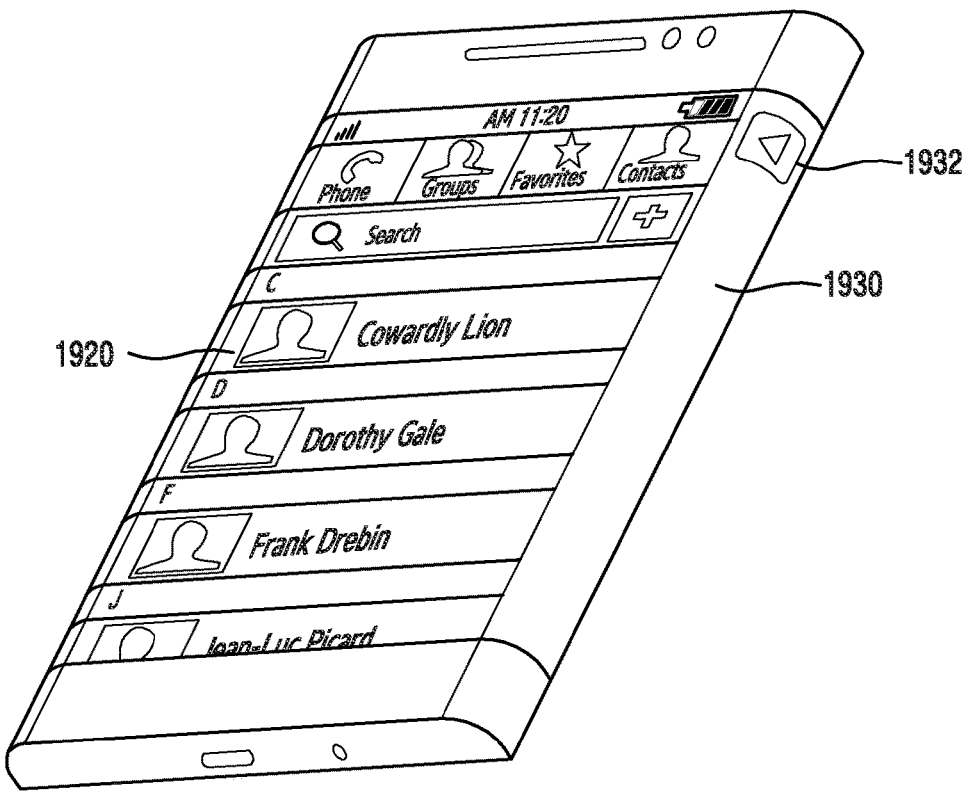

FIGS. 19A and 19B illustrate screen configurations in which electronic devices including a plurality of different types of displays share a screen, according to an embodiment of the present disclosure.

As illustrated in FIG. 18A, using screen configuration information provided from a first electronic device including a plurality of displays of a second type for which priorities are not set, a second electronic device may display the screen information of the first electronic device on a plurality of displays of a first type (e.g., a main display and an auxiliary display) for which priorities are set.

According to an embodiment, referring to FIG. 19A, the second electronic device may display, on a main display thereof, the screen information 1800 (e.g., setting menu) displayed on the first display of the first electronic device based on the display method of the second electronic device for screen information sharing (1900). The second electronic device may display a first icon 1912, representing that screen information displayed on the second display of the first electronic device exists, on an auxiliary display thereof (1910).

According to an embodiment, when the selection of the first icon 1912 is detected in FIG. 19A, the second electronic device may display, on the main display thereof, the screen configuration information 1802 (e.g., the execution information of the phonebook application program) displayed on the second display of the first electronic device as illustrated in FIG. 19B (1920). The second electronic device may display a second icon 1932, representing that screen information displayed on the first display of the first electronic device exists, on an auxiliary display thereof (1930).

According to an embodiment, when the selection of the second icon 1732 is detected in FIG. 19B, the second electronic device may display, on the main display thereof, the screen information 1800 (e.g., the setting menu) displayed on the first display of the first electronic device and may display the first icon 1912 on the auxiliary display thereof as illustrated in FIG. 19A.

According to an embodiment, referring to FIG. 12E, the second electronic device may display, on the main display, the screen information 1200 (e.g., execution information of the gallery application program) displayed on the first display of the first electronic device based on the display method of the second electronic device for screen information sharing (1250). The second electronic device may display the screen configuration information (e.g., the execution information of the phonebook application program) displayed on the second display of the first electronic device on the auxiliary display thereof (1252).

According to an embodiment, referring to FIG. 12F, the second electronic device may display, on the main display, the screen information 1200 (e.g., execution information of the gallery application program) displayed on the first display of the first electronic device based on the display method of the second electronic device for screen information sharing (1260). The second electronic device may display, on the auxiliary display thereof, the application program information (e.g., "phone book is running") displayed on the second display of the first electronic device (1262).

Figure 20A:
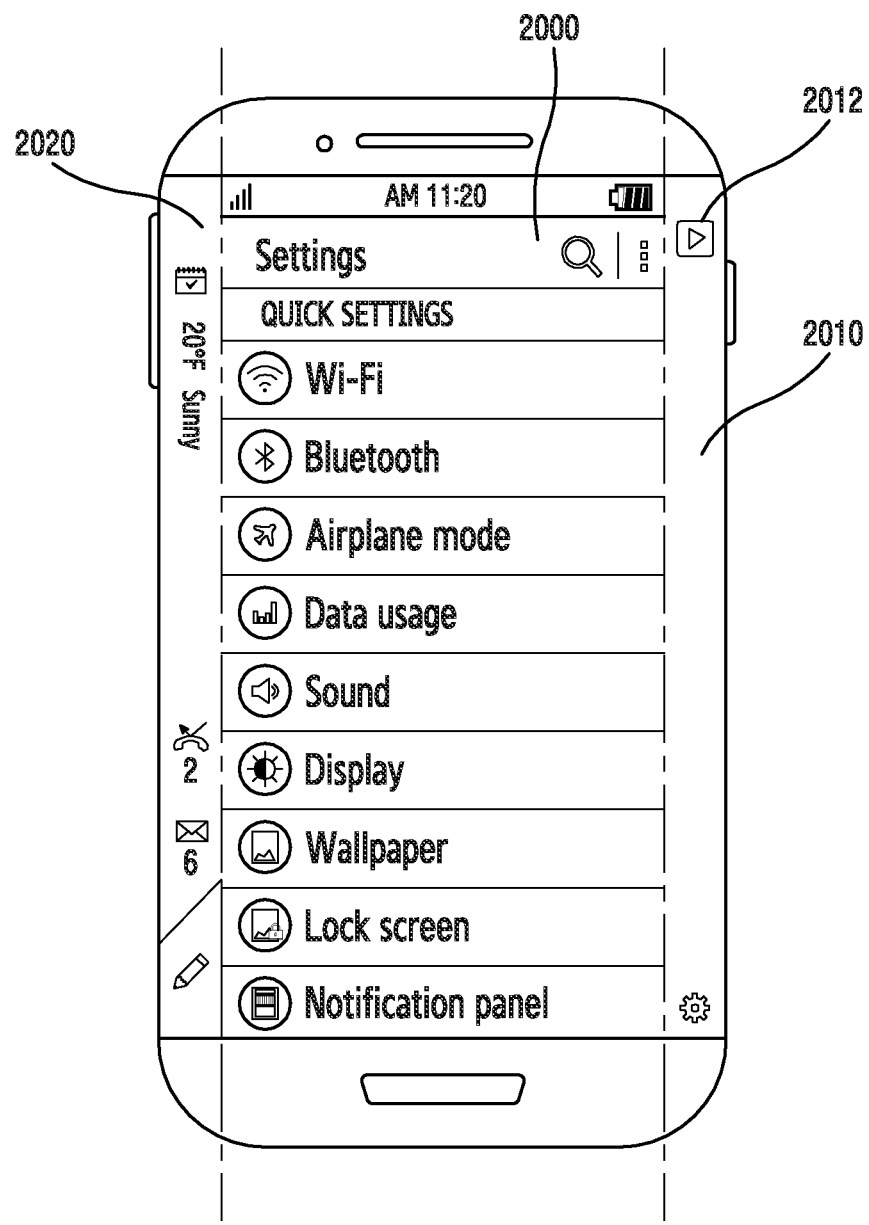
FIGS. 20A and 20B illustrate screen configurations in which electronic devices including a plurality of different types of displays share a screen, according to an embodiment of the present disclosure.
Figure 20B:
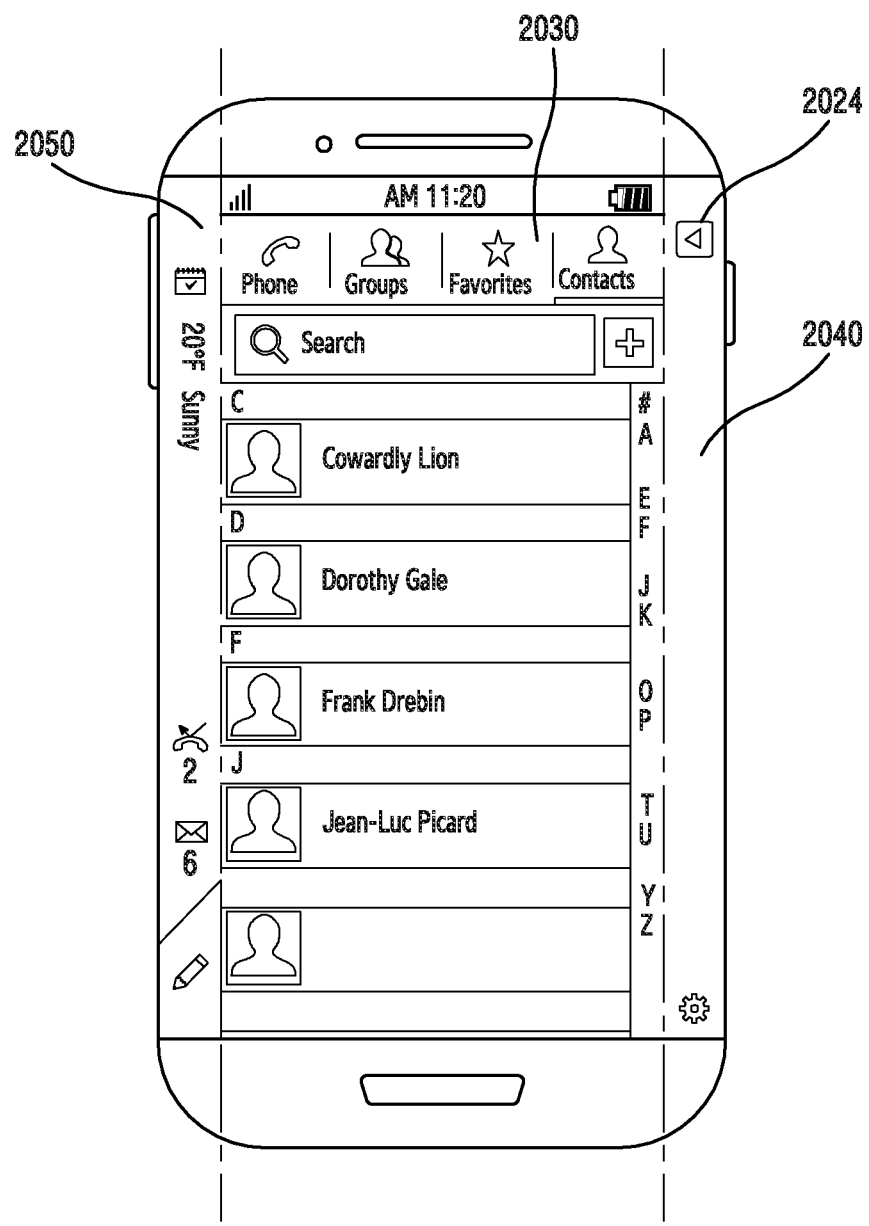

FIGS. 20A and 20B illustrate screen configurations in which electronic devices including a plurality of different types of displays share a screen, according to an embodiment of the present disclosure.

As illustrated in FIG. 18A, using screen configuration information provided from a first electronic device including a plurality of displays of a second type for which priorities are not set, a second electronic device may display screen information of the first electronic device on a plurality of displays of a third type (e.g., a main display and two auxiliary displays) for which priorities are set.

According to an embodiment, referring to FIG. 20A, the second electronic device may display, on a main display thereof, screen information 1800 (e.g., setting menu) displayed on the first display of the first electronic device based on the display method of the second electronic device for screen information sharing (2000). The second electronic device may display a first icon 2012, representing that screen information displayed on the second display of the first electronic device exists, on a first auxiliary display thereof (2010). The second electronic device may maintain screen information already displayed on a second auxiliary display (2020).

According to an embodiment, when the selection of the first icon 2012 is detected in FIG. 20A, the second electronic device may display, on the main display thereof, screen configuration information 1802 (e.g., the execution information of the phonebook application program) displayed on the second display of the first electronic device as illustrated in FIG. 20B (2030). The second electronic device may display a second icon 2024, representing that screen information displayed on the second display of the first electronic device exists, on the first auxiliary display thereof (2040). The second electronic device may maintain screen information already displayed on the second auxiliary display (2050).

According to an embodiment, the second electronic device may select one of an audio signal corresponding to the first display of the first electronic device and an audio signal corresponding to the second display to reproduce the selected audio signal.

According to an embodiment, the second electronic device may mix the audio signal corresponding to the first display of the first electronic device and the audio signal corresponding to the second display to reproduce the mixed audio signal.

FIGS. 21A to 21D illustrate screen configurations in which a first electronic device including a plurality of displays of a third type shares a screen with a second electronic device including one display, according to an embodiment of the present disclosure.

Figure 21A:
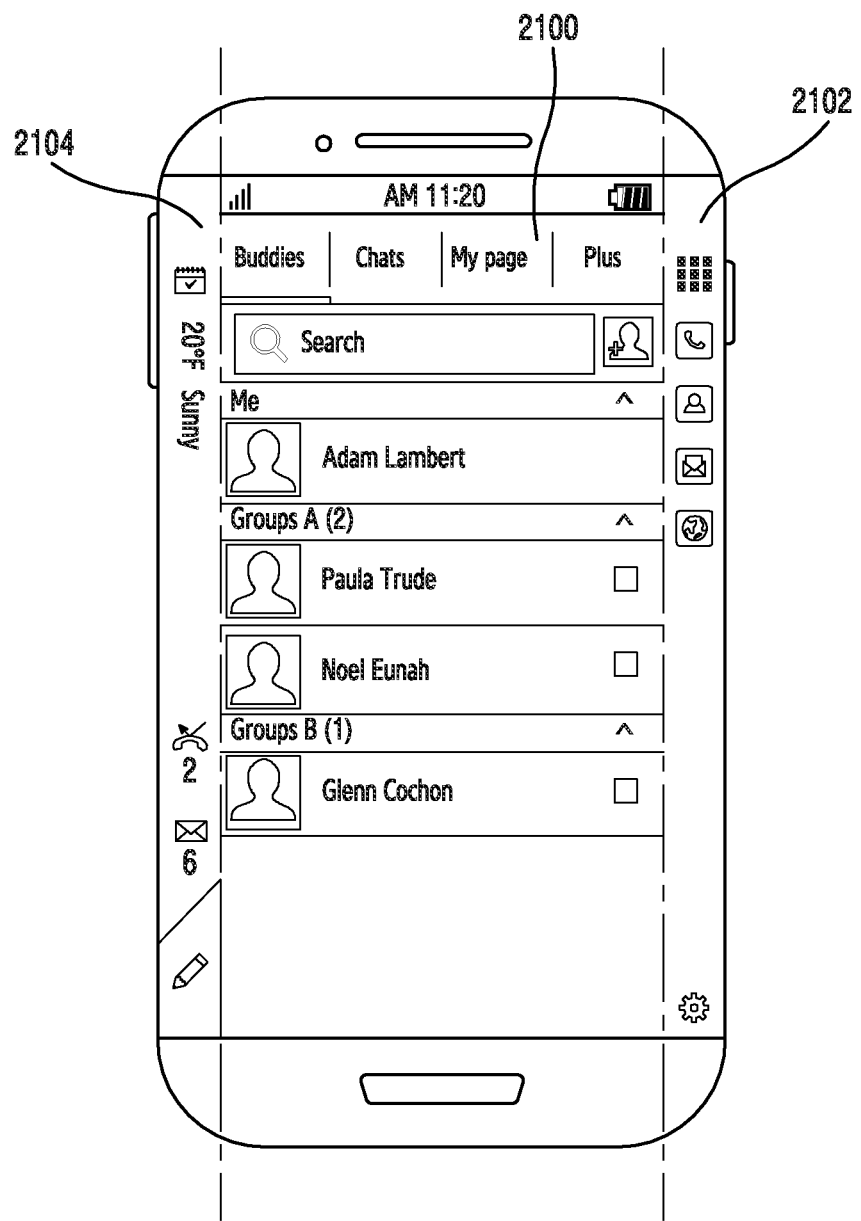
FIGS. 21A, 21B, 21C, and 21D illustrate screen configurations in which a first electronic device including a plurality of displays of a third type shares a screen with a second electronic device including one display, according to an embodiment of the present disclosure.

Referring to FIG. 21A, the first electronic device (e.g., the electronic device 100 of FIG. 1) may configure screen configuration information corresponding to screen information displayed on a plurality of displays of a third type (e.g., a main display and two auxiliary displays) for which priorities are set and may transmit the same to the second electronic device.

The second electronic device may display screen information of the first electronic device on one display thereof using the screen configuration information provided from the first electronic device.

Figure 21B:
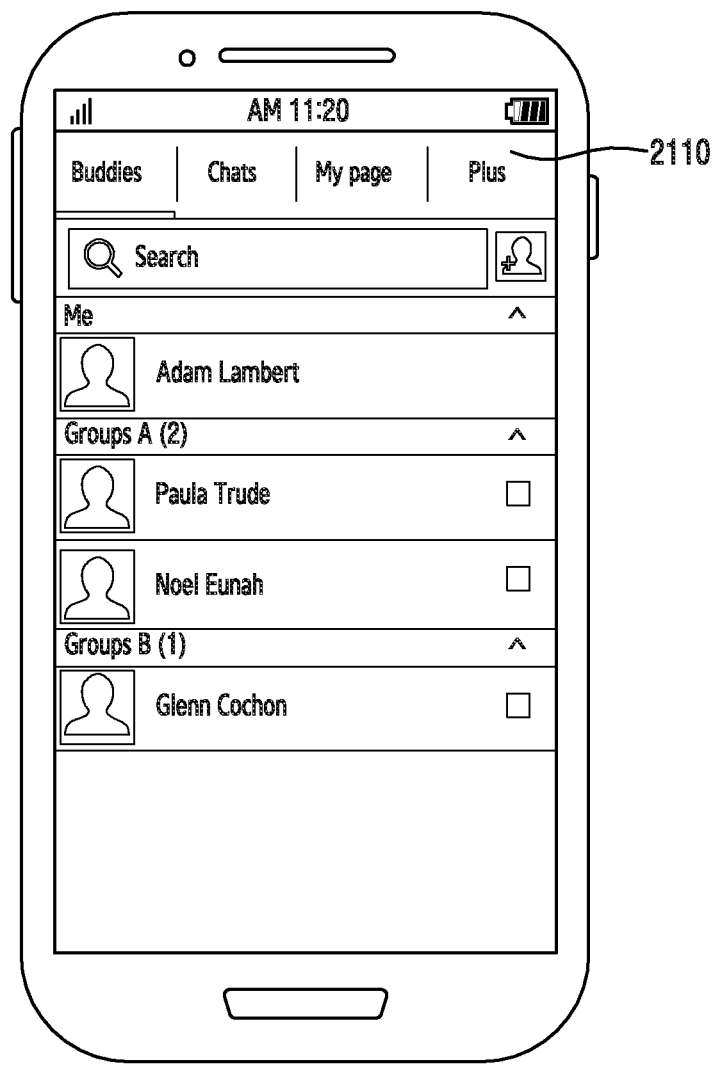

According to an embodiment, referring to FIG. 21B, the second electronic device may display, on the display thereof, screen information 2100 (e.g., setting menu) displayed on the main display of the first electronic device based on the display method of the second electronic device for screen information sharing (2110).

Figure 21C:
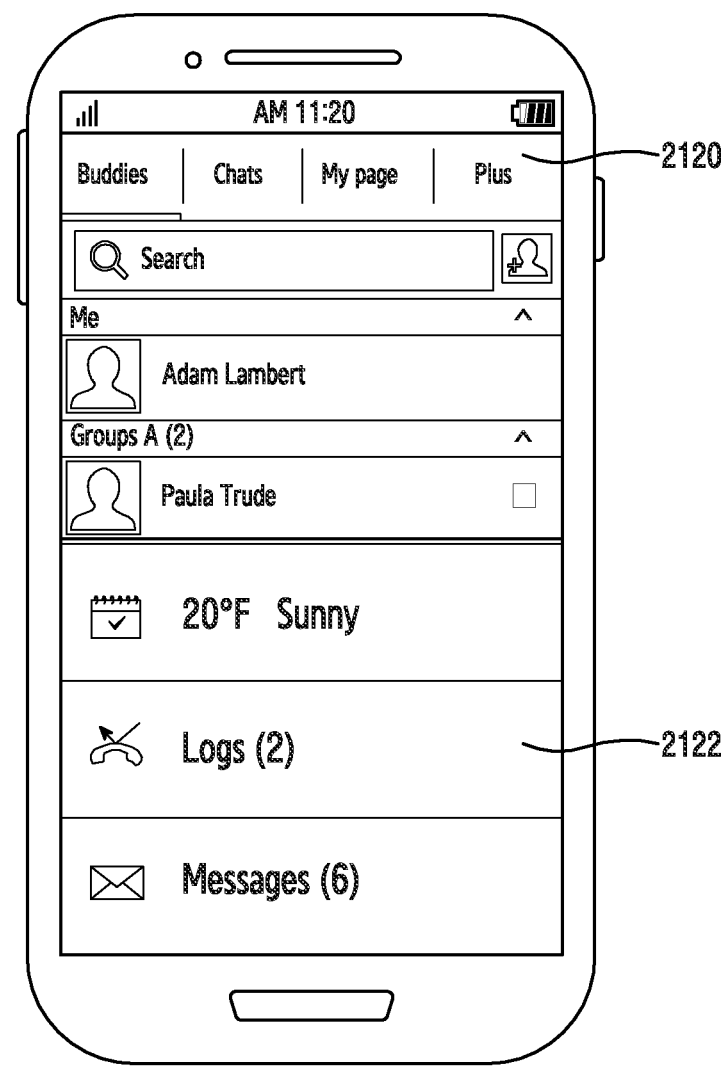

According to an embodiment, referring to FIG. 21C, the second electronic device may divide the display thereof into a plurality of areas based on the display method of the second electronic device for screen information sharing. The second electronic device may display the screen information 2100 (e.g., the setting menu) displayed on the main display of the first electronic device in a first area of the display (2120). The second electronic device may display screen information 2102 (e.g., an application program execution icon) displayed on a first auxiliary display of the first electronic device in a second area of the display (2122). For example, the sizes of the first and second areas of the display may be set to be the same as or different from each other.

Figure 21D:
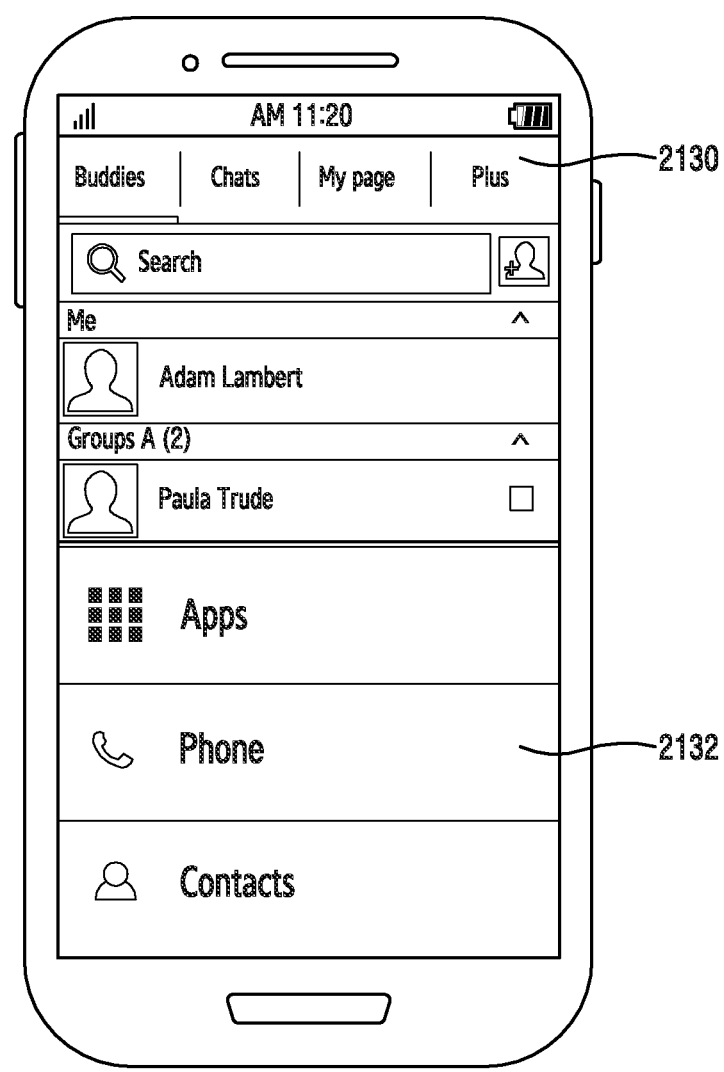

According to an embodiment, referring to FIG. 21D, the second electronic device may divide the display thereof into a plurality of areas based on the display method of the second electronic device for screen information sharing. The second electronic device may display the screen information 2100 (e.g., the setting menu) displayed on the main display of the first electronic device in the first area of the display (2130). The second electronic device may display screen information 2104 (e.g., state information) displayed on the second auxiliary display of the first electronic device in the second area of the display (2132).

According to an embodiment, the second electronic device may divide the display thereof into a plurality of areas based on the display method of the second electronic device for screen information sharing. The second electronic device may display the screen information 2100 (e.g., the setting menu) displayed on the main display of the first electronic device in the first area of the display. The second electronic device may display screen information 2102 (e.g., an application program execution icon) displayed on the first auxiliary display of the first electronic device in the second area of the display. The second electronic device may display the screen information 2104 (e.g., state information) displayed on the second auxiliary display of the first electronic device in the second area of the display.

Figure 22A:
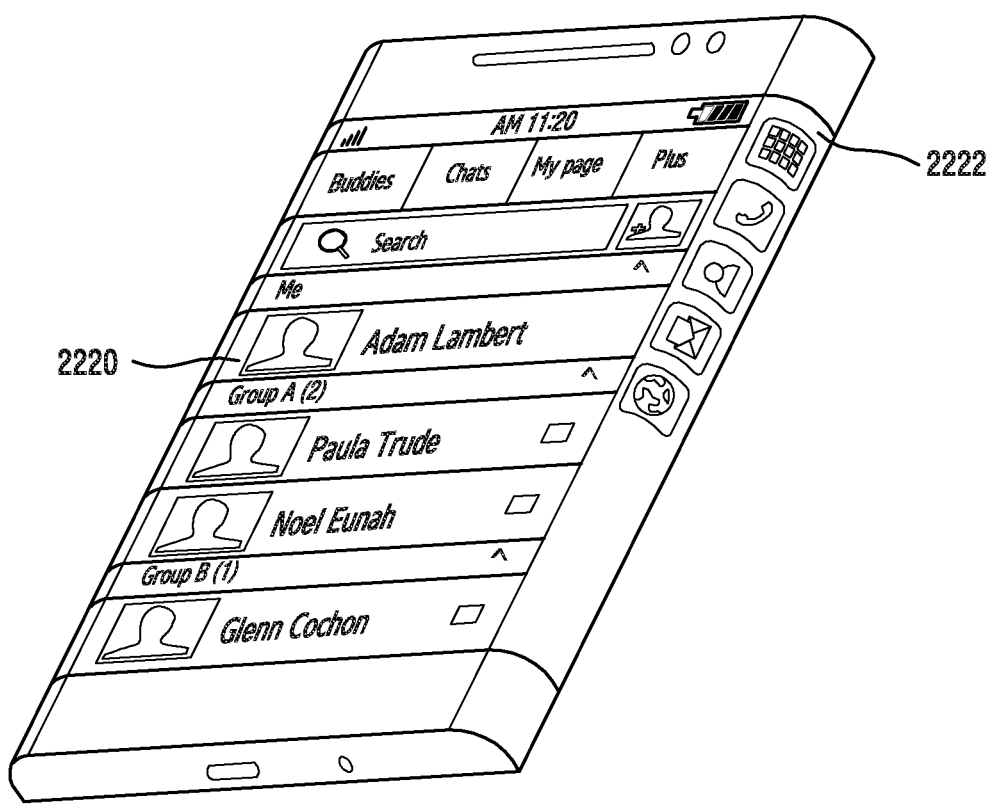
FIGS. 22A, 22B, and 22C illustrate screen configurations in which electronic devices including a plurality of different types of displays share a screen, according to an embodiment of the present disclosure.
Figure 22B:
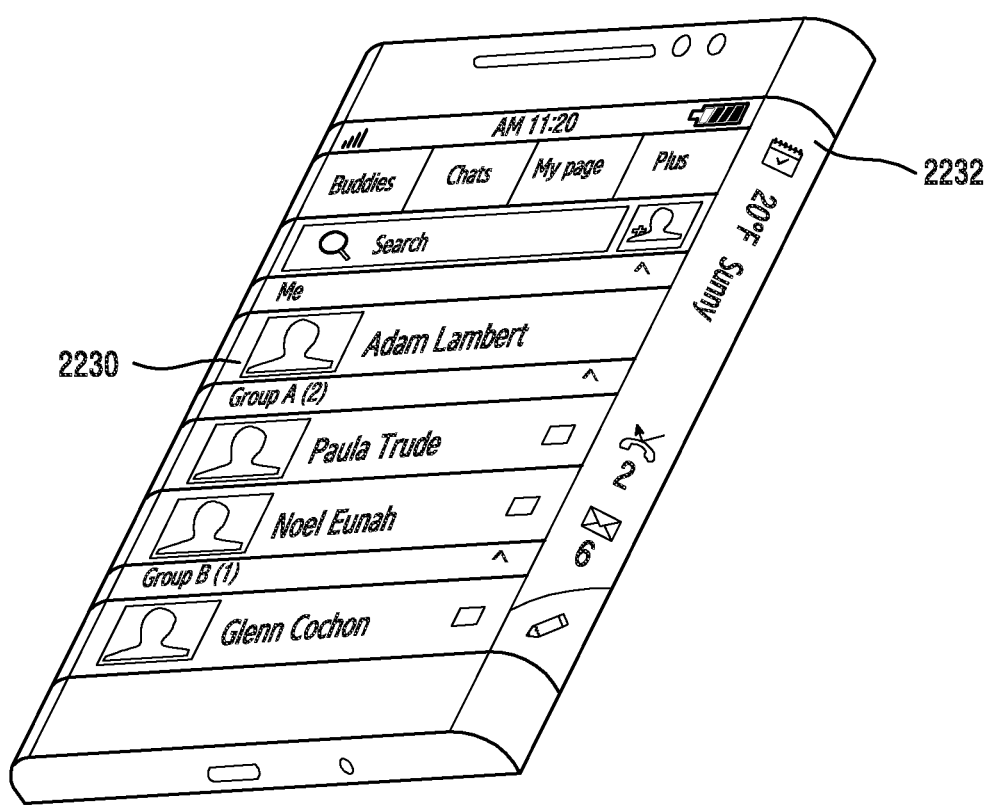
Figure 22C:
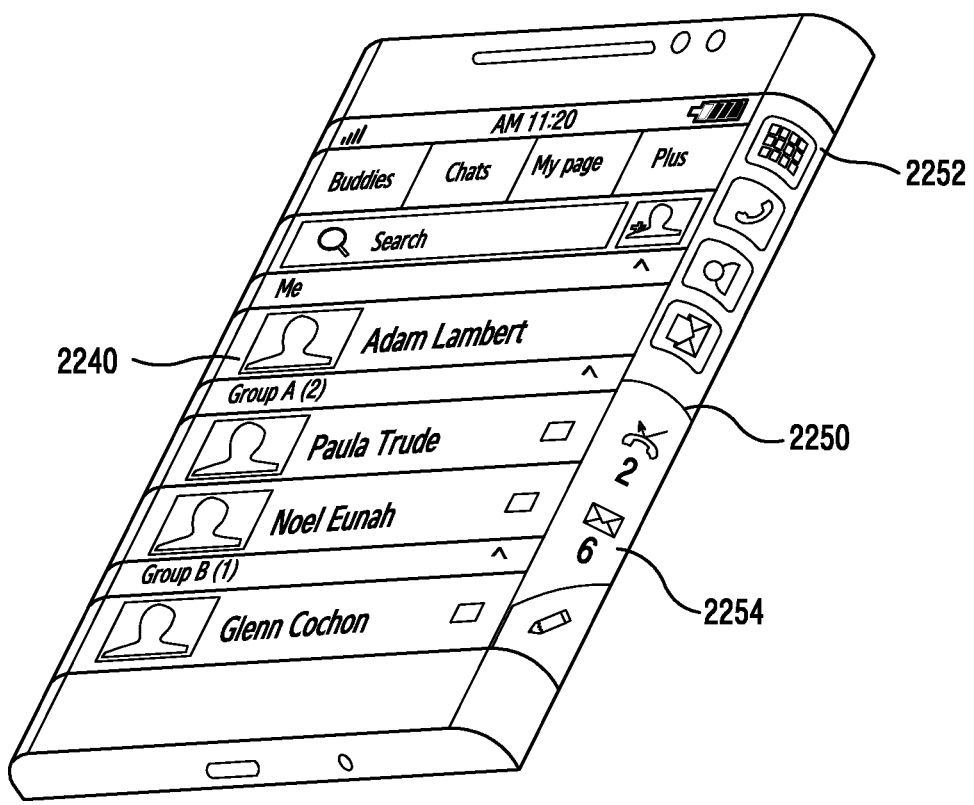

FIGS. 22A to 22C illustrate screen configurations in which electronic devices including a plurality of different types of displays share a screen, according to an embodiment of the present disclosure.

As illustrated in FIG. 21A, using screen configuration information provided from a first electronic device including a plurality of displays of a third type for which priorities are not set, a second electronic device may display screen information of the first electronic device on a plurality of displays of a first type (e.g., a main display or an auxiliary display) for which priorities are not set.

According to an embodiment, referring to FIG. 22A, the second electronic device may display, on the main display, the screen information 2100 (e.g., setting menu) displayed on a main display of the first electronic device based on the display method of the second electronic device for screen information sharing (2220). The second electronic device may display, on a second auxiliary display, screen information 2102 (e.g., an application program execution icon) displayed on a first auxiliary display of the first electronic device (2222).

According to an embodiment, referring to FIG. 22B, the second electronic device may display, on the main display thereof, screen information 2100 (e.g., setting menu) displayed on the main display of the first electronic device based on the display method of the second electronic device for screen information sharing (2230). The second electronic device may display, on the auxiliary display, screen information 2104 (e.g., state information) displayed on a second auxiliary display of the first electronic device (2232).

According to an embodiment, referring to FIG. 22C, the second electronic device may display, on the main display, the screen information 2100 (e.g., setting menu) displayed on the main display of the first electronic device based on the display method of the second electronic device for screen information sharing (2240).

The second electronic device may divide the auxiliary display thereof into a plurality of areas based on the display method of the second electronic device for screen information sharing (2250).

The second electronic device may display, in a first area of the auxiliary display, screen information 2102 (e.g., an application program execution icon) (or execution information) displayed on the first auxiliary display of the first electronic device (2252). The second electronic device may display, in a second area of the auxiliary display, screen information 2104 (e.g., state information) (or execution information) displayed on the second auxiliary display of the first electronic device (2254). For example, the sizes of the first and second areas of the auxiliary display may be set to be the same as or different from each other.

Figure 23A:
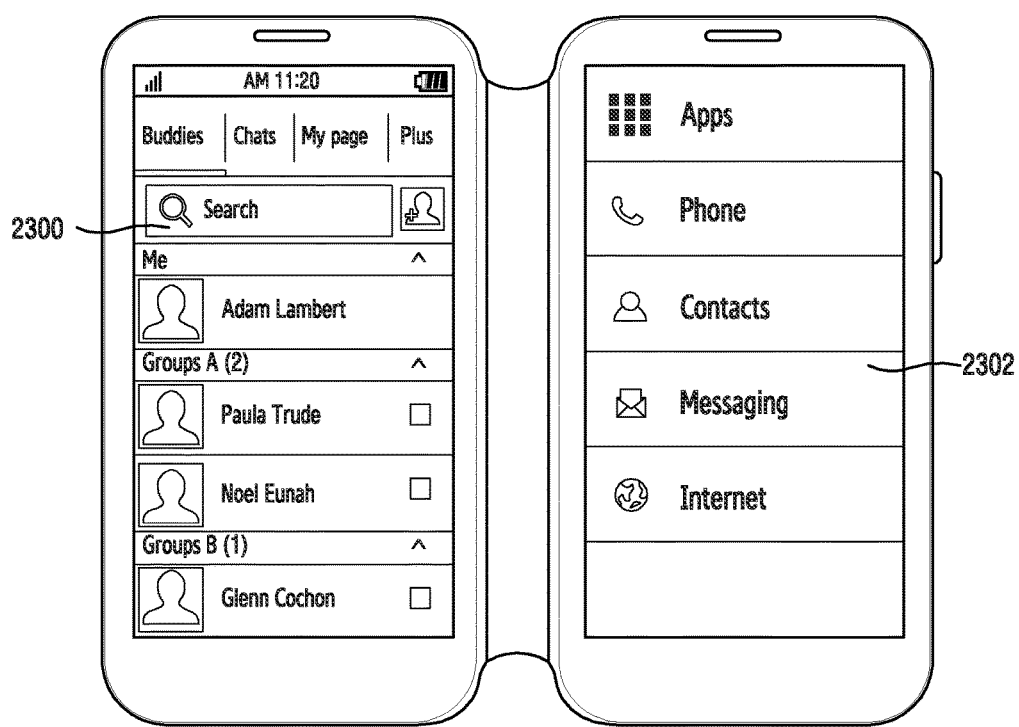
FIGS. 23A and 23B illustrate screen configurations in which electronic devices including a plurality of different types of displays share a screen, according to an embodiment of the present disclosure.
Figure 23B:
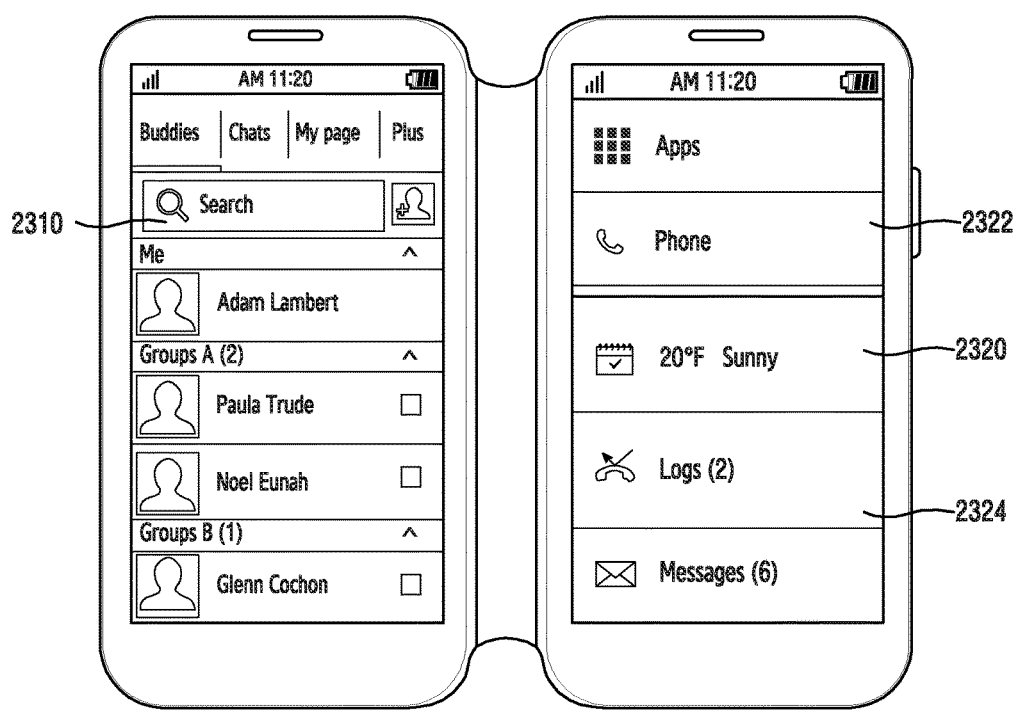

FIGS. 23A and 23B illustrate screen configurations in which electronic devices including a plurality of different types of displays share a screen, according to an embodiment of the present disclosure.

Using screen configuration information provided from a first electronic device including a plurality of displays of a third type for which priorities are set as illustrated in FIG. 21A, a second electronic device may display screen information of the first electronic device on a plurality of displays of a second type (e.g., a first display or a second display) for which priorities are not set.

According to an embodiment, referring to FIG. 23A, the second electronic device may display, on a first display, screen information 2100 (e.g., setting menu) displayed on the main display of the first electronic device based on the display method of the second electronic device for screen information sharing (2300). The second electronic device may display, on the second display, screen information 2102 displayed on a first or second auxiliary display of the first electronic device (e.g., an application program execution icon displayed on the first auxiliary display) (2302). For example, the second electronic device may display, on the second display, screen information with a higher priority (e.g., screen information of the first auxiliary display) among the screen information displayed on the first and second auxiliary displays of the first electronic device. For example, the second electronic device may display, on the second display, screen information selected by a user (e.g., screen information of the first auxiliary display) among the screen information displayed on the first and second auxiliary displays of the first electronic device. For example, the first electronic device may set screen information displayed on a display selected by input information or a display having a cursor located thereon as the screen information selected by the user.

According to an embodiment, referring to FIG. 23B, the second electronic device may display, on the first display thereof, screen information 2100 (e.g., setting menu) displayed on the main display of the first electronic device based on the display method of the second electronic device for screen information sharing (2310). The second electronic device may divide the second display thereof into a plurality of areas based on the display method of the second electronic device for screen information sharing (2320).

The second electronic device may display, in a first area of the second display, screen information 2102 (e.g., an application program execution icon) displayed on the first auxiliary display of the first electronic device (2322). The second electronic device may display, in a second area of the second display, screen information 2104 (e.g., state information) displayed on the second auxiliary display of the first electronic device (2324). For example, the sizes of the first and second areas of the second display may be set to be the same as or different from each other.

Figure 24:
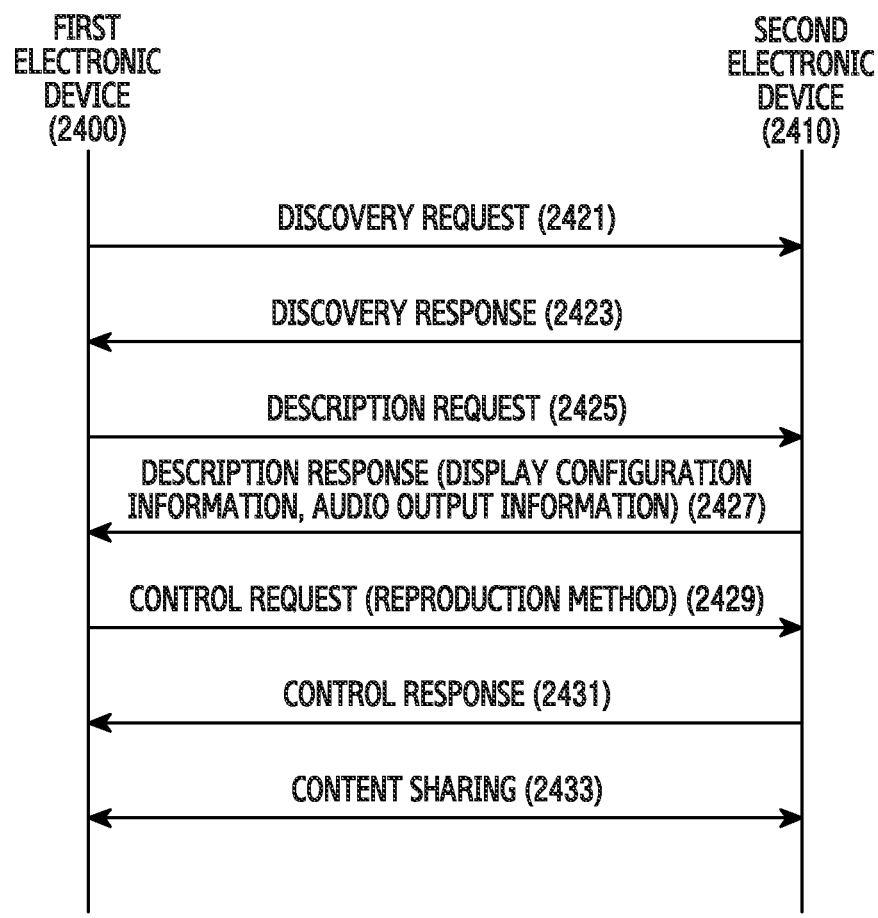
FIG. 24 illustrates a configuration for determining a display method of a second electronic device using a digital living network alliance (DLNA) method, according to an embodiment of the present disclosure.

FIG. 24 illustrates a configuration for determining a display method of a second electronic device using a DLNA method, according to an embodiment of the present disclosure.

Referring to FIG. 24, a first electronic device 2400 (e.g., a control point) may transmit a discovery request signal in operation 2421 in order to identify whether an adjacent external electronic device (e.g., the second electronic device 2410) exists. For example, the first electronic device 2400 may transmit the discovery request signal to a service area thereof.

According to an embodiment, the second electronic device 2410, when receiving the discovery request signal of the first electronic device 2400, may transmit a discovery response signal to the first electronic device 2400 in response to the discovery request signal in operation 2423.

According to an embodiment, the first electronic device 2400, when receiving the discovery response signal of the second electronic device 2410, may transmit a description request signal to the second electronic device 2410 in operation 2425. The second electronic device 2410 may transmit a description response signal including the device capability of the second electronic device 2410 to the first electronic device 2400 in response to the description request signal in operation 2427.

According to an embodiment, the first electronic device 2400 may determine a candidate reproduction method of the second electronic device based on the device capability of the second electronic device 2410 identified through the description response signal. The first electronic device 2400 may transmit a control request signal including the candidate reproduction method to the second electronic device 2410 in operation 2429. The second electronic device 2410 may transmit a control response signal including the reproduction method of the second electronic device 2410 to the first electronic device 2400 in response to the control request signal in operation 2431. For example, based on a screen sharing policy or input information, the second electronic device 2410 may determine whether to accept the candidate reproduction method determined by the first electronic device 2400. The second electronic device 2410 may transmit response information for the candidate reproduction method (e.g., information on acceptance, refusal, or change of the candidate reproduction method) to the first electronic device 2400.

According to an embodiment, the first and second electronic devices 2400 and 2410 may share screen configuration information based on the reproduction method of the second electronic device 2410 in operation 2433. For example, the first electronic device 2400 may reconfigure the screen configuration information to correspond to the reproduction method of the second electronic device 2410 and transmit the reconfigured screen configuration information to the second electronic device 2410. For example, the second electronic device 2410 may reconfigure the screen configuration information received from the first electronic device 2400 to correspond to the reproduction method of the second electronic device 2410 and reproduce the reconfigured screen configuration information.

Figure 25:
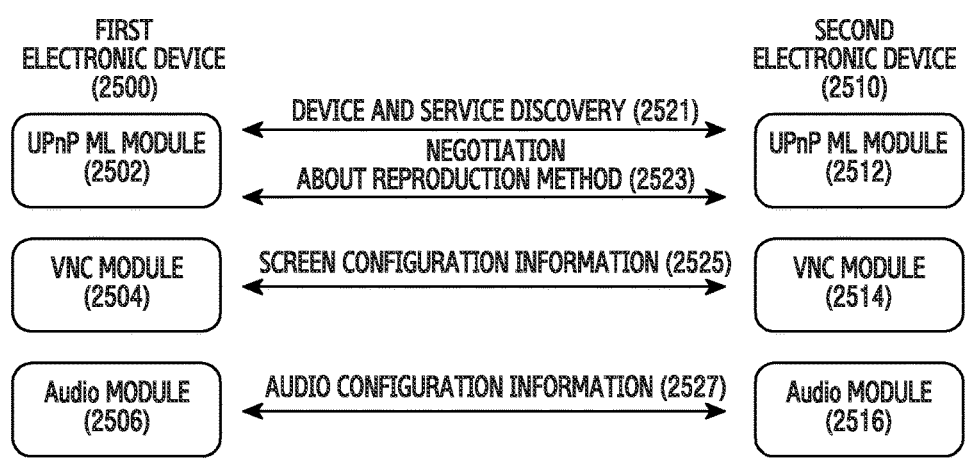
FIG. 25 illustrates a configuration for determining a display method of a second electronic device using a mirror link, according to an embodiment of the present disclosure.

FIG. 25 illustrates a configuration for determining a display method of a second electronic device using a mirror link, according to an embodiment of the present disclosure.

Referring to FIG. 25, a first electronic device 2500 may discover the second electronic device 2510, which may be connected to the first electronic device 2500, using a universal plug and play mirror link (UPnP ML) module 2502 in operation 2521.

According to an embodiment, the first and second electronic devices 2500 and 2510 may negotiate about a reproduction method through UPnP ML modules 2502 and 2512 in operation 2523. For example, the UPnP ML module 2502 of the first electronic device 2500 and the UPnP ML module 2512 of the second electronic device 2510 may exchange device capability through a device capability exchange procedure. The UPnP ML module 2502 of the first electronic device 2500 and the UPnP ML module 2512 of the second electronic device 2510 may negotiate about a reproduction method for screen information or content information sharing based on the device capability of the second electronic device 2510.

According to an embodiment, a virtual network computing (VNC) module 2504 of the first electronic device 2500 and a VNC module 2514 of the second electronic device 2510 may share screen configuration information based on the display method of the second electronic device 2510 determined through the UPnP ML modules 2502 and 2512 in operation 2525. For example, the VNC module 2504 of the first electronic device 2500 may reconfigure the screen configuration information to correspond to the display method of the second electronic device 2510 and transmit the reconfigured screen configuration information to the second electronic device 2510. For example, the VNC module 2514 of the second electronic device 2510 may reconfigure the screen configuration information received from the VNC module 2504 of the first electronic device 2500 to correspond to the display method of the second electronic device 2510 and display the reconfigured screen configuration information on the display thereof. For example, the VNC module 2504 of the first electronic device 2500 may transmit the screen configuration information to the VNC module 2514 of the second electronic device 2510 through a remote frame buffer (RFB) protocol.

According to an embodiment, an audio module 2506 of the first electronic device 2500 and an audio module 2516 of the second electronic device 2510 may share audio information based on the sound reproduction method of the second electronic device 2510 determined through the UPnP ML modules 2502 and 2512 in operation 2527. For example, the audio module 2506 of the first electronic device 2500 may reconfigure the audio information to correspond to the sound reproduction method of the second electronic device 2510 and transmit the reconfigured audio information to the second electronic device 2510. For example, the audio module 2516 of the second electronic device 2510 may reconfigure the audio information received from the audio module 2506 of the first electronic device 2500 to correspond to the sound reproduction method of the second electronic device 2510 and reproduce the reconfigured audio information. For example, the audio module 2506 of the first electronic device 2500 may transmit the audio information to the audio module 2516 of the second electronic device 2510 through BL or a real time protocol (RTP).

Figure 26:
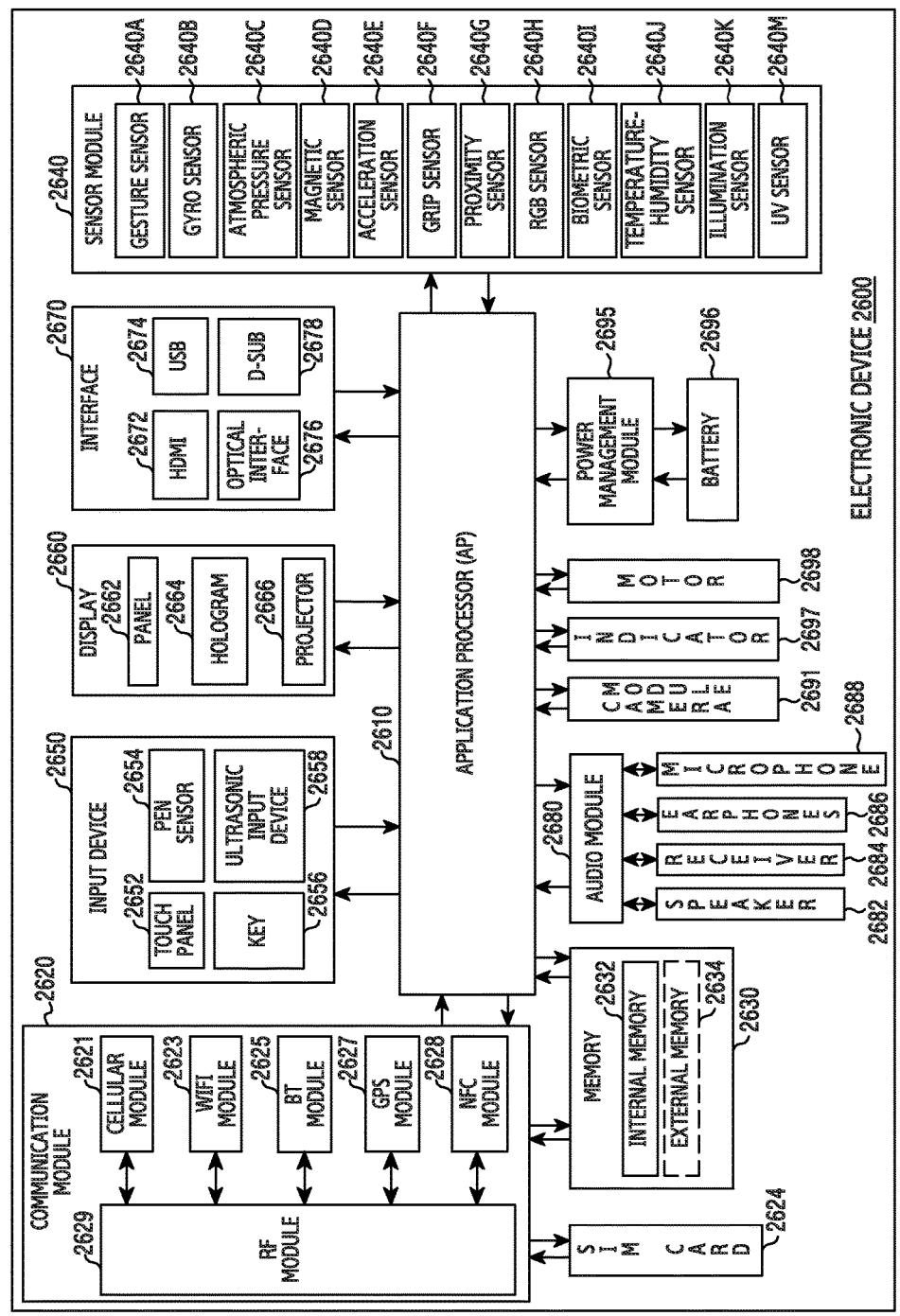
FIG. 26 is a block diagram of an electronic device according to an embodiment of the present disclosure.

FIG. 26 is a block diagram of an electronic device according to an embodiment of the present disclosure. In the following description, an electronic device 2600, for example, may constitute the entirety or a part of the electronic device 100 illustrated in FIG. 1.

Referring to FIG. 26, the electronic device 2600 may include at least one AP 2610, a communication module 2620, a subscriber identification module (SIM) card 2624, a memory 2630, a sensor module 2640, an input module 2650, a display 2660, an interface 2670, an audio module 2680, an image sensor module 2691, a power management module 2695, a battery 2696, an indicator 2697, and a motor 2698.

The AP 2610 may drive an operation system or an application program to control a plurality of hardware or software elements connected thereto, and may perform data processing or operations relating to various data including multimedia data. The AP 2610 may be implemented by, for example, a system on chip (SoC). According to an embodiment, the AP 2610 may further include a graphics processing unit (GPU) (not illustrated).

The communication module 2620 (e.g., the communication interface 170) may transmit/receive data in communication between external electronic devices connected to the electronic device 2600 (e.g., the electronic device 100) through a network. According to an embodiment, the communication module 2620 may include a cellular module 2621, a Wi-Fi module 2623, a BT module 2625, a GPS module 2627, a NFC module 2628, or a radio frequency (RF) module 2629.

The cellular module 2621 may provide a voice call, a video call, a SMS, or an Internet service through a communication network (e.g., LTE, LTE-A, CDMA, WCDMA, UMTS, WiBro, or GSM). Furthermore, the cellular module 2621, for example, may distinguish between and authenticate electronic devices in a communication network using a SIM (e.g., the SIM card 2624). According to an embodiment, the cellular module 2621 may perform at least some of the functions that the AP 2610 may provide. For example, the cellular module 2621 may perform at least some of the multimedia control functions.

According to an embodiment, the cellular module 2621 may include a CR Furthermore, the cellular module 2621 may be implemented by, for example, an SoC. In FIG. 26, the elements, such as the cellular module 2621 (e.g., a communication processor), the memory 2630, the power management module 2695, and the like, are illustrated as elements separated from the AP 2610. However, according to an embodiment, the AP 2610 may be implemented to include at least some of the above-described elements (e.g., the cellular module 2621).

According to an embodiment, the AP 2610 or the cellular module 2621 (e.g., the communication processor) may load instruction or data received from at least one of a non-volatile memory and the other elements connected thereto in a volatile memory and process the loaded instructions or data. Furthermore, the AP 2610 or the cellular module 2621 may store data received from, or generated by, at least one of the other elements in a non-volatile memory.

The Wi-Fi module 2623, the BT module 2625, the GPS module 2627, or the NFC module 2628 may include, for example, a processor for processing data transmitted/received through the corresponding module. In FIG. 26, the cellular module 2621, the Wi-Fi module 2623, the BT module 2625, the GPS module 2627, or the NFC module 2628 is illustrated as a separate block. However, according to an embodiment, at least some (e.g., two or more) of the cellular module 2621, the Wi-Fi module 2623, the BT module 2625, the GPS module 2627, and the NFC module 2628 may be included in one integrated chip (IC) or IC package. For example, at least some of the processors corresponding to the cellular module 2621, the Wi-Fi module 2623, the BT module 2625, the GPS module 2627, and the NFC module 2628 (e.g., a communication processor corresponding to the cellular module 2621 and a Wi-Fi processor corresponding to the Wi-Fi module 2623) may be implemented as one SoC.

The RF module 2629 may transmit and receive data, for example, an RF signal. The RF module 2629, although not illustrated, may include, for example, a transceiver, a power amp module (PAM), a frequency filter, a low noise amplifier (LNA), or the like. Furthermore, the RF module 2629 may further include a component, for example a conductor or a conductive wire, for transmitting and receiving electromagnetic waves in the free airspace in wireless communication. In FIG. 26, the cellular module 2621, the Wi-Fi module 2623, the BT module 2625, the GPS module 2627, and the NFC module 2628 are illustrated to share one RF module 2629. However, according to an embodiment, at least one of the cellular module 2621, the Wi-Fi module 2623, the BT module 2625, the GPS module 2627, and the NFC module 2628 may transmit/receive an RF signal through a separate RF module.

According to an embodiment, the RF module 2629 may include at least one of a main antenna and a sub-antenna that are functionally connected to the electronic device 2600. The communication module 2620 may support a multiple antenna service multiple input multiple output (MIMO), such as diversity, using the main antenna and the sub-antenna.

The SIM card 2624 may be a card including a subscriber identification module and may be inserted into a slot formed in a specific location of the electronic device. The SIM card 2624 may include unique identification information (e.g., an integrated circuit card identifier (ICCID)) or unique subscriber information (e.g., an international mobile subscriber identity (IMSI)).

The memory 2630 may include an internal memory 2632 or an external memory 2634. The internal memory 2632, for example, may include at least one of a volatile memory (e.g., a dynamic random access memory (DRAM), a static RAM (SRAM), a synchronous dynamic RAM (SDRAM), or the like) and a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, a NOR flash memory, or the like).

According to an embodiment, the internal memory 2632 may be a solid state drive (SSD). The external memory 2634 may further include a flash drive, for example, a compact flash (CF), a secure digital (SD), a micro-SD, a mini-SD, an extreme digital (xD), a Memory Stick, or the like. The external memory 2634 may be functionally connected to the electronic device 2600 through various interfaces. According to an embodiment, the electronic device 2600 may further include a storage device (or storage medium) such as a hard disc drive.

The sensor module 2640 may measure a physical quantity or sense an operating state of the electronic device 2600 and may convert the measured or sensed information to an electric signal. The sensor module 2640 may include at least one of, for example, a gesture sensor 2640A, a gyro sensor 2640B, an atmospheric pressure sensor 2640C, a magnetic sensor 2640D, an acceleration sensor 2640E, a grip sensor 2640F, a proximity sensor 2640G, a color sensor 2640H (e.g., a red/green/blue (RGB) sensor), a biometric sensor 2640I, a temperature/humidity sensor 2640J, an illumination sensor 2640K, and an ultra violet (UV) sensor 2640M. Additionally or alternatively, the sensor module 2640 may include, for example, an E-nose sensor (not illustrated), an electromyography (EMG) sensor (not illustrated), an electroencephalogram (EEG) sensor (not illustrated), an electrocardiogram (ECG) sensor (not illustrated), an infrared (IR) sensor (not illustrated), an iris sensor (not illustrated), a fingerprint sensor (not illustrated), and the like. The sensor module 2640 may further include a control circuit for controlling one or more sensors included therein.

The input device 2650 may include a touch panel 2652, a (digital) pen sensor 2654, a key 2656, or an ultrasonic input device 2658. The touch panel 2652 may recognize a touch input in at least one of, for example, a capacitive type, a resistive type, an infrared type, and an acoustic wave type. Furthermore, the touch panel 2652 may further include a control circuit. In the case of the capacitive type, physical contact or proximity recognition is possible. The touch panel 2652 may further include a tactile layer. In this case, the touch panel 2652 may provide a tactile reaction to a user.

The (digital) pen sensor 2654 may be implemented, for example, using a method the same as or similar to receiving a user's touch input, or using a separate recognition sheet. The key 2656 may include, for example, a physical button, an optical key, or a keypad. The ultrasonic input unit 2658 may identify data by sensing acoustic waves with a microphone of the electronic device 2600 through an input unit for generating an ultrasonic signal, and wireless recognition is possible. According to an embodiment, the electronic device 2600 may also receive a user input from an external device (e.g., a computer or server) connected thereto using the communication module 2620.

The display 2660 (e.g., the display 160) may include a panel 2662, a hologram device 2664, or a projector 2666. The panel 2662 may be, for example, a LCD, an active matrix OLED (AM-OLED), or the like. The panel 2662 may be implemented to be, for example, flexible, transparent, or wearable. The panel 2662 may be formed to be a single module with the touch panel 2652. The hologram 2664 may show a three dimensional image in the air by using interference of light. The projector 2666 may display an image by projecting light onto a screen. The screen may be placed, for example, in the interior or on the exterior of the electronic device 2600. According to an embodiment, the display 2660 may further include a control circuit for controlling the panel 2662, the hologram device 2664, or the projector 2666.

The interface 2670 may include, for example, a HDMI 2672, an USB 2674, an optical interface 2676, or a D-subminiature (D-sub) 2678. Additionally or alternatively, the interface 2670 may include, for example, a mobile high-definition link (MHL) interface, a SD card/multi-media card (MMC) interface, or an infrared data association (IrDA) interface.

The audio module 2680 may bidirectionally convert a sound and an electrical signal. The audio module 2680, for example, may process sound information input or output through a speaker 2682, a receiver 2684, earphones 2686, the microphone 2688 or the like.

The image sensor module 2691 may capture still and moving images, and according to an embodiment, the image sensor module 2691 may include one or more image sensors (e.g., a front sensor or a rear sensor), a lens (not illustrated), an image signal processor (ISP, not illustrated), or a flash (not illustrated) (e.g., an LED or a xenon lamp).

The power management module 2695 may manage the power of the electronic device 2600. Although not illustrated, the power management module 2695 may include, for example, a power management integrated circuit (PMIC), a charger IC, or a battery or fuel gauge.

The PMIC, for example, may be mounted within an integrated circuit or an SoC semiconductor. Charging methods may be classified into wired charging and wireless charging. The charger IC may charge a battery and may prevent an over-voltage or over-current from being introduced from a charger. According to an embodiment, the charger IC may include a charger IC for at least one of the wired charging and the wireless charging. Examples of the wireless charging may include magnetic resonance charging, magnetic induction charging, and electromagnetic charging, and an additional circuit, such as a coil loop, a resonance circuit, a rectifier, or the like, may be added for the wireless charging.

The battery gauge may measure, for example, a residual quantity of the battery 2696, and a voltage, a current, or a temperature while charging. The battery 2696 may store or generate electricity and supply power to the electronic device 2600 using the stored or generated electricity. The battery 2696 may include, for example, a rechargeable battery or a solar battery.

The indicator 2697 may display a specific state of the electronic device 2600 or a part thereof (e.g., the AP 2610), such as a booting state, a message state, a charging state, or the like. The motor 2698 may convert an electric signal into a mechanical vibration. Although not illustrated, the electronic device 2600 may include a processing unit (e.g., a GPU) for mobile TV support. The processing unit for mobile TV support, for example, may process media data pursuant to a standard, such as digital multimedia broadcasting (DMB), digital video broadcasting (DVB), or media flow.

An electronic device including at least one display, according to various embodiments of the present disclosure, provides a screen sharing service based on a reproduction method for screen information sharing (e.g., a display method, a sound reproduction method, or a UIBC) that is determined based on display configuration information, thereby enabling electronic devices including a plurality of displays to share screen information.

Each of the aforementioned elements of the electronic devices according to the various embodiments of the present disclosure may be constituted with one or more components, and the names of the corresponding components may vary depending on the type of the electronic device. The electronic devices according to the various embodiments of the present disclosure may include at least one of the aforementioned elements, or may further include other additional elements, or some of the aforementioned elements may be excluded. Also, some of the elements of the electronic devices according to the various embodiments of the present disclosure may be combined to form a single entity, thereby equivalently executing the functions of the corresponding elements prior to the combination.

The term "module" used in this specification may refer to, for example, a unit that includes a combination of one or more of hardware, software, and firmware. The "module" may be interchangeably used with a term, such as unit, logic, logical block, component, or circuit. The "module" may be a minimum unit or a part of the integrally formed component. The "module" may be a minimum unit or a part that performs one or more functions. The "module" may be mechanically or electronically implemented. For example, the "module" may include at least one of an application-specific integrated circuit (ASIC) chip, a field-programmable gate arrays (FPGAs), and a programmable-logic device for performing some operations, which have been known or are to be developed.

At least a part of devices (e.g., modules or functions thereof) or methods (e.g., operations), according to the various embodiments, may be implemented, for example, as instructions stored in computer readable storage media in the form of programming modules. In cases where the instructions are executed by a processor (e.g., the processor 120), one or more processors may perform functions that correspond to the instructions. The computer readable storage medium may be, for example, the memory 130.

The computer readable recording medium may include a hard disc, a floppy disc, magnetic media (e.g., a magnetic tape), optical media (e.g., a compact disc ROM (CD-ROM) and a DVD), magneto-optical media (e.g., a floptical disk), a hardware device (e.g., a ROM, a RAM, a flash memory, or the like), and the like. In addition, the program instructions may include high class language codes, which can be executed in a computer by using an interpreter, as well as machine codes made by a compiler. The aforementioned hardware devices may be configured to operate as one or more software modules in order to perform the operations of the various embodiments, and vice versa.

The modules or the program modules, according to the various embodiments of the present disclosure, may include one or more of the aforementioned elements, or may further include other additional elements, or some of the aforementioned elements may be excluded. The operations performed by the modules, the program modules, or other elements, according to the various embodiments, may be executed through a sequential, parallel, repeated, or heuristic method. Further, some operations may be executed in a different order, or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   at least one display device;
   a communication interface; and
   at least one processor configured to:
      receive, from an external electronic device, a number of display devices of the external electronic device via the communication interface,
      generate, based on the number of the display devices of the external electronic device and first screen information for displaying on the at least one display device, second screen information for displaying on at least one of the display devices of the external electronic device and screen selection information indicating a display device for displaying the second screen information among the display devices of the external electronic device, and
control the communication interface to transmit the second screen information and the screen selection information to the external electronic device.

2. The electronic device of claim 1, wherein the at least one processor is further configured to:
in response to identifying that the number of display devices of the external electronic device corresponds to two, generate the second screen information that mirrors the first screen information and configure the screen selection information to display a half of the second screen information on a first display device of the display devices of the external electronic device and a remained half of the second screen information on a second display device of the display devices of the external electronic device.

3. The electronic device of claim 2, wherein the at least one processor is further configured to:
in response to identifying that the number of display devices of the external electronic device corresponds to two, generate the second screen information that mirrors the first screen information and configure the screen selection information to display the second screen information on a first display device of the display devices of the external electronic device.

4. The electronic device of claim 1,
wherein the external electronic device comprises one or more display devices,
wherein the at least one processor is further configured to determine, among the display devices of the external electronic device, a first display device for displaying a first screen and a second display device for displaying a second screen based on the number of display devices of the external electronic device,
wherein at least one of the first screen or the second screen is associated with the first screen information, and
wherein the first screen information comprises information on the first screen associated with the first display device and the second screen associated with the second display device.

5. The electronic device of claim 4, wherein the first screen corresponds to a foreground application which is displayed via the at least one display device and the second screen corresponds to a background application executed in the electronic device.

6. The electronic device of claim 1, wherein the at least one processor is further configured to determine at least one of a reproduction method for reproducing an audio signal corresponding to the at least one display device in the external electronic device, or an input information processing method for processing input information in the external electronic device, based on data received from the external electronic device.

7. The electronic device of claim 1, wherein the first screen information comprises content information displayed on the at least one display device, area information of the at least one display device on which the content information is displayed, and information on a display device of the external electronic device where the content information is to be displayed.

8. An electronic device comprising:
one or more display devices;
a communication interface; and
at least one processor configured to:
receive, from an external electronic device, a number of display devices of the external electronic device via the communication interface,
receive first screen information from the external electronic device through the communication interface, the first screen information regarding information being displayed via at least one display device of the external electronic device,
generate, based on the number of the display devices of the external electronic device and the first screen information, second screen information comprising information for displaying on at least one of the display devices of the electronic device and screen selection information indicating a display device for displaying the second screen information among the display devices by reconfiguring the first screen information based on the received number of display devices, and
control the display devices to display the second screen information in the display device among the display devices of the electronic device.

9. The electronic device of claim 8,
wherein the information further comprises a type of the display devices, a characteristic of the display devices, or a resolution of each of the display devices, and
wherein data received from the external electronic device comprises information on at least one of a number of the at least one display device of the external electronic device, a type of the at least one display device, a characteristic of the at least one display device, or a resolution of each of the at least one display device.

10. The electronic device of claim 9,
wherein the second screen information is generated based on at least one of an application executed in the electronic device, a priority of applications executed in the electronic device, an application executed in the external electronic device, or a priority of applications executed in the external electronic device.

11. The electronic device of claim 8,
wherein the at least one processor is further configured to determine, among the display devices, a first display device for displaying a first screen and a second display device for displaying a second screen, based on the number of display devices of the electronic device,
wherein at least one of the first screen or the second screen is associated with the first screen information, and
wherein the second screen information comprises information on the first screen associated with the first display device and the second screen associated with the second display device.

12. The electronic device of claim 11, wherein the first screen corresponds to a foreground application which is displayed via the at least one display device of the external electronic device and the second screen corresponds to a background application executed in the external electronic device.

13. The electronic device of claim 8, wherein the at least one processor is further configured to determine at least one of a reproduction method for reproducing an audio signal corresponding to the at least one display device of the external electronic device in the electronic device, or an input information processing method for processing input information of the external electronic device in the electronic device, based on the number of display devices of the electronic device.

14. The electronic device of claim 8, wherein the first screen information comprises content information displayed on the at least one display device of the external electronic device and information on a display area within the at least one display device of the external electronic device where the content information is displayed.

15. An operating method of an electronic device including at least one display device, the operating method comprising:
  receiving, from an external electronic device, a number of display devices of the external electronic device via a communication interface;
  generating, based on the number of the display devices of the external electronic device and first screen information for displaying on the at least one display device, second screen information for displaying on at least one of the display devices of the external electronic device and screen selection information indicating a display device for displaying the second screen information among the display devices of the external electronic device; and
  transmitting the second screen information and the screen selection information to the external electronic device.

16. The operating method of claim 15, further comprising:
  in response to identifying that the number of display devices of the external electronic device corresponds to two, generating the second screen information that mirrors the first screen information and configure the screen selection information to display a half of the second screen information on a first display device of the display devices of the external electronic device and a remained half of the second screen information on a second display device of the display devices of the external electronic.

17. The operating method of claim 16, further comprising:
  in response to identifying that the number of display devices of the external electronic device corresponds to two, generate the second screen information that mirrors the first screen information and configure the screen selection information to display the second screen information on a first display device of the display devices of the external electronic device.

18. The operating method of claim 15,
  wherein the generating of the screen information comprises determining, among the one or more display devices of the external electronic device, a first display device for displaying a first screen and a second display device for displaying a second screen based on the number of display devices of the external electronic device,
  wherein at least one of the first screen or the second screen is associated with the first screen information, and
  wherein the screen information comprises information on the first screen associated with the first display device and the second screen associated with the second display device.

19. The operating method of claim 18, wherein the first screen corresponds to a foreground application which is displayed via the at least one display device and the second screen corresponds to a background application executed in the electronic device.

20. The operating method of claim 15, further comprising:
  determining at least one of a reproduction method for reproducing an audio signal corresponding to the at least one display device in the external electronic device, or an input information processing method for processing input information in the external electronic device, based on data received from the external electronic device; and
  transmitting at least one of the reproduction method or the input information processing method to the external electronic device.

21. The operating method of claim 15, wherein the screen information comprises content information displayed on the at least one display device, area information of the at least one display device on which the content information is displayed, and information on a display area of the external electronic device where the content information is to be displayed.

22. An operating method of an electronic device including one or more display devices, the operating method comprising:
  receiving, from an external electronic device, a number of display devices of the external electronic device via a communication interface;
  receiving first screen information regarding information being displayed via one of the display devices of the external electronic device from the external electronic device;
  generating, based on the number of the display devices of the external electronic device and the first screen information, second screen information comprising information for displaying on at least one of the display devices of the electronic device and screen selection information indicating a display device for displaying the second screen information among the display devices by reconfiguring the first screen information based on the received number of display devices; and
  displaying the second screen information in the display device among the display devices of the electronic device.

23. The operating method of claim 22,
  wherein the information further comprises at least one of a number of the one or more display devices of the electronic device, a type of the one or more display devices, a characteristic of the one or more display devices, or a resolution of each of the one or more display devices, and
  wherein data received from the external electronic device comprises information on at least one of a number of the at least one display device of the external electronic device, a type of the at least one display device, a characteristic of the at least one display device, or a resolution of each of the at least one display device.

24. The operating method of claim 23, wherein the second screen information is generated based on at least one of an application executed in the electronic device, a priority of applications executed in the electronic device, an application executed in the external electronic device, or a priority of applications executed in the external electronic device.

25. The operating method of claim 22, wherein the generating of the second screen information comprises:
  determining, among the one or more display devices, a first display device for displaying a first screen and a second display device for displaying a second screen based on the number of display devices of the external electronic device,
  wherein at least one of the first screen or the second screen is associated with the first screen information, and
  wherein the second screen information comprises information on the first screen associated with the first display device and the second screen associated with the second display device.

26. The operating method of claim 25, wherein the first screen corresponds to a foreground application which is displayed via the at least one display device of the external electronic device and the second screen corresponds to a background application executed in the external electronic device.

27. The operating method of claim 22, further comprising:
determining at least one of a reproduction method for reproducing an audio signal corresponding to the at least one display device in the external electronic device, or an input information processing method for processing input information in the external electronic device, based on the number of display devices of the electronic device; and
processing an audio signal or input information provided from the external electronic device based on at least one of the reproduction method or the input information processing method.

28. The operating method of claim 22, wherein the first screen information comprises content information displayed on the at least one display device of the external electronic device and information on a display area within the at least one display device of the external electronic device where the content information is displayed.

* * * * *